United States Patent [19]

Ricca

[11] Patent Number: 5,621,277
[45] Date of Patent: *Apr. 15, 1997

[54] AUTOMATIC LIGHT CONTROL AND BATTERY PROTECTION ON A VEHICLE

[76] Inventor: Tom L. Ricca, 1413 Wyandotte Rd., Columbus, Ohio 43212

[ * ] Notice: The term of this patent shall not extend beyond the expiration date of Pat. No. 5,329,204.

[21] Appl. No.: 335,133

[22] Filed: Nov. 7, 1994

[51] Int. Cl.$^6$ .................................................. H05B 37/02
[52] U.S. Cl. ........................................ 315/86; 307/10.8
[58] Field of Search ............................. 315/82, 307, 83, 315/77, 86; 307/10.8

[56] References Cited

U.S. PATENT DOCUMENTS 5,329,204  7/1994  Ricca ........................................ 315/82

Primary Examiner—Robert Pascal
Assistant Examiner—Michael B. Shingleton

[57] ABSTRACT

The present invention relates to a vehicle automatic light control and battery protection having a microcontroller. The novelty rests in obtaining the information on the different positions of the main light switch by sensing the change in voltage at a predetermined end of each of the sensing resistors of predetermined values, said predetermined end being connected to a predetermined contact terminal of a number of pairs of contact terminals of controlled switches which are inserted in series with the light circuits at physical locations predetermined to be convenient for tile installation of the invention on each vehicle. This novelty makes it very inexpensive to provide many beneficial operations in turning off with different delays the head lights, park lights, and dome lights, as well as to provide automatic battery protection against any routinely used lights when they are inadvertently left on, without using any confusing additional switches as in prior art. Legal daytime running lights, resetable electronic circuit breaker and compact ignition switch transducer, readily includable at low cost, further enhance tile viability of the invention.

20 Claims, 21 Drawing Sheets

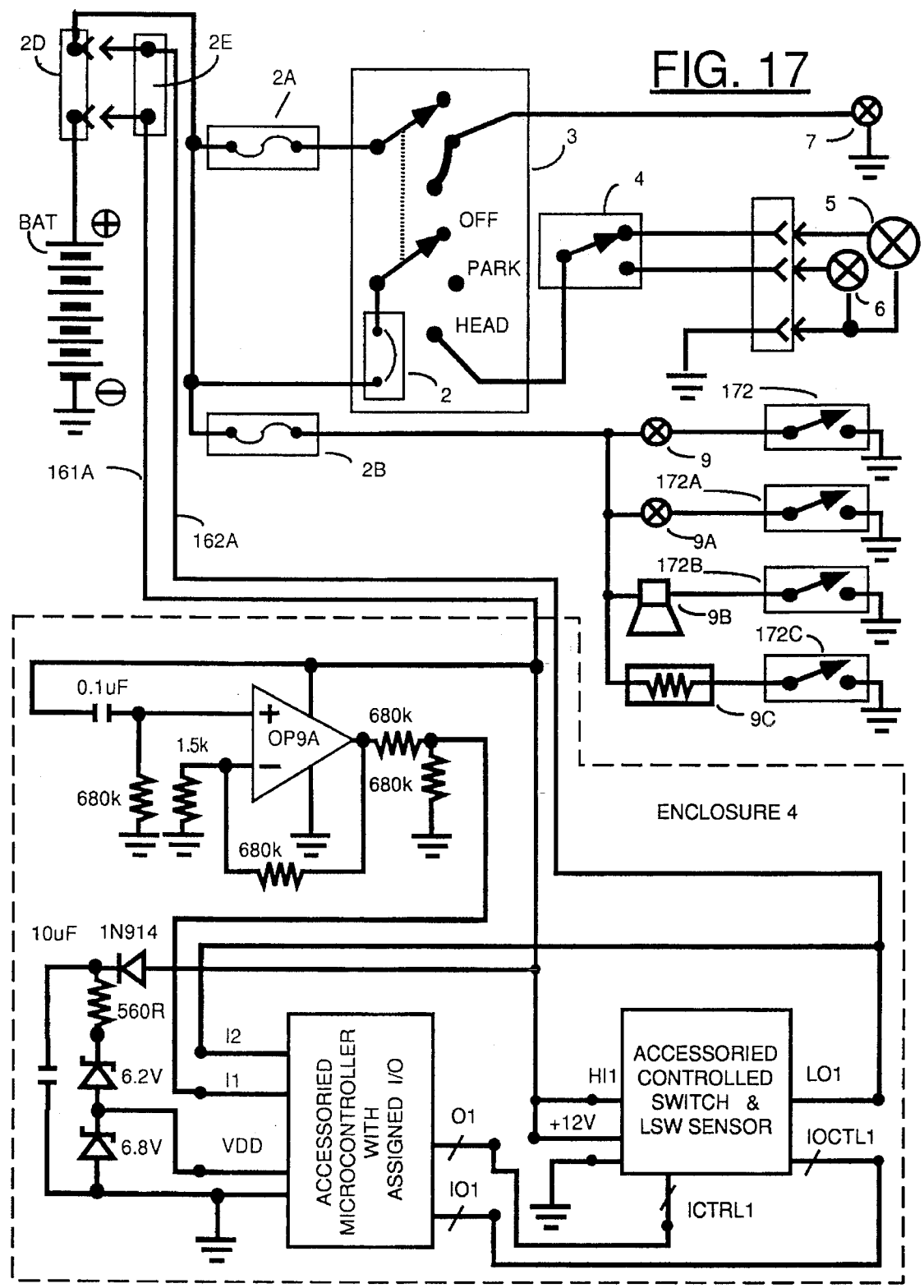

AUTOMATIC LIGHT CONTROL AND BATTERY PROTECTION ON A VEHICLE

BACKGROUND OF THE INVENTION

This invention relates to a novel and improved attachment adaptable easily to the majority of vehicles to assist the users of said vehicles in turning on and off the different sets of lights of said vehicles in a logical and friendly way. It provides also, at zero additional cost, automatic battery protection and daytime running lights to the majority of vehicles presently made without these critical safety features.

CROSS-REFERENCE TO RELATED APPLICATION

This application is related to application Ser. No. 849,109, Filed Mar. 9, 1992, now U.S. Pat. No. 5,329,204, granted Jul. 12, 1994.

For the ease of understanding the following description, an improved vehicle or vehicle would consistently refer to one of the general classes of means of transportation for people or merchandises characterized by a car, a truck, a van, a recreational vehicle, a motorcycle, and a boat, thereon this invention is attached. Finally, a user of a vehicle may be a man or a woman, but would consistently be referred to as a man.

This invention will show that the operation of an improved vehicle is logical thanks to the fact that all the conventional operations related to the different light switches thereof would be strictly preserved to operate the ways the users are familiar with. Those switches, including the main light switch, the dimmer switch and the flash switch (commercially called a flash-to-pass switch, described in details later on) widely adopted by the vehicle industries and available in each vehicle to the user, would operate the ways they have been intended for in an improved vehicle, as if there were no modifications whatsoever for the need of the invention. The additional desirable benefits provided by an improved vehicle would automatically go into action at the right time without the user having to take any extra steps to manipulate any extra switches that may confuse any user unfamiliar with the vehicle. An improved vehicle would be friendly because it would faithfully protect its user against the frequent annoyance of having to make sure that all the lights of his vehicle are off before leaving said vehicle unattended for a long time. Such frequent annoyance, when a vehicle is not yet equipped with this invention, occurs for example when said vehicle's user, after, parking said vehicle for the day and walking a good distance on the way to work, suddenly becomes anxious because of something like the sight of an vehicle with the head lights on for instance, about whether any lights of his vehicle are still on. More often than not, he grudgingly would have to turn around and walk back to a point from where the lights of his vehicle can be surely verified to be off, before he could have the peace of mind for the day. The penalty for not doing such verification could be a heavy toll of anxiety on his mind throughout the whole day, or worse still, if said vehicle's lights were left on when it was parked for the day, said user would come back to a vehicle that usually would not start, as most of the energy of the battery of said vehicle had been drained off to unusable conditions in a few hours before. Time-consuming assistance would be needed for said vehicle to start then and to regenerate enough energy for the next starting again. Although many vehicles nowadays have a chime system that would sound when the driver-side door is opened and any external lights of the vehicles are still on, many users with busy mind tend to pay little attention to that chime at the very brief moment between the opening and the closing of the driver-side door. The user of an improved vehicle would have the best solution to that problem all the time, an can be sure that even if said vehicle's lights were still on the instant when said vehicle was parked for the day, this invention would automatically turn them off a relatively short moment later, e.g., a minute, after the vehicle's ignition was turned off. Moreover, a user can enjoy the classy experience of commanding his improved vehicle, ill a simple and natural manner, to keep the head lights on for a short moment, say, one minute, for some helpfully needed lighting for that walk from the parking spot to the final destination, before said improved vehicle turns off all of its lights automatically for him.

Numerous inventions have been proposed to achieve the above-mentioned benefits for vehicle users, but tip until recently, none has been considered good enough in terms of cost, logical operation and friendliness of use, to be installable universally on every vehicle. Also, for the retrofitting market, such an invention should only require an easy, quick, safe, and fool-proof installation, so that no training on the part of the installer would be needed, except simple mechanical skills and the ability to read a brief installation guide. For the most desirable implementation for retrofitting on an vehicle, such an invention should not require the cutting and splicing of any of the pre-installed wires of said vehicle, and should not require the access to the contact areas of the light switch and the ignition switch of the vehicle, as such cutting and splicing would be a so messy and error-prone procedure, and such access to the contact areas so difficult that not too many service people or users would like to perform.

Recently, U.S. Pat. No. 5,329,204, Ricca, teaches novel ways of meeting all the desirable criteria in achieving the above-mentioned benefits for vehicle users, by using it's novelty that rests in obtaining remotely the information on the different positions of the main light switch of a vehicle by sensing the change in voltage at a predetermined end of each of the sensing resistors of predetermined values connected across the terminals of a number of controlled switches which are inserted in series with the light circuits at physical locations predetermined to be convenient for the installation of the invention on each vehicle. However, the novel features of this patent can be improved upon in making it easier to provide vehicle users with many beneficial operations in turning off with different delays the head lights, park lights, and dome lights, as well as to provide automatic battery protection against any routinely used lights when they are inadvertently left on, without using any confusing additional switches as in prior art.

U.S. Pat No. 4,831,310, Heintzberger, teaches a way of picking off the information about when a vehicle is running from the AC signal appearing with the DC component at a terminal of the vehicle battery. The apparatus has an electrical circuit with a filter for filtering the DC component from the AC signal to provide a filtered AC signal indicating an engine running condition. The filtered AC signal or other engine running signal obtained from the filtered AC signal is compared with a predetermined value and an actuating signal is provided when the engine running signal is above the predetermined value. This filtered AC signal processing suffers from the fact that a complicated, thus unreliable, circuit has to be implemented; and from undesirable delays in turning on and off the controlled lights. A significantly improved way of transducing the state of the enabling or ignition switch of a vehicle is going to be presented as an addition to the many ways presented in U.S. Pat. No 5,329,204. This additional way would simply amplify to saturation all the pulses caused by turning on or off any sizable energy consuming load on a vehicle, especially the pulses caused by the intermittent demand of the on going use of the ignition system and the pulses caused by the flashing of the emergency lights. A simple and no-extra-cost microcontroller routine of detecting and counting the presence of these pulses for a predetermined period would reveal reliably the presence or absence of these two elements of information to be used while discriminating easily against other unwanted pulses such as turn signals, door openings or closings, braking etc.

It is therefore the goal of the present invention to provide an improved attachment for automatic light control by remote sensing for an vehicle so versatile that it would be easily adaptable to virtually all kinds of vehicles made around the world and would provide the users of those vehicles with all the benefits without virtually any inconveniences in costs or operations.

SUMMARY OF THE INVENTION

The principle of the present invention would be easier to understand in details later on if it is considered as follows:

In a vehicle having a battery therein with one polarity connected to said vehicle metal chassis defined as ground or ground potential and the other polarity defined as high potential, a light switch therein comprising an OFF position that by itself would interrupt the closed paths that energize the park and head lights, a PARK position that by itself would close the path that energizes a set of park lights, and a HEAD position that would close the paths that energize a set of head lights as well as said set of park lights; and an ignition switch therein consisting of at least a RUN mode that would connect said battery power to said vehicle ignition system as well as to said accessory bus energizing eventually a set of designated accessories, a STOP mode that would disconnect from said battery power the ignition system and said accessory bus, and an ACC mode that would connect said battery power strictly to said accessory bus only, an attachment for automatic light control and battery protection on a vehicle comprising:

a. a control block including
  sensing input means to gather information on the logical states of devices outside of said control block,
  controlled output means to actuate devices outside of said control block, and
  logical processing means including memory means to decide on the power level of said controlled output means according to the present and the past logical states of said sensing input means;

b. a controlled switch means actuatable by said controlled output means of said control block for changing the electrical resistance through said controlled switch means from a practically infinite value to a practically zero value, and vice versa;

c. electrical wire insert means and electrical wire interrupting means connected to a plurality of readily accessible terminals of the electrical system of said vehicle as well as to the terminals of said controlled switch means to allow said controlled switch means to be inserted anywhere in the electrical paths that serve to energize said sets of lights of said vehicle; and d. electrical wire signaling means connected to easily accessible transducer means of the states of said light switch and to an easily accessible transducer means of the states of said ignition switch, as well as to said sensing input means of said control block to provide information to said logical processing means about the logical state of said sets of lights as well as about the logical state of the ignition switch.

Implemented in such a manner, all the conventional operations of said light switch in conjunction with turning-on or energizing said light sets of lights would take place as usual as soon as said light switch is moved from the OFF position to the PARK or to the HEAD position. This can be done easily if said control block is seen as realized with integrated circuits forming a logical circuitry means of any sophistication, or, better yet, as realized with a modern, low-power microcomputer including built-in non-volatile programming coupled with some read-and-write memory and by implementing suitably the actuation of said controlled switch means by said control block according to the combinations and sequences of different states of the sensing inputs of said control block.

In an improved vehicle, after there has been a combination of said light switch in the HEAD position and said ignition switch in the RUN mode, causing the head and park lights of said vehicle to be energized as usual, and then only the ignition switch is subsequently turned to STOP, the sensing of the change of state at the inputs of said control block would direct said logical processing means of said control block to time itself automatically through a relatively short moment, e.g., a minute, before actuating said controlled switch means to change the electrical resistance therethrough from a practically zero value to a practically infinite value, therefore to reduce the electrical current through the head and park lights of said vehicle to a first preset low level, drawing only energy from said vehicle battery continuously in an insignificant and harmless manner which would not be detrimental to the normal operation of said vehicle thereafter; thus would provide the user of said vehicle with said relatively short moment of lighting to facilitate said user's walk from the parking spot of said vehicle to the final destination; and thus would turn off automatically for said user all the lights of said vehicle, after said relatively short moment, when said user fails,—by forgetting, ignoring or being unable —, to turn said light switch to OFF before getting away for a long absence from said vehicle with the ignition switch in the STOP mode. This first preset low level of energy has been calculated to take a whole year before consuming only about one third of the energy of the smallest vehicle battery in use nowadays, meaning that if said vehicle's battery is not losing its energy by any natural, systematic way, said user still can start his vehicle again normally, usually within a few hours to a few weeks from the last use of said vehicle.

Further still, in an environment where it is usually half-dark during the day, many drivers would prefer turning on their park lights for the main purpose of signaling the presence of their vehicle on the road and not to light the road and bother the incoming drivers. After there has been a combination of said light switch in the PARK position and said ignition switch in the RUN mode, causing the park lights of said vehicle to be energized as usual, and then only the ignition switch is subsequently turned to the STOP mode, the sensing of the change of state at the inputs of said control block would direct said logical processing means of said control block to time itself automatically through said relatively short moment before actuating said controlled switch means to reduce the electrical current through the park lights of said vehicle to a second preset low level, thus would turn off automatically for said user all the park lights of said vehicle, after said relatively short moment, when said user fails to turn said light switch to OFF before walking away for a long absence from said vehicle with the ignition switch in the STOP mode. This second preset low-level energy consumption is lower than said first yet, thus, is perfectly negligible.

In both above-mentioned cases, when the user of said improved vehicle comes to the driving of said vehicle again after a few minutes or a few months, he would find not only that all the lights of the vehicle are off, and that he could start his vehicle as usual, but also, in a perfectly harmless manner, that when the ignition switch is in the RUN mode, some or all of the external lights are turned on, depending on which position the light switch was left in. He can leave those lights on or turn them off then, by returning the light switch to the OFF position.

In another operation, when an improved vehicle is parked and the ignition switch is in the STOP mode, and the user wants to illuminate the area in front of the vehicle for some purpose, he would instinctively reach for the light switch of his vehicle and turn it to the HEAD position, and all the head and park lights would turn on as usual. The user of such vehicle may like to turn on only the park lights of his vehicle when it is immobilized or parked on a dark portion of the road to signal the presence of his vehicle and get away from it for a while. These operations of head or park lights energizing may even be actuated inadvertently by absent-mindedness by many of the improved vehicle users. Regardless of what happens, after a set of said lights have been energized by turning said light switch from the OFF to the PARK or HEAD positions while the ignition switch is in the STOP mode, the sensing of the change of state of the inputs of said control block would direct said logical processing means of said control block to time itself automatically through a fixed extended period, e.g., ten minutes, while all the orignal modes of operations of said light switch in conjunction with de-energizing and re-energizing a set of said lights would be left totally at the discretion of the user of said vehicle, that is to say, the user can turn off those lights anytime he likes by simply returning said light switch to the OFF position, or he can change the energizing of the head and park lights to the energizing of only the park lights, and vice-versa. When the end of said fixed extended period is reached and said ignition switch is still in the STOP mode, said controlled output means of said control block would actuate said controlled switch means to reduce the electrical current through said set of lights to said first or second preset low level, drawing only energy from said vehicle battery continuously in an insignificant and harmless manner which would not be detrimental to the normal operation of said vehicle thereafter, thus providing the user of said vehicle with said useful fixed extended period of energizing said set of lights to perform a certain task about said vehicle when said set of lights would be desirable, or thus would turn off automatically for said user all the lights of said vehicle after said fixed extended period, when said user forgets, ignores or is unable to turn said light switch to OFF after having intentionally or inadvertently turned said light switch to the PARK or HEAD positions when said ignition switch has been already in the STOP mode. In any of these situations, anytime before or after the end of said fixed extended period is reached and said ignition switch is still in-the STOP mode, if said user intends to have a set of said lights energized for another fixed extended period, he would only have to turn said light switch to the OFF position first, then to either PARK or HEAD positions again. Or, anytime before or after the end of said fixed extended period is reached, and said transducer means of the state of said ignition switch is made to convey to said control block the logic level meaning that said ignition switch is in the RUN mode, then said set of lights would stay energized while all the original modes of operations of said light switch ill conjunction with de-energizing any of said set of lights would be left totally at the discretion and responsibility of the user of said vehicle, thus, providing said user with an intentionally controlled means to energize a set of said lights during any length of time beyond said fixed extended period for any special purpose, for instance servicing or testing said vehicle light system, even without having to actually run the engine of said vehicle if said transducer means of the state of said ignition switch uses the accessory bus and said ignition switch is turned to the ACC mode.

Based on the fact that this invention would always guard the battery of a vehicle from being run down when the ignition key to that vehicle is removed, the idea of enhancing the safety of the driver of such vehicle by the so-called daytime running lights can be promoted by encouraging the user of such vehicle to leave the main light switch always on the low beam position during all the time when the head lights are not required to be turned off. This includes the times when the user removes the ignition key and leaves the vehicle unattended for an extended period, knowing for sure this invention would turn off all the lights for him a short time later.

The principle of the invention may be viewed as following the simple, logical and friendly strategy of allowing the user of an improved vehicle to:

energize or de-energize a set of head and park lights of said vehicle with said light switch, which call include a dimmer switch and a so called flash-to-pass switch, totally at his discretion when said ignition switch is in the RUN mode, exactly as the ways those switches were supposed to work for the user before the invention was implemented on said improved vehicle;

energize or de-energize the high beams of the head lights with only the flash-to-pass switch, at his discretion, when said ignition switch is in the STOP mode and said light switch is in the OFF position, exactly as the ways that switch was supposed to work for the user before the invention was implemented on said improved vehicle;

automatically de-energize any head or park lights which were energized by said light switch, including said dimmer switch, before said ignition switch was turned from the RUN mode to the STOP mode, after a relatively short moment, e.g., a minute;

automatically de-energize any head or park lights which were energized by said light switch including said dimmer switch while said ignition switch is in the STOP mode, after a fixed extended period, e.g., ten minutes;

de-energize any energized lights by returning manually anytime said light switch to the OFF position;

override any automatic de-energizing anytime by turning said ignition switch to the RUN mode (or to the ACC mode when the embodiment of the invention uses the accessory bus of said vehicle as transducer means for said ignition switch);

go from one operation to another- for instance, from a combination of head and park lights energized and ignition switch in RUN mode, to another combination of only park lights energized and ignition switch ill STOP mode—within a very brief instant, e.g., just a little over a second, or even less than a second in some embodiments;

extend easily at very low extra cost, the automatic switching to easily forgotten lights, the dome lights, which are usually not a part of the inputs to the reminding chime circuit, if such circuit exists.

Based on the basic principles of operation of the invention, one object of the present invention is to provide an attachment that can retrofit the majority of vehicles in use today for automatic light control by remote sensing on a vehicle that preserves for the user total intentional control of head and park lights of said vehicles with conventional and widely accepted ways of manipulating a light switch including dimmer and flash-to-pass switches, and that automatically de-energizes for the user any inadvertently energizing of any of the vehicle lights, including specially the head and park lights, and optionally the dome lights.

Another object is to provide such attachment at low costs to the user, especially in terms of quick and easy installation that requires none of the pre-installed wires of said vehicles to be cut and spliced, and none of the electrical terminals of the light switch and ignition switch to be reached for wire connections.

Still another object of the invention is to provide original manufacturers of vehicles to include, at low costs and with ease, an automatic light control by remote sensing circuit into their products that would protect the batteries of those vehicles from being run down by inadvertently left-on lights, and thus to enhance their marketability.

Yet another object of the invention is to provide original manufacturers of vehicles to include, at low costs and with ease the option for the users of such vehicles to experiment with, or to cope with the law in some countries of, the increasingly popular safety notion of daytime running lights by leaving, all days and nights, in the low-beam ON position, the light switch of the vehicles fitted with this invention without fearing ever to run down their batteries.

Another object of the invention is to provide the user of a vehicle equipped with the invention an automatic means of lighting the way for a minute of safer walking from the parking spot of his vehicle to his final destination.

Another object of the invention is to provide the user of a vehicle equipped with the invention a way of turning on intuitively any time the head and park lights, including the high beam lights, continuously for a period of about 10 minutes, in a renewable manner at any time, and to have the invention turn off all of them automatically for the protection of the battery.

Another object of the invention is to provide the user of a vehicle equipped with the invention a safe way to actuate the blinking at half-intensity of the head and park lights for great emergency signaling, or just the park lights for narrow road park signaling, for a period of an hour when the vehicle is immobilized, and to have the invention turn off all of them automatically for the protection of the battery.

Finally, another object of the invention is to provide, in the most favorable environment of vehicle electrical wiring, a means for attaching the invention onto an vehicle, which is being assembled or being retrofitted after sale, with just a pair of wires and the casual fastening of the metal container of the invention onto the chassis of said vehicle.

Other objects and advantages of the invention will become apparent from the following detailed description when taken in conjunction with the accompanying drawings.

BRIEF DESCRIPTION OF THE DRAWINGS

FIG. 6GG illustrates a controlled switch means which may be electromechanical or electronic relays with built-in charge pump.

FIG. 17 represents a preferred wiring diagram usable in new vehicles or after-sale vehicles manufactured in a way that contains originally the diagram of FIG. 1, with the fusing link replaced by a big-fuse holder fitted with a big fuse.

DETAIL DESCRIPTION OF THE PREFERRED EMBODIMENT

For the clarity of the description of the invention, it is supposed that in a vehicle on which the invention is to be attached, a battery of the vehicle would have one of its polarity, in general designated as the negative polarity, connected systematically to the metal chassis of the vehicle that serves conveniently as one massive, shareable, low-resistance conductor for all electrical devices of said vehicle, and the potential of this polarity is called ground or ground potential. The other polarity of said battery would be called high potential or hot potential. It is supposed further that in such a vehicle there exists an enabling switch also called an ignition switch which is usually allowed to be turned to its different modes by an ignition key which can be inserted into, and removed from, its receptacle only when this ignition switch is in its STOP mode. In conventionally made vehicles, this STOP and two other modes. RUN and ACC, are usually provided for the enabling switch or ignition switch. The ACC mode connects the enabling electrical connection of a common line, called an accessory bus, that powers a set of accessories, to the battery high potential. The RUN mode connects the enabling electrical connection of the enabling system (also called the ignition system), as well as the enabling electrical connection of said accessory bus, to the battery high potential. Finally the STOP mode disconnects the enabling electrical connection of the enabling system, as well as the enabling electrical connection of said accessory bus, from the battery high potential. The logical value can be defined in any way in general practice, but would be hereinafter consistently called high when it is nearest to high potential, and low, when it is nearest to ground. Also, in such a vehicle, a terminal of an electrical device, such as a fuse, is said to be electrically nearer to said battery when it is not connected to said battery through an electrical consuming device such as a light filament, but only through an electrical conducting wire or a fusing link.

To facilitate the understanding of the structure and operation of the preferred embodiment of the invention, several sets of description/operation sections would be adopted.

Description/Operation of Environments in Which the Invention is to Work

Figure 1:
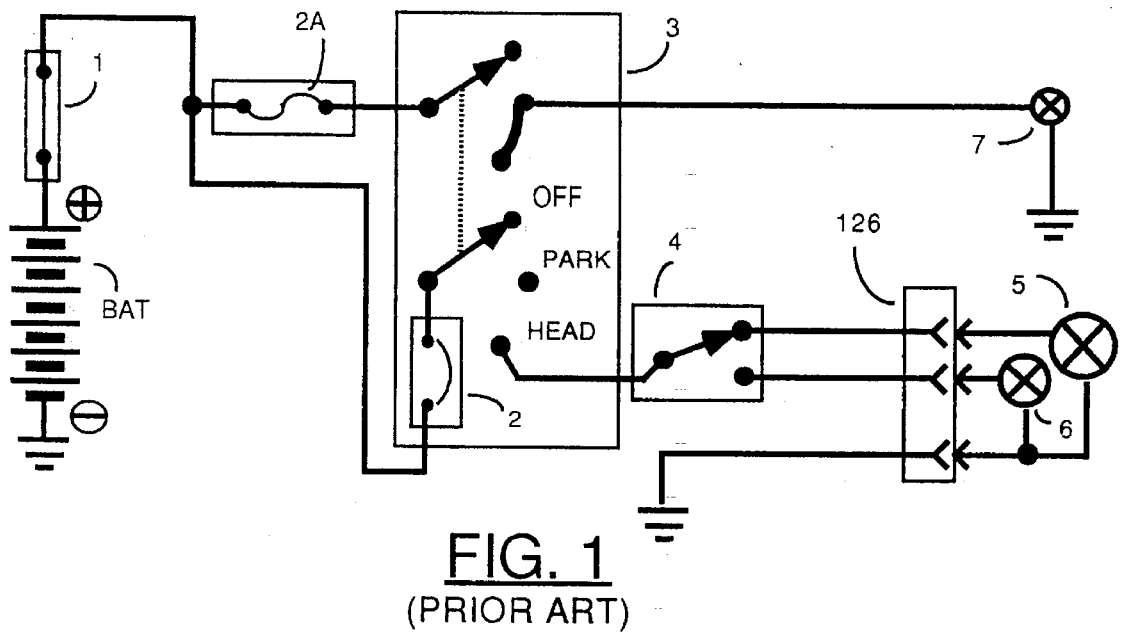
FIG. 1 is the schematic diagram of a typical lighting system wiring found on many basic vehicles.

FIG. 1 is the schematic diagram of a typical lighting system wiring, reproduced to retain only essential components, from the compilation of diagrams of a great many basic vehicle electrical wiring made available to the public for maintenance purpose by the industries. The feature to be noticed is that the general circuit of the lighting system is protected by a fusing link, also called a fuse link, depicted by numeral 1, near the point where it is connected to the high potential terminal of the vehicle battery. From there, the branch that powers the head lights is further protected by a self-resetting circuit breaker 2 housed generally in the main light switch body; and the branch that powers the park lights is protected by a fuse 2A. The head lights in this case are energized by a combination of a position of the main light switch 3 designated as the HEAD position in series with a single-pole, double-throw latching switch 4, called commonly a dimmer switch because of the fact that it allows the head-light energizing to be switched alternately from a high-power, far-distance beam set 5 of the head lights to a dimmer, less powerful, nearer-distance beam set 6 of the head lights, and vice-versa. Throughout this description, the term light switch is to mean the combination of the just-described main light switch and dimmer switch as well as an optional switch used in the head light circuit called a flash-to-pass switch to be described later on. It will be clear at the end of this description that the combination of different possible positions of the main light switch, the dimmer switch and the flash-to-pass switch contribute eventually to only four situations that logically matter in this invention: all head and park lights OFF, only park lights energized, only head lights energized and both sets of park and head lights energized. These four situations do not need to make the difference whether the high-beam or the low-beam set of the head lights is energized. The head lights are meant to includes either the set for low-beam filaments or the set of high-beam filaments of both head lights sets located on the right and on the left of the front part of the vehicle, each head light set on each side comprising a low-beam filament and a high-beam filament in the same light enclosure or comprising such arrangement plus one additional high-beam filament in a second enclosure. Also, to simplify the reading of this description, the park lights 7 would mean to include all the low-power parking lights positioned generally around the vehicle in order to signal the presence and the location of the vehicle, as well as the license plate lights and the instrument panel lights, which get altogether energized when the main light switch 3 of the vehicle is turned to a position designated as the PARK position as well as said HEAD position of the light switch. The third position of the main light switch is designated as the OFF position, in which the main light switch, by itself, would do nothing to the energizing of all head and park lights of the vehicle if they are in the de-energized state or would de-energize those lights if they were in an energized state.

Figure 2:
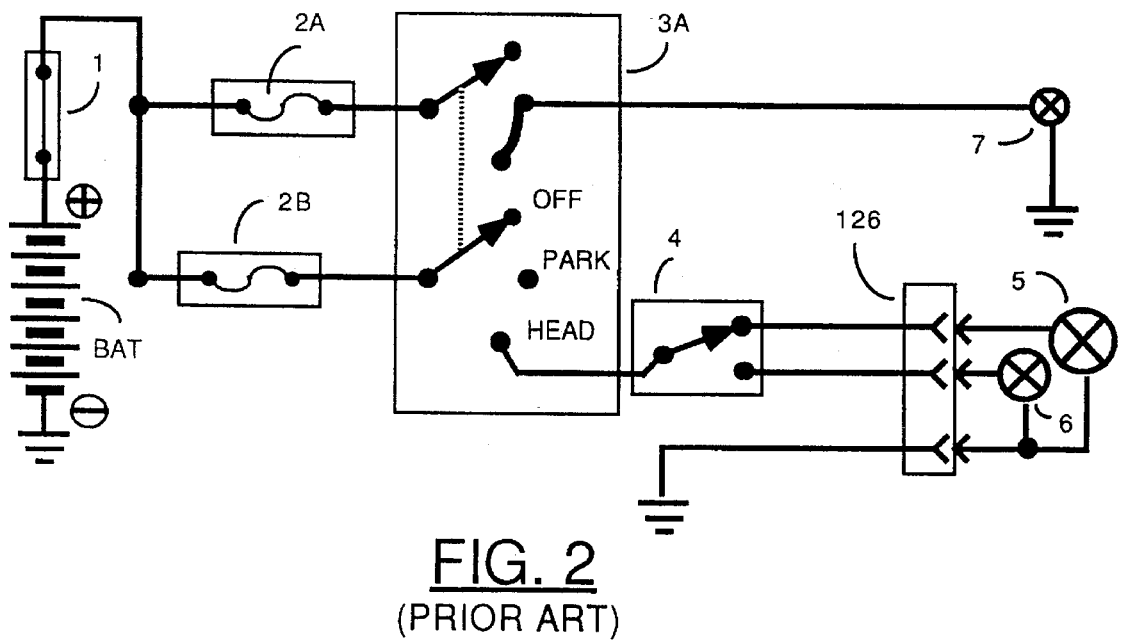
FIG. 2 and FIG. 3 are the schematic diagrams of two other typical lighting system wiring found on many other basic vehicles.

FIG. 2 is the schematic diagram of another typical variety of lighting system wiring found on many other basic vehicles. This diagram is only different from that of FIG. 1 in that the circuit breaker 2 in FIG. 1 is replaced by a fuse 2B in FIG. 2, and that such fuse is located in a fuse compartment along with most other fuses of the vehicle. The main light switch in this case does not contain the circuit breaker, and is depicted as 3A.

Figure 3:
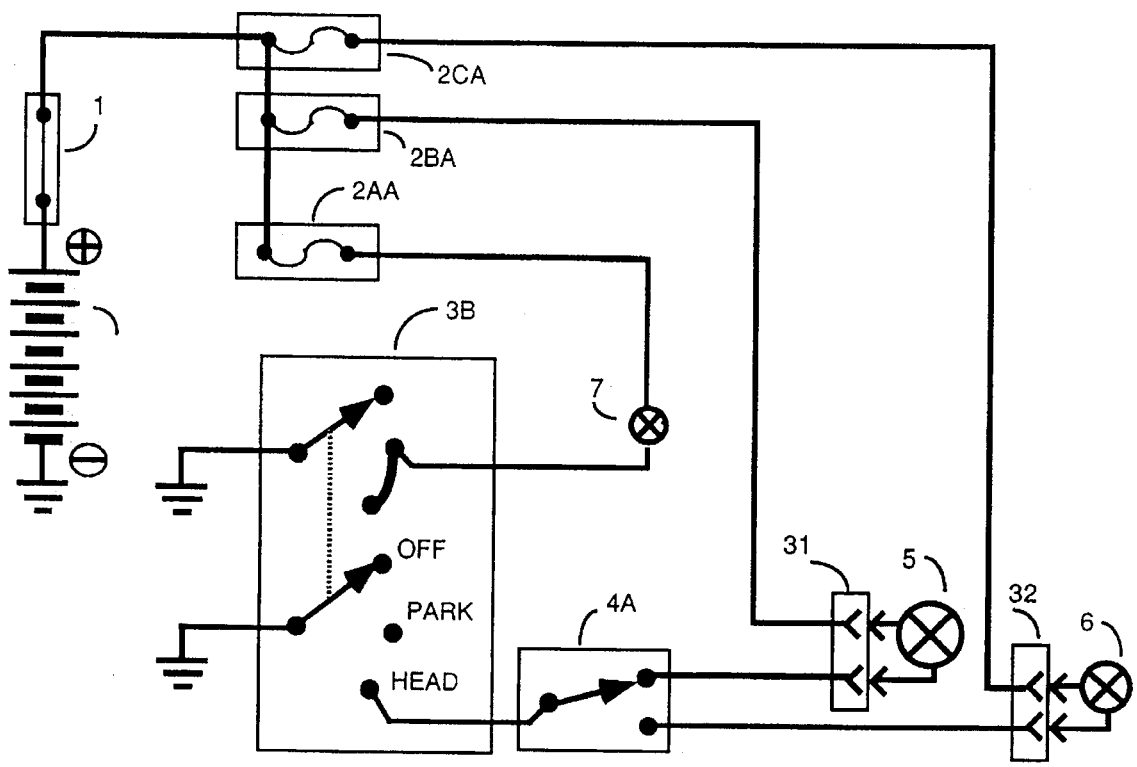

Another sizable variation of FIG. 2 can be found in FIG.3 in which the differences compared to FIG.2 are that the common connection of the two filaments in each head light is connected to the high potential through a common fuse for both sets of filaments or through one of two separate fuses, each for each filament set, while the switching of the head lights is done with the ground line connected to the free end of either filament set of the head lights. The main light switch is designated as 3B, and the dimmer switch is designated as 4A in this case.

Figure 4:
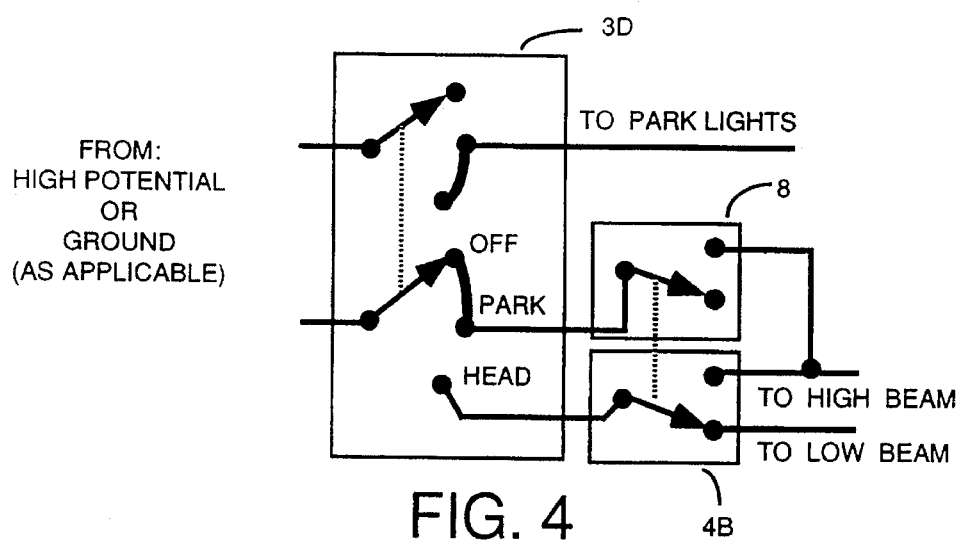
FIG. 4 is a partial schematic diagram of the flash-to-pass option on typical lighting system wiring found on some more advanced vehicles.

FIG. 4 typifies a partial lighting system wiring found on a many basic vehicles equipped further with an advanced option in the form of a single-pole, double-throw switch 8, commercially advertised as a flash-to-pass switch, connected in combination with the main light switch 3D and the dimmer switch 4B of the vehicles. This partial diagram can be an option to the lighting systems depicted in FIG. 1, FIG. 2 and FIG. 3 by simply substituting main light switch 3,3A or 3B on one hand, and dimmer switch 4 or 4A, on the other hand, by main light switch 3D and dimmer switch 4B, respectively. The difference in the main light switch 3D compared to the other switches 3, 3A, and 3B is that there is a connection between the terminals OFF and PARK on the assembly that energizes the head lights. It is easy to see from the diagram that this flash-to-pass switch can be adapted readily to all diagrams of FIGS. 1 to 3, and that it allows a vehicle user to energize, with one hand movement, the high beams of the head lights of his vehicle while the main light switch is in the OFF or PARK positions, as long as said hand movement is maintained at a stop at the end of the course of said hand movement. When said hand movement is relaxed in the reverse direction, this flash-to-pass switch would de-energize those high beams of the head lights. This flash-to-pass switch is, in general, mechanically linked with the dimmer switch, and actuated with a hand movement exactly like the movement for switching the dimmer switch which would enter into its latching action only when the main light switch is in the HEAD position as seen in FIG. 4. Thus, during the time when the main light switch is in the OFF or PARK positions, such as the time when a vehicle is driven during the day time, if there is a need to attract the attention of the drivers of the vehicles immediately ahead for passing, for instance, this flash-to-pass switch would allow the user of a vehicle equipped with it to flick a hand movement to flash on then off right away the high beams of his vehicle's head lights for a brief moment, without having to turn first the main light switch to the HEAD position as on a vehicle not equipped with such switch.

The main operative elements of an attachment for automatic light control and battery protection on a vehicle representing the invention are preferably housed in a container of suitable size, shape and material, to be ultimately fastened onto a convenient part of the vehicle body, and such container is not going to be described here.

Description/Operation of Control Block

Element 10 in all applicable figures of this description depicts schematically the preferred embodiment of the control block of the invention. From the summary description, it is obvious to anyone well versed in the art that this control block can be designed with the general classes of electronic discrete and integrated circuits to do the job. However, the state of the art is such that a circuit built around a specialized type of microcomputer called a microcontroller would do the job a lot better in every way. A microcontroller is commonly defined as a specialized computer on a chip that includes enough read-only memory and read-write memory to hold all the algorithm that directs the microcontroller to do the job. The invaluable advantages of a microcontroller over a general-purpose computer on a chip are that they are a lot less expensive for simple jobs in control, and also that they are ill general smaller in physical size, and their pins are used in maximum number to be programmable on demand as inputs or outputs. A modern microcontroller can be reprogrammable repeatedly for optimal algorithm design, and then for fast time-to-market production, it can be massively one-time-programmable inexpensively in the field or at the factory before delivery. State-of-the-art microcontrollers, made with the well shown CMOS process, can withstand in permanence the harsh, wide-temperature, wide-potential variations under the hood of an vehicle and can be preprogrammed to go into a mode of operation, when idling, in which it would consume current in the order of tens to hundreds of microamperes only. It is easy to calculate later, from each entire schematic diagram embodying the invention designed to be powered in permanence by the battery of the vehicle on which the invention is attached, that it would take this kind of current drawing by itself more than a hundred years before it would have drained the smallest fully-charged battery in use on vehicles today, enough to render it unusable for another engine starting. It is obvious that if an vehicle is left not running continuously, long before then, many physical phenomena would render the battery unusable already. Attached in that manner on a vehicle, it is absolutely certain that the invention would not be detrimental to the normal operation of said vehicle which, in normal practice, would be left not running only for at most a year.

In all applicable figures of this description a microcontroller 10 is chosen as a preferred component of the control block of the invention. For the clarity of the description, this microcontroller is treated in general as a device to be powered by about 12 volts and to work with logical values of zero and 12 volts. The description holds true when such microcontroller is powered by a voltage from 3 to about 7.5 volts in real practice. Pins 11 with capacitor C4 attached for despiking, is to be attached to high potential to power the microcontroller. The current flowing into this pin varies from tens of milliamperes when the microcontroller is active, to tells or hundreds of microamperes when it idles. Pin 15 is to be connected to ground potential of the vehicle receiving the invention. Each of the pins 12, 13, 14 and 17 is to be preprogrammed and used as sensing input means, and connected to ground when not in active use as an input. Resistors R1, R2, R3, R4 and capacitors C1, C2, C3, C5 are attached as in the figure for the purpose of making said sensing inputs more electrical-noise and electrostatic-discharge resistant. Pin 16 is to be preprogrammed as a controlled output means. The built-in logical processing means of this microcontroller would receive preprogrammed instructions from the flow of a pre-designed algorithm kept on the built-in programmable read-only memory, would use the built-in read-write memory as temporary, modifiable registers, as well as would use the logical states of pins 12, 13, 14 and 17 to deduce the past and present states or the combinations and sequences of states of said sensing input means to decide when to energize and when to de-energize said controlled output means.

Description/Operation of the Control Block Algorithm

Figure 5A:
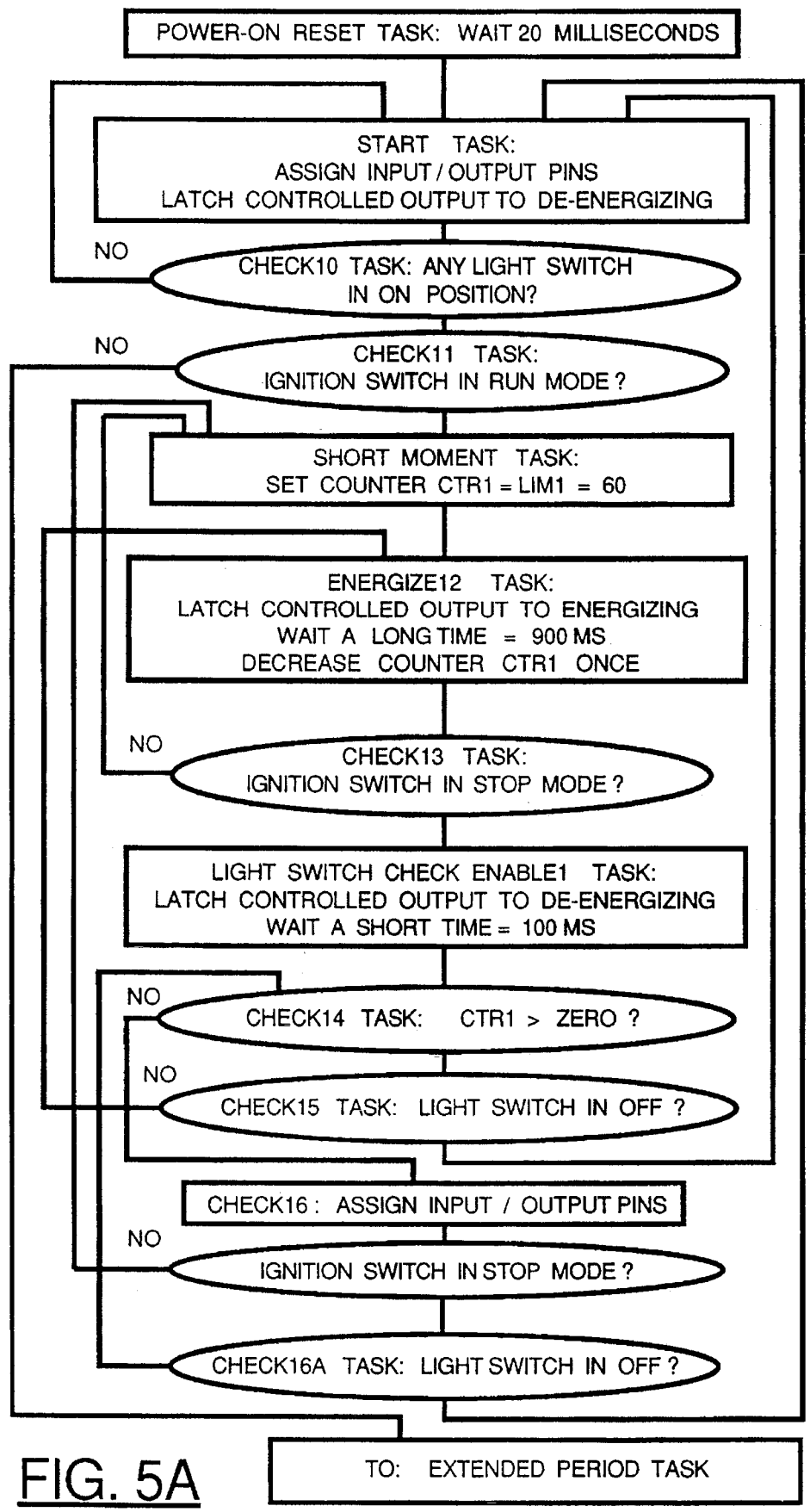
FIG. 5A and FIG. 5B are the first and second parts of the preferred algorithm governing the preferred control block of the invention
Figure 5B:
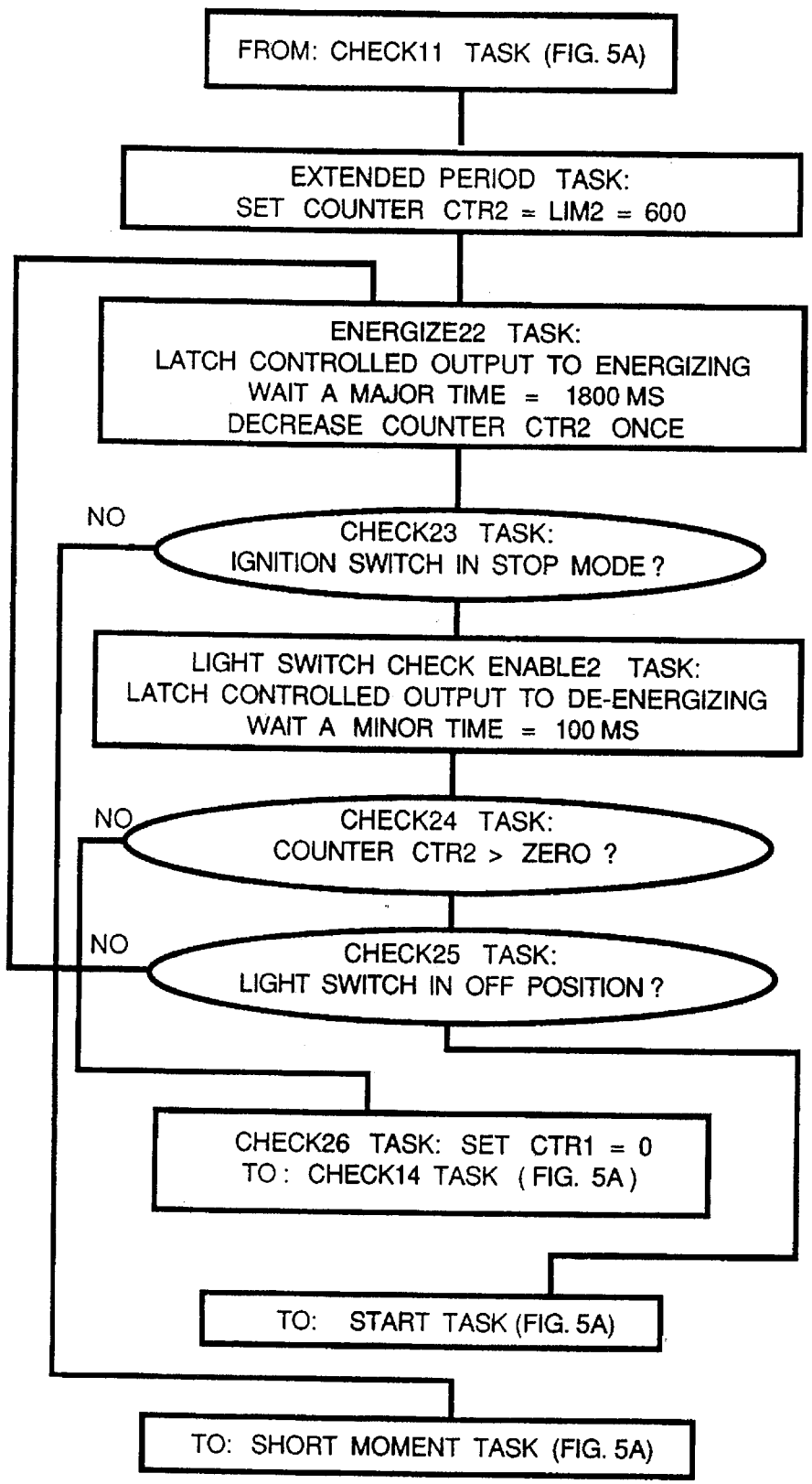
Figure 5C:
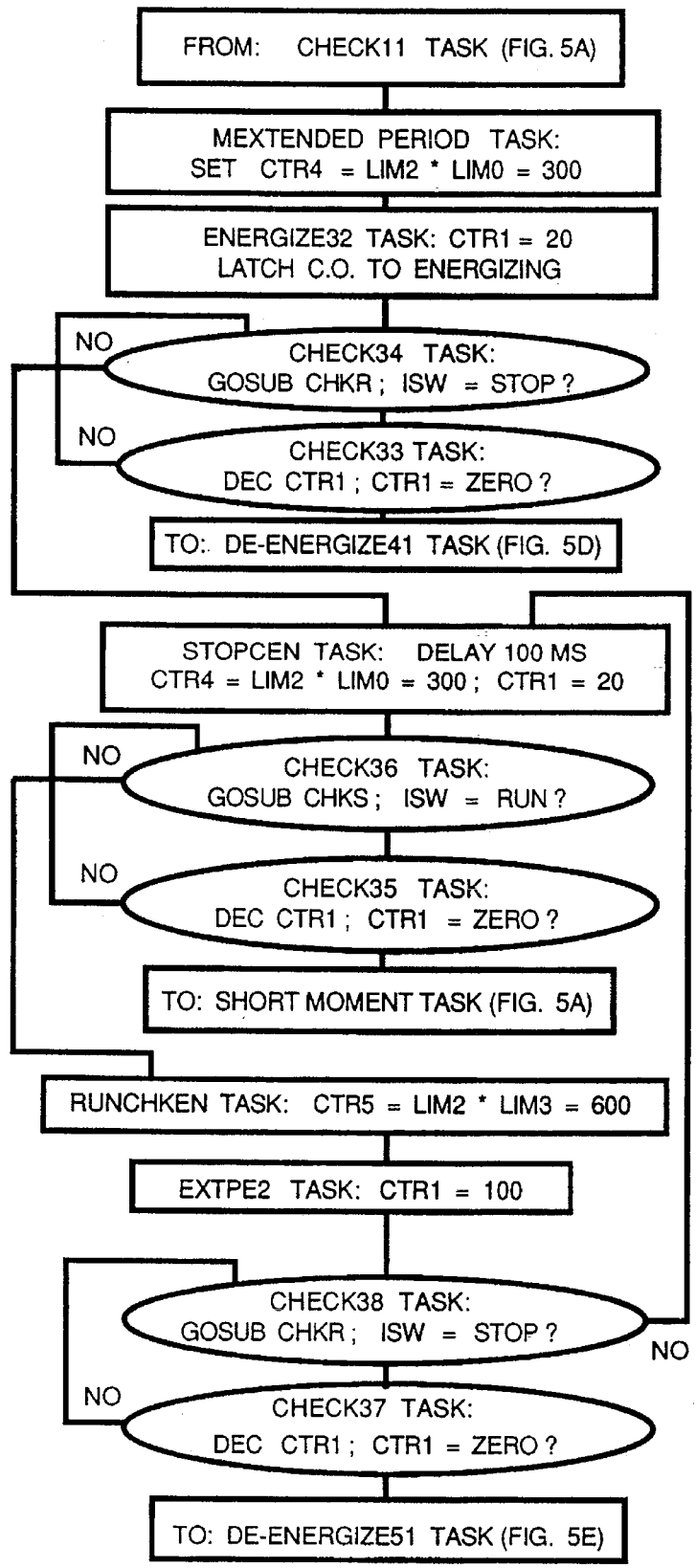
FIGS. 5C to 5G depict the improved operations in conjunction with FIG. 5A.
Figure 5D:
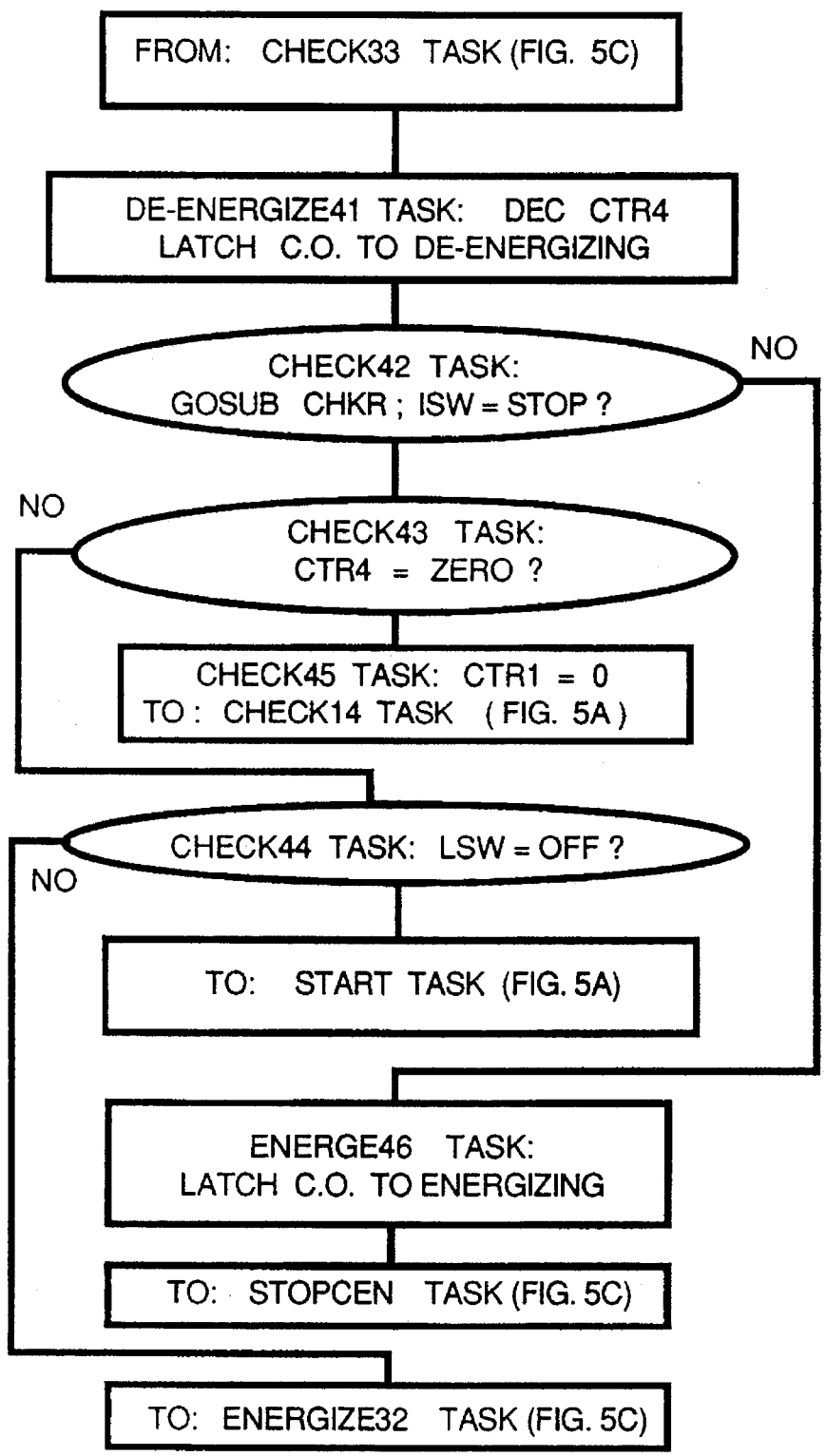
Figure 5E:
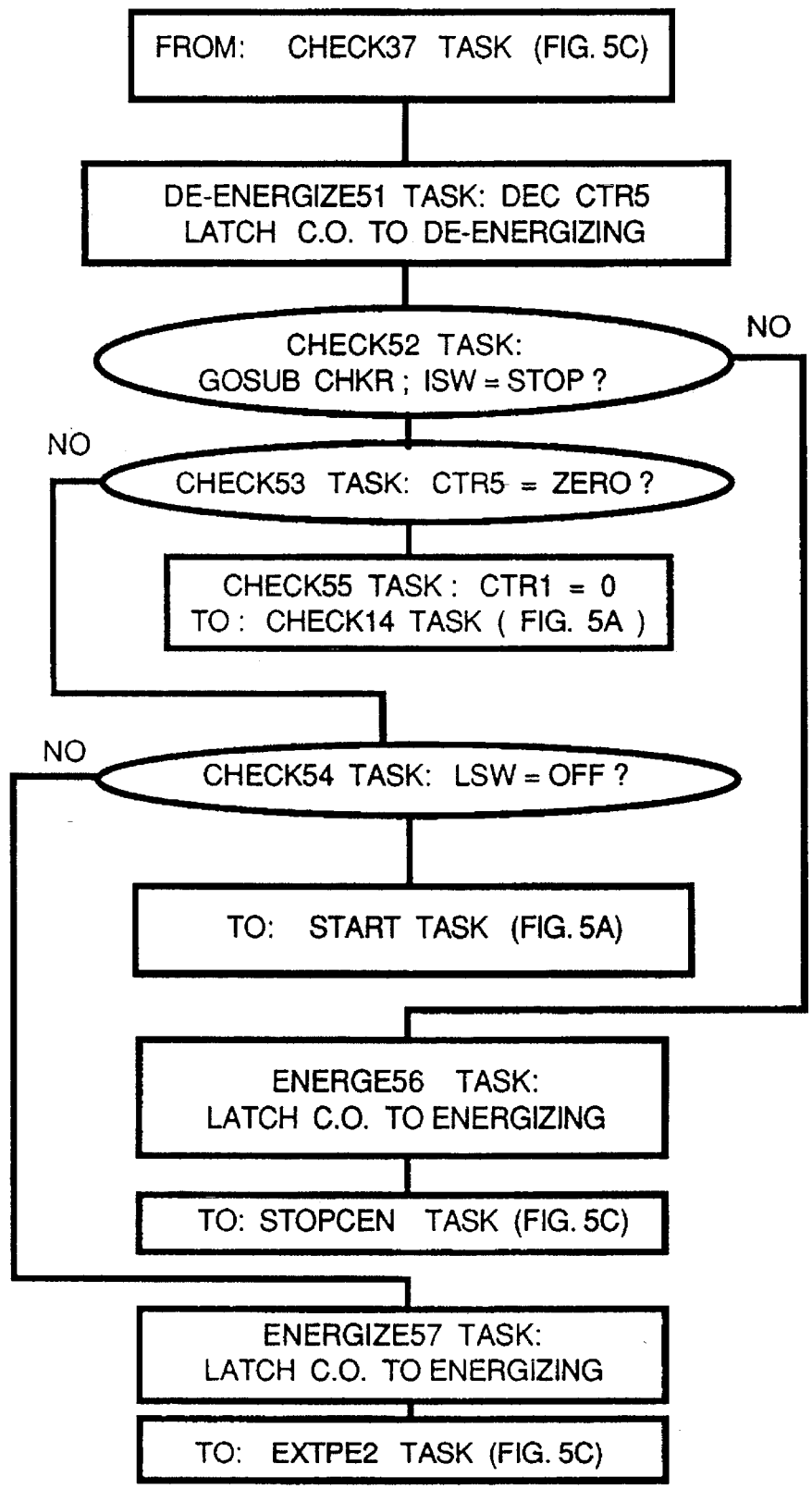
Figure 5F:
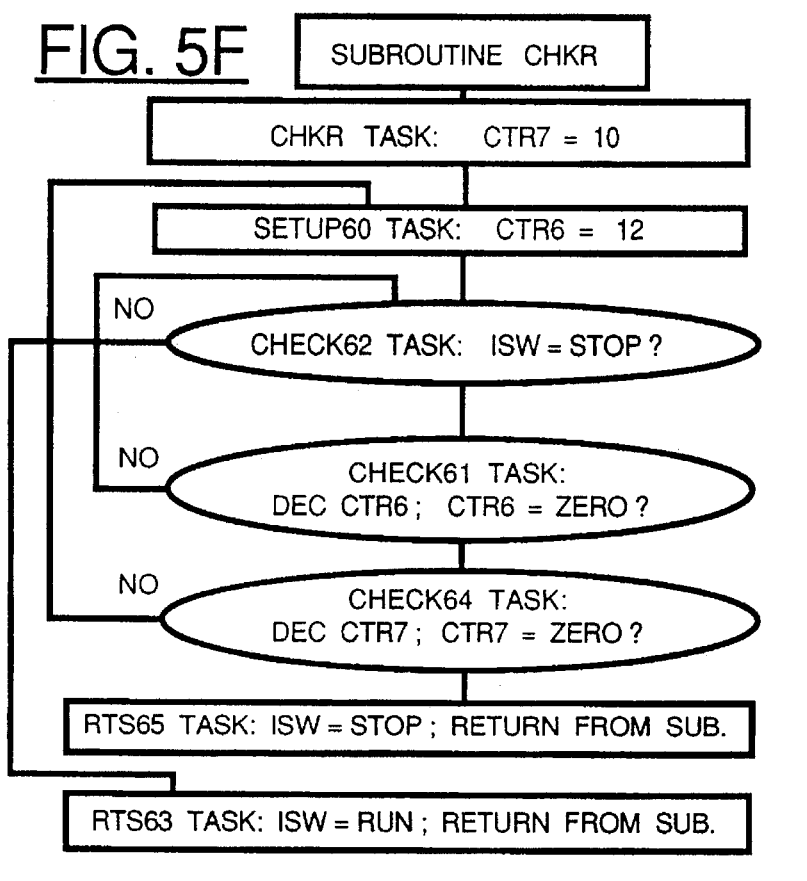
Figure 5G:
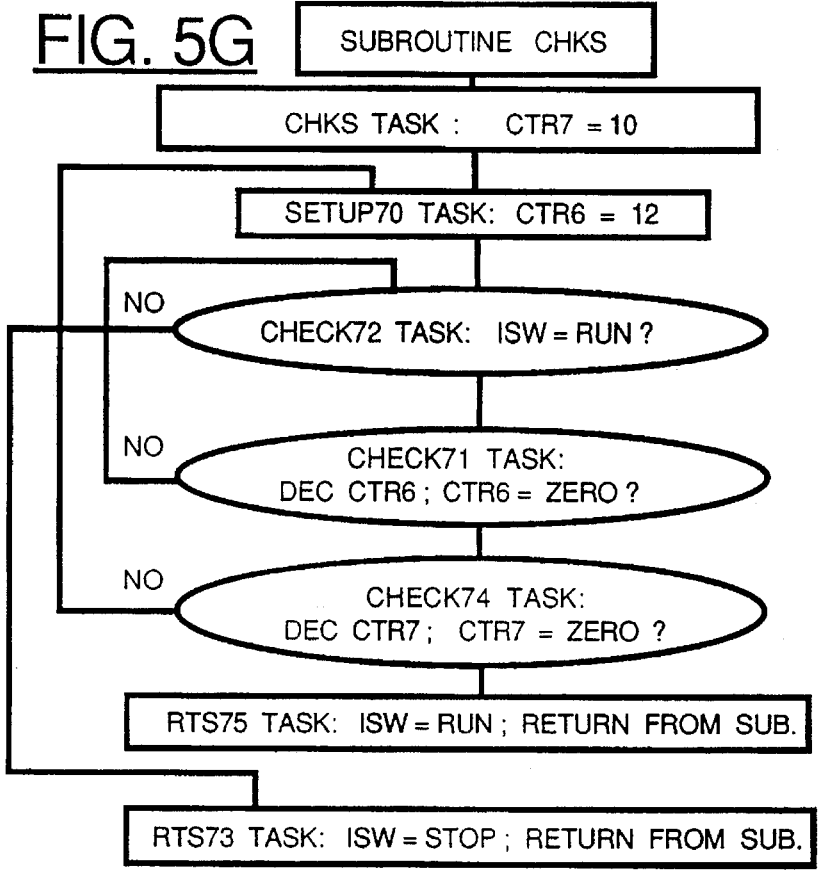

FIG. 5A and FIG. 5B show, in flow chart fashion, the first and second parts of the preferred algorithm governing the preferred control block of the invention, using a low-power microcontroller which is widely available at the present time oil the market at low cost, is extremely flexible and easy to use, is reprogrammable for utmost algorithm optimizing, is one-time programmable for short time-to-market production, and can operate easily with from very low to very high speeds.

The preprogramming, built into the on-chip read-only memory, is an example for directing said control block through the preferred logic tasks in steps that take a minimum of about 125 microseconds at each decision making step. For ease of reading the flow chart representing this preprogramming, at every decision task represented by a task enclosed in an ellipse, where there are two directions to take depending upon the result for the decision, the vertical direction always represents the positive answer to the result for the decision, and the lateral direction is always the negative answer to the result for the decision. The flow of the chart always follows the down direction if the flow line connecting any two tasks is vertical, and can follow the up or down direction when the flow line connecting two tasks begins laterally at one ellipse. Note also that for many counting tasks, when the count may exceed 255, which is the maximum count possible with a first eight-bit counter, a second counter of eight-bit length has to be used as a multiplier of the first counter, and so on, since the microcontroller used in the prototype example works with only eight-bit data words.

As seen in FIG. 5A, the algorithm is outlined as follows:

POWER ON RESET TASK: Wait about 20 milliseconds for microcontroller clock to stabilize correctly.

START TASK: assign input and output pins on microcontroller; latch controlled output (C.O.) to de-energizing.

CHECK 10 TASK: check. (by means of logic states of the electrical wire signaling described below), if any controlled light switch is in on position. If not, go to beginning of START TASK to continue checking: if so then CHECK11 TASK: check if said ignition switch is in the RUN mode, (by means of logic states of electrical wire signaling described below). If not, go to EXTENDED PERIOD TASK: if so then SHORT MOMENT TASK: set a counter CTR1 to a limit count LIM1 (to be, as an example, equal to 60), for said relatively short moment, then ENERGIZE12 TASK: latch said controlled output means to energizing; wait a long fraction of a second (900 ms, for example): count down or decrease said counter CTR1 once.

CHECK13 TASK: check if said ignition switch is in the STOP mode, (by means of logic states of electrical wire signaling described below). If not, go to beginning of SHORT MOMENT TASK to energize lights continuously; if so, then LIGHT SWITCH CHECK ENABLE1 TASK: latch said controlled output means to de-energizing; wait for a short fraction of a second (100 ms, for example); the sum of said long fraction of a second and said short fraction of a second multiplied by said limit count1 being equal practically to said relatively short moment, (60 seconds in this example).

CHECK14 TASK: check if said counter is still greater than zero yet. If not, go to CHECK16 TASK; if so, then CHECK15 TASK: check if said light switch is in the OFF position, (by means of logic states of electrical wire signaling described below). If not, go to beginning of ENERGIZE12 TASK: if so, then go to beginning of START TASK, CHECK16 TASK: as a good practice, assign again input and output pins as before, in order to guard the different registers of the microcontroller against the corruption of the harsh electrical environment and de-energize the controlled output to be sure. Check if the ignition switch is in the STOP mode, (by means of logic states of electrical wire signaling described below). If not, go to SHORT MOMENT TASK; if so, then CHECK16A TASK: check if the light switch is in OFF position. If so then go to START TASK; if not then loop to CHECK14 TASK in order to continue checking the position of the light switch rapidly, (at intervals of about 5 ms, repeatedly, in this numerical example), Referring to FIG. 5B, the algorithm continues with:

EXTENDED PERIOD TASK: set counter CTR4 to a limit count LIM2 * LIMO (to be, as an example, equal to 300 repeats of 2-second cycles of blinking, for 10 minutes) for said fixed extended period, then ENERGIZE22 TASK: latch said controlled output means to energizing; wait a major fraction of a second (1800 ms and some overhead time amounting to about 100 ms, for example); count down counter CTR2 once, then CHECK23 TASK: check if said ignition switch is in the STOP mode, (by means of logic states of electrical wire signaling described below). If not, go to beginning of EXTENDED PERIOD TASK; if so, then LIGHT SWITCH CHECK ENABLE2 TASK: latch said controlled output means to de-energizing; wait for a minor fraction of a second (100 ms, for example); the sum of said major fraction of a second and said minor fraction of a second multiplied by said limit count2 being equal practically to said fixed extended period, (10 minutes in this example);

CHECK24 TASK: check if said counter is still greater than zero yet. If not, go to CHECK26 TASK; if so, then CHECK25 TASK: check if said light switch is in the OFF position, (by means of logic states of electrical wire signaling described below). If not, go to beginning of ENERGIZE22 TASK; if so, then go to beginning of START TASK.

CHECK26 TASK: simulate the case of a short moment duration reaching already its end and the light switch is still ON, by setting CTR1=0, then go to CHECK14 to continue checking at high speed—at about 5 ms intervals—when the light switch is in the OFF position in order to go to the initial START task to wait for all possible cases to arrive.

The numerical example in this algorithm would make said short moment last about 60 seconds, and said extended period, about 10 minutes. When the logic of the invention is to de-energize any lights automatically for the user, a blinking of high on-to-off ratio in the lights being energized is executed by the algorithm. As seen in the above flow chart and as explained in details later, this blinking is used conveniently as a novel and powerful way to allow the checking of the state or the position of the light switch (namely, OFF, PARK or HEAD position), by means of logic states of electrical wire signaling means described below, without ever having to establish the difficult access to the electrical terminals on the body of the main light switch as required by many patents of prior art. In this invention, the checking of the state of the light switch, including the dimmer switch and the flash-to-pass switch where applicable, is done easily during any moment when the controlled switch means is already non-conducting or commanded by the control block to be non-conducting and then sensing the logic level at a suitably chosen end of each pair of controlled switch means contact terminals, each said pair of contact terminals being connected to the two terminals of a suitably chosen resistor defined as sensing resistor. It is proven empirically that this way of sensing always provides a voltage that changes from ground to high voltage, (or vice versa, depending upon the location of the insertion of the relay contact terminals), when there is or not an electrical current flowing through said sensing resistor: such current, in turn, is caused by the closing or opening of the light switch section in series with the circuit wire connected to that particular controlled switch means contact terminals. This way of sensing the state of the light switch allows the wire interrupting means to be located anywhere in series with the wiring circuit of the lighting system of a vehicle, so that in each environment where the invention is to work, this allows to locate the wire interrupting means electrically and physically at a convenient place which is not restricted, for instance, to a location between the main light switch and the set of head lights as in many of the teachings of prior art. Using a microcontroller in conjunction with the sensing of the state of the light switch and the ignition switch makes it very easy to accommodate any logic level, (high or low, consistently derived from a certain state), representing a sensed state at one of the inputs of the microcontroller, depending upon the type of the adopted transducer means in the electrical wire signaling means, without having to add any extra hardware for logic inversion. Also, the location where the state of the microcontroller is at any moment in its algorithm reflects the cumulative actions the control block has taken based upon the different states of the light and ignition switches in the past and now determines clearly and unequivocally what action to take, given the present state of the light and ignition switches; thus such microcontroller serves as a convenient sequential and combinational logic circuit for the control block. The rate of about one blink per second for the short moment, about two seconds for the extended period and ninety-percent (or more) on, ten-percent (or less) off duty cycle for both are preferable. The values in this numerical example are deemed good compromises in simplifying the operations of the invention for the users in terms of battery safeguarding, quick manual changes in different schemes of lighting, intrinsic value of desirable lighting and added benefit of built-in diagnostics. The algorithm call be modified very easily, when a power MOSFET is used as the controlled switch means, to turn off the controlled switch means for example, for a millisecond every 250 milliseconds of on time in order to hide away successfully the possibly annoying visible blinking caused by long off time, and at the same time to allow the sensing of the state of the light switch in a perfect manner. In this way of using the sensing resistor, a seemingly continuous lighting can be assigned to any operation, e.g. the 10-minute operation for a more intuitive operation of the lights, without loosing the benefits of sensing function and with sensing at higher rate yet. Any visible blinking for diagnostic purposed can then be created very easily with reasonably long off time.

Battery safeguarding: even energizing all the high beams of head lights and all the park lights of a vehicle for up to 30 minutes (let alone up to 10 minutes as proposed here), before automatically de-energizing still preserves always enough energy in the battery for the next starting. The proposed 10 minutes extended period is to insure that the vehicle battery would be safeguarded, even when it is of old age.

Figures 9A, 10:
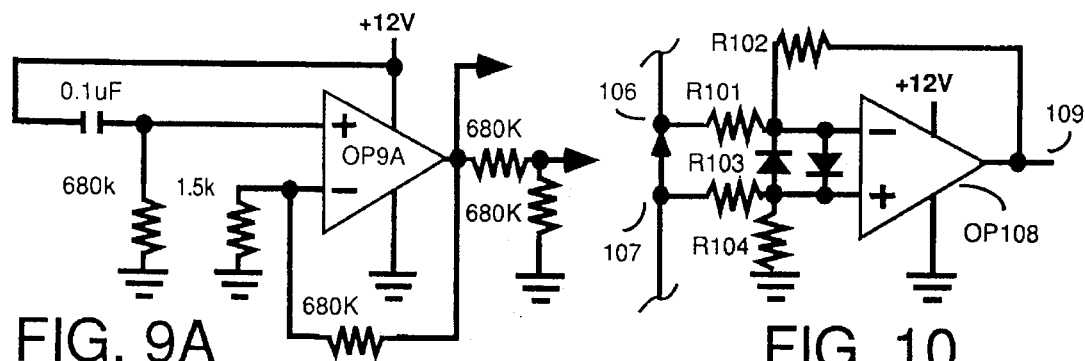
FIG. 9A illustrates one additional example of transducer means that would yield information on the ignition switch more conveniently than direct connections at the ignition switch contacts themselves.
FIG. 10 shows a way of providing a logical signal by virtue of measuring and amplifying the voltage drop across two relay contact terminals.

Quick manual changes will different schemes of lighting: the blinking rate determines, as seen in the algorithm, the rate of checking the earliest moment when the light switch is turned to the OFF position while the invention is still timing itself in the process of automatically de-energizing a set of lights for the user. This situation happens when a user of an improved vehicle turns the ignition switch to the STOP mode while the light switch is in the HEAD or PARK position, then decides to turn on the park lights for an extended period (10 minutes) before going away for a while. It is obvious that, without opening the contact terminals of the controlled switch means, it would be difficult to sense the logic level change which is caused by the change of the light switch from the PARK or HEAD position to the OFF position, because the service of the sensing resistor across each pair of controlled switch means contact terminals is now lost by the shorting of these contact terminals. As said, it would be difficult, but not impossible, because the sensing of this particular change in the light switch from PARK or HEAD position to the OFF position can be done, as one of the least difficult solutions, by an electronic transducer means with additional hardware in the form of a high-wattage, low-resistance resistor suitably located ill series with each pair of relay contact terminals to drop across that resistor a small voltage proportional to the current flowing through it. This low-resistance resistor even can be ill the form of the relatively small resistance which is formed naturally across the closed contact terminals of the concerned controlled switch means. This small voltage would be zero, practically, when the light switch is in the OFF position, and about 0.1 to 0.3 volt in practice, when the lights are turned on by the light switch through these contact terminals which are closed by the controlled output. It would require further suitable amplification of said small voltage to bring it to usable logic levels, by means of a low-power operational amplifier, configured in differential amplifier if necessary, as can be seen in FIG. 10. Points 106 and 107 of FIG. 10 represent a pair of contact terminals of a controlled switch means. Resistors R101, R102, R103 and R104 may be chosen along with operational amplifier OP108 to be connected as in FIG. 10 to amplify the small voltage drop across terminals 106 and 107 to produce two distinct logic levels at output 109 to be used to sense whether there is a current above a certain value flowing across these terminals. The two diodes connected in parallel and inverted in front of operational amplifier OP108 act along with resistors R101 and R103 to protect in practice the inputs of the operational amplifier from the high-voltage surges between contact terminals 106 and 107. To be usable in this application, operational amplifier OP108 has to consume current in the order of tens of microamperes only in operation. One circuit similar to FIG. 10 would be needed for each pair of contact terminals: or additional resistors with a single OP108 can be used to monitor several pairs of contact terminals according to the well known resistor-transistor-logic (RTL) technology. It can be appreciated that this solution in any form would cause added cost and bulkiness, and would diminish the general reliability of the invention. Since there is absolutely no need for the energized lights which are in the process of waiting to be de-energized automatically, to stay on constantly, this invention prefers the elegant and beneficial use of the blinking solution. It is also easy to verify that adopting the algorithm of FIG. 5A and FIG. 5B, and the two rates of blinking of one second for the short moment operation and two seconds for the extended period operation, it would require a small fraction of a second after the ignition switch is turned to the STOP mode before the user can turn the light switch to the OFF position, wait for a little over a second (or a small fraction of a second if a power MOSFET is used as a controlled switch means) and then to the PARK position again to be in the automatic extended-period time delay operation, if this operation is wanted instead of the more-likely useful short-moment time delay operation. It can be seen likewise that an interval of a little over two seconds, (or a small fraction of a second if a power MOSFET is used as a controlled switch means), would be required when a user is trying to lengthen an on-going extended period with another extended period by turning the light switch to OFF, waiting for a little over two seconds, (or a small fraction of a second if a power MOSFET is used as a controlled switch means), and turning the light switch to PARK or HEAD again.

Intrinsic value of desirable lighting when wanted: 90 percent or more of on time versus 10 percent or less of off time yields virtually the same useful lighting energy as 100 percent on time, thanks to the thermal inertia of the light tungsten filaments. When a power MOSFET is used as the controlled switch means, the example of 1 ms off and 250 ms on would be completely indistinguishable from the continuous on energizing.

Added benefit of built-in diagnostics as for the correct operations of the invention: the blinking of the lights in the automatic modes visible despite shows off time, serves to indicate that the invention functions correctly in short-moment mode, if the rate is about one second, and in extended-period mode, if the rate is about two seconds.

It can be seen, from the reading of the algorithm, that it would be extremely easy to modify to have the extended period to last 30 minutes instead 10 minutes, (for instance, by simply changing the limit of CTR4 at the ENERGIZING22 TASK in FIG. 5B from 300 to 900), but it is decided that 10 minutes would make users feel more secured when they have a relatively old battery which normally does not hold very much charge as when it was new, and that one minute for short moment time delay and ten minutes for extended-period time delay would be easier to remember. Also, at the risk of rendering the invention more sophisticatedly useful but at the same time more complicated to the users, it can be seen by anyone well versed in the art of microcontroller programming, that at least one other potentially useful automatic light control by remote sensing operation may be created. Suppose, to fix the idea, that a user intentionally needs to turn on the park lights for a fixed extra extended period. e.g. 60 minutes, and then to have the invention turn them off for him automatically. This kind of need often occurs in many foreign countries where streets are narrow and not very well lit at night: parked vehicles need to be drastically visible at night from afar to avoid fender scratching by other passing vehicles. Simply modifying the above example of algorithm at suitable locations, the invention can determine a procedure of steps that the user should take to achieve what he wants. FIGS. 5C to 5G, adopted as a replacement of FIG. 5B, shows an example of implementation that works. In the place of the EXTENDED PERIOD TASK of FIG. 5B, the procedure would begin now at a modified task called MEXTENDED PERIOD TASK, for instance, entered into from FIG. 5A when there is a case in which the light switch is turned into the PARK position and the ignition is already in the STOP mode. It would then go into the extended-period operation similar to the one explained above in FIG. 5B of the algorithm, blinking the lights every 2 seconds. Any time after that, without using any extra switch whatsoever, it checks at very short intervals of time if the user would move the ignition switch sequentially in steps separated between, for instance, 0.2 and 2 seconds, in a predetermined pattern of steps, e.g., from STOP to RUN then STOP. If this pattern is recognized successfully, it would go ahead with said extra-extended-period time delay operation, blinking every 10 seconds, (with about 10 seconds on and 0.1 second off, for diagnostic benefits), for 60 minutes before stopping automatically; if not it would go on with the extended-period time delay operation, blinking every 2 seconds and continue diligently to check for said predetermined pattern of steps in the ignition switch until the end of the pre-assigned 10 minutes for the extended period.

During the particular time when the extended-period time delay operation goes on energizing the lights before the automatic turn-off, if the light switch is moved to the OFF position—while the ignition switch is still in the STOP mode—for a little over 2 seconds then to the PARK position again, the invention would go to the beginning of a full cycle of said extended-period time delay operation again while waiting for that particular sequence pattern until its own end of duration. During the particular time when the extra-extended-period time delay operation goes on energizing the lights before the automatic turn-off, if the light switch is moved to the OFF position—while the ignition switch is still in the STOP mode—for a little over 10 seconds then to the PARK position again, the invention would go, not to the extra-extended-period operation but to said extended-period operation again while waiting for that particular sequence pattern until its own end of duration; this logic being adopted to force the user to confirm his real intention about the extra-extended-period operation. Also, during said particular time when one of these two extended- or extra-extended-period operations, goes on energizing the lights before the automatic turn-off, if the ignition switch is moved from the STOP mode to the RUN mode, the operation going on at said particular time would stop and a set of lights would be energized continuously by whatever light switch turned to the on position at that moment, and the algorithm concentrates diligently on monitoring for up to 2 seconds to see if a mode STOP would happen to the ignition switch within that 2-second time. If no STOP mode happens within 2 seconds, it would logically assume that the user either is driving the vehicle as usual or he is in the process of initiating a short-moment time delay operation of the lights as described in the algorithm of FIG. 5A. It is understandable that what has been discussed for the extended-period and extra-extended-period operations as applicable to the PARK position applies also similarly to the HEAD position of the light switch, as the controlled switches, in the form of a multi-pole relay, for different sets of lights are preferably ganged together as in FIGS. 11, 11 A, and elsewhere, and, when the multi-pole relay is energized, which set of lights is on is determined by which correspondent light switch is turned to the on position. As part of the preferred algorithm, during any of the extended or extra-extended operation, any light being energized until automatic turn-off can be manually turned off any time by moving the light switch to a position wherein it is not supposed to be energized; any other lights commanded to be on by the light switch win continue to be on until the automatic turn-off.

The details of the steps in the last examples of algorithm modifications which demonstrate the great extent of modifiability of the invention are clearly depicted in the flow chart in FIGS. 5C to 5G. It is easy to see that programming steps can be added to recognize the same sequence STOP-RUN-STOP when the algorithm enters said short-moment operation in order to directed it toward said extra-extended-period operation. This obviously would make the operations of the invention easier to remember. Also, it is easily conceivable that another sequence pattern of the ignition switch, e.g., RUN-STOP-RUN-STOP can be preprogrammed in a similar manner—without absolutely increasing the cost of the control block in any way—to energize the head or park lights continuously under the responsibility of the user for manual turn-off via the light switch and requiring no ignition key for the ignition switch to be turned to RUN or ACC modes, to serve any imaginable purpose. This, understandably, provides the original operation of energizing the head or park lights by turning the light switch to the HEAD or PARK positions in a vehicle without the invention attached. In a similar manner, in lieu of a sequence pattern of the ignition switch, a sequence pattern of the light switch can be preprogrammed into the microcontroller to be recognized to direct intentionally an operation with exactly the same merits as an equivalent operation described above, albeit with a little less safeguarding for the vehicle battery against unintentional activation of the operation due to the user's own absentmindedness or due to unknowingly playing with the vehicle light switch by somebody else such as a child.

When a power MOSFET is used as a controlled switch means there would not be an effect on the life of the controlled switch if the number of turning on and off of the switch is increased beyond the number of about 100,000 common with mechanical relays limits. Also, a MOSFET can switch oil and off a lot faster than the 10 ms common limit of a mechanical relay of about 30 amps for vehicle lighting applications. Thus, when a power MOSFET is used as a controlled switch means, the above algorithm can be modified easily to switch the controlled switch means off very briefly, e.g. 1 ms, every period of for example 250 ms of on time, in order to perform the checking of the state of the main light switch in each operation, for the main purpose of being able to switch over from one operation to another quickly in a natural manner. The algorithm can be modified also to turn on the lights in a certain operation, such as the 60-minute operation, in a pulse-width-modulated fashion, with a ratio of pulse-on time to pulse-off time predetermined to satisfy the goal of such operation and at the same time saving a predetermined amount of energy of the battery which would be wasted if the lights were turned on continuously which would tend to be too bright uselessly.

Description/Operation of Controlled Switch Means

Figure 6A:
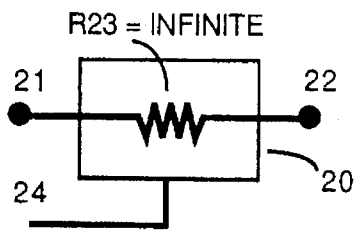
FIG. 6A and FIG. 6B show the two ideal states of a controlled switch.
Figure 6B:
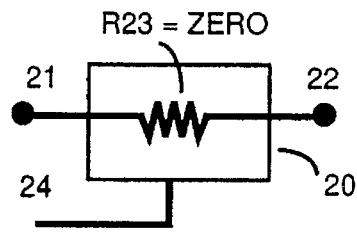

There is illustrated in FIG. 6A and FIG. 6B a controlled switch 20 in accordance with the present invention. FIG. 6A represents an ideal form of controlled switch 20 in one of the two states, in which its pair of contact terminals 21 and 22 are connected with each other by a fictive resistor R23 behaving electrically as an infinite resistance, a small fraction of a second after a first logic value is applied to input 24. Generally, this particular logic value can be any one of the two of the logic values, and depends only on how the controlled switch 20 is configured, as long as it is always consistent in affecting fictive resistor R23. This state of said controlled switch 20 is usually defined as its off or nonconducting state. FIG. 6B represents all ideal form of controlled switch 20 in the other state, in which fictive resistor R23 between its pair of contact terminals 21 and 22 changes electrically into a zero resistance, a fraction of a second after the second logic value is applied to input 24. This state of said controlled switch 20 is defined as its on or conducting state. Such art idealized controlled switch may be materialized in practical cases by the general classes of electromechanical switches characterized by a transistor of suitable technology, a thyristor, a triac, and an electromechanical relay or simply relay. However, for the application in this invention, it can be only represented best by a power MOSFET and by a single-pole, single-throw, normally-open relay of suitable rating, in terms of low on, high off resistance.

Figure 6C:
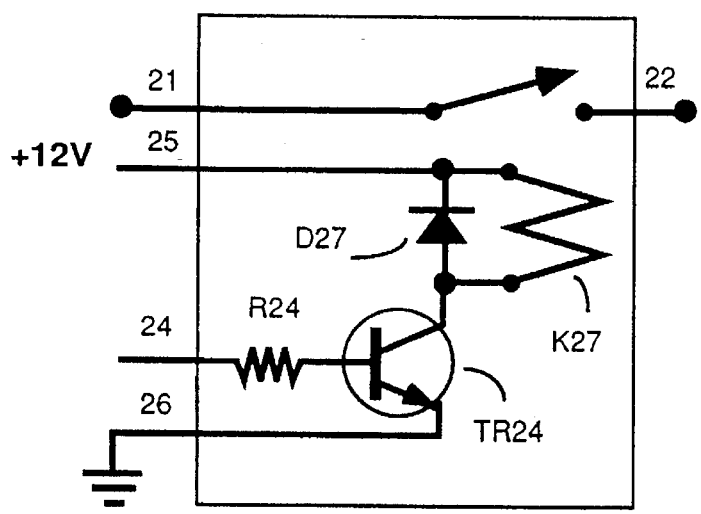
FIG. 6C illustrates a practical controlled switch means using a relay.

There is illustrated in FIG. 6C a controlled switch means using a relay circuit with its two contact terminals 21 and 22, and its input 24. Powering terminals 25 and 26, as well as internal elements D27, K27, R24 and TR24 not present in the ideal representations of FIG. 6A and FIG. 6B are practical elements to make the relay circuit approach the ideal controlled switch better. Powering terminal 25 and 26 are to be connected to high potential represented also as +12 V, and ground, respectively. Resistor R24 is to limit suitably the current into the base of transistor TR24 connected as a simple common-emitter amplifier in the figure, in order to boost the power level of the logic high value (coming from the controlled output means described above) impressed at input 24 when the conducting state of the relay is wanted, enough to actuate coil K27 suitably to close the two contact terminals 21 and 22 by electromagnetic force with a built-in shorting conductor, thus making the pair of contact terminals 21 and 22 conducting. R24 is there also to cut off the current in coil K27 when the controlled output means at input 24 is at low logic level, or when it is tristated, meaning made to behave as if it were connected through an infinite resistance. So, when a tristate or a logic low value is at input 24, transistor TR24 would cut off the current in coil K27, and a built-in spring would act on said shorting conductor to remove it from contact terminals 21 and 22, and make this pair of contact terminals non-conducting. Diode D27 is there as the well known damping element to prevent voltage surges in K27 from killing TR24. Turn-on and turn-off times of such relay in practice are about 10 ms.

Figure 6D:
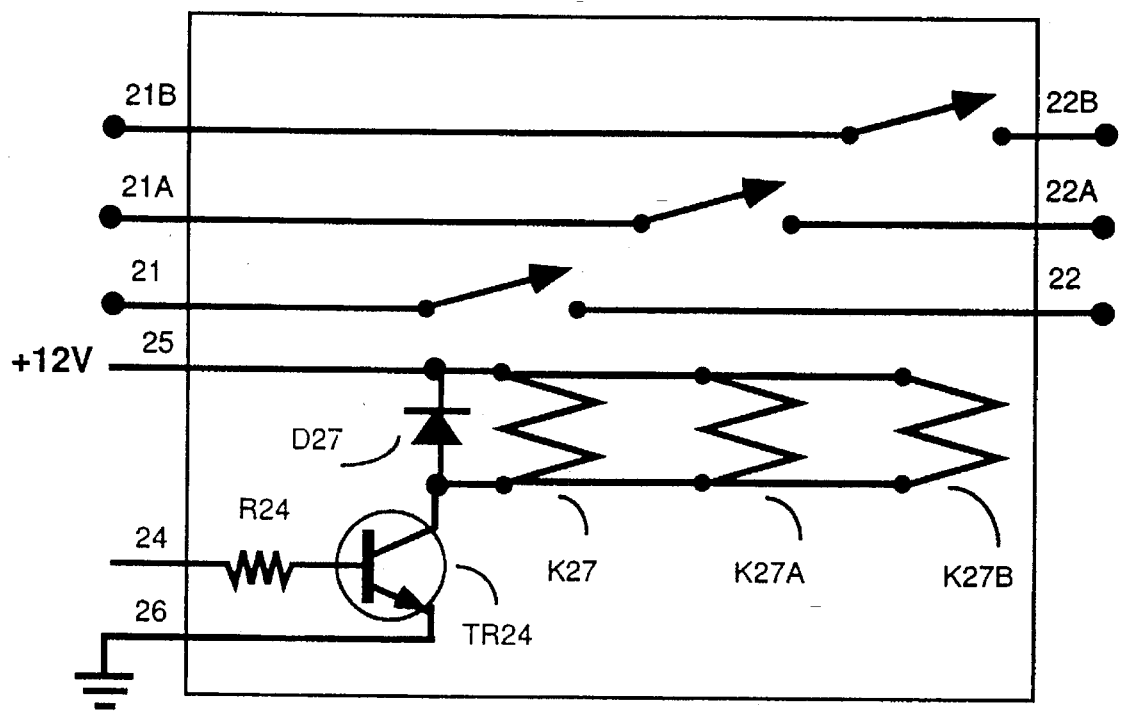
FIG. 6D shows a practical way of making a multiple-pole, single-throw relay.

In accordance with the present invention, depending upon the environment where the attachment is put to use, a controlled switch means of the invention may need more than a single pair of contact terminals 21 and 22 as it controlled switch 20. FIG. 6D shows a practical and versatile way of securing a controlled switch means with three pairs of single-throw, normally-open contact terminals, equivalent to a triple-pole, single-throw, normally-open relay. It suffices to place the coils K27A and K27B of two additional relays in parallel with the coil K27 of the relay of FIG. 6C, and use their pairs of contact terminals 21A and 22A, and 21B and 22B as the additional pairs of contact terminals. In general, this process of getting more contact terminal pairs can be repeated as long as transistor TR24 and resistor R24, reselected if necessary, can accommodate the said power boosting for the increased number of coils. This way of making multi-pole, single-throw relays is practical, as very good power relays already made for automotive uses are inexpensive only in the single-pole, single-throw, normally open type.

Figure 6E:
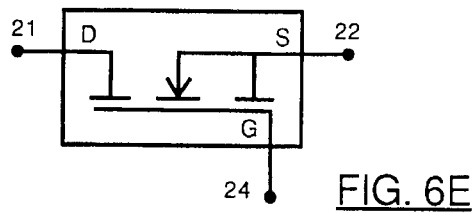
FIG. 6E illustrates a practical controlled switch means using a power MOSFET.
Figure 6F:
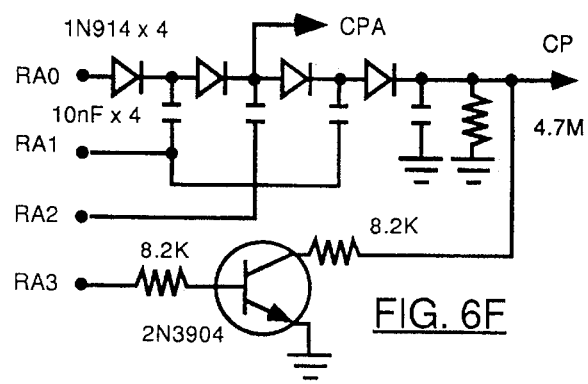
FIG. 6F and FIG. 6FF illustrate novel ways of implementing a charge pump using spared output pins of the microcontroller.
Figure 6F:
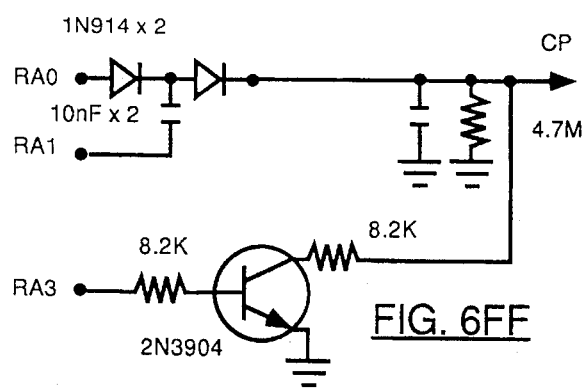

The state of the art is such that the price and the figure of merits of power MOSFETs (mainly the resistance between the drain D and the source S during conduction) are improved tremendously to the point that it is very attractive to use MOSFETs as controlled switch means in this invention. FIG. 6E depicts a MOSFET of the N-enhanced type as approaching the ideal controlled switch described in FIG. 6A and FIG. 6B. The terminals labeled D and S represent the contact terminals 21 and 22; and terminal labeled G represents the input 24 of the ideal controlled switch means. By connecting the controlled switch means of FIG. 6E so that the terminal D is positive with respect to terminal S, in the most popularly available and inexpensive ones, the voltage on input 24 as measured with respect to terminal S would be zero volts (or in general less than 2 volts) to turn this MOSFET fully off, and would be from 5 to 10 volts as measured with respect to terminal S to turn this MOSFET fully on. It is to be understood that a MOSFET of the P-enhanced type of the same power rating as its N counterpart is more expensive at the present time, but can be configured easily with the suitable arrangement of polarities to represent the idealized controlled switch used in this invention. The same is true with another power transistor of the insulated-gate-bipolar transistor (IGBT) type, when their prices and figure for merits approach the N-enhanced MOSFET. It is well known in the art of using MOSFET in controlling a load such as a set of lights of an vehicle to turn on the MOSFET as hard as possible in order to minimize the loss across the MOSFET. This means that in situations where the controlled switch is nearer to the high potential of the battery compared to the load that it controls, (commonly called the high-side drive in the industry), a voltage up to 10 volts higher than the high potential (12 volts) of the battery has to be provided to the gate G of the MOSFET when it is to be turned on hard. This voltage, however, does not have to provide a lot of current when the driving speed is relatively slow as in the case of this invention. FIG. 6F presents a novel and inexpensive way to provide such a voltage in the form of a charge pump that uses some spared output pins of the microcontroller used in the invention and some low-cost capacitors, diodes, an NPN transistor and some resistors. The implementation of this charge pump, with the numerical values in the figure coming from reduction to practice, has the valuable properties of being able to ramp up or down between zero and 10 volts the voltage between the gate G and the source S of a MOSFET in an embodiment of the invention in a time interval of less than a millisecond. The source S of the MOSFET in a high-side drive is practically at ground potential through the load when the MOSFET is off, and 10 volts beyond the batter), voltage is about 22 to 23 volts above ground. Using the inherent capacitance between the gate and the source of the MOSFET this charge pump always safely limits this voltage between gate and source of the MOSFET to less than 20 volts generally recommended at the present time. It does that by the fact that the capacitance between gate and source of the MOSFET has to increase the voltage across it with time in an exponential manner, and by the time this voltage reaches about 4 volts the MOSFET begins to conducts current into the load and raising the potential of the source S of the MOSFET above ground. Gradually, by the time the MOSFET is fully conducting, its source is already about 12 volts above ground and so, a voltage of 22 to 23 volts above ground that this charge pump puts on the gate G of the MOSFET is about 10 volts above this source S. In the embodiment of the invention, this charge pump ramps up the voltage at the point CP, to be connected to the gate G of a MOSFET, by configuring the 4 pins RA0 to RA3 of the microcontroller outputs, and by putting continuously logic high on RA0, logic low on RA3, and alternately logic low and logic high on RA1 and RA2 at a frequency of about 25 khz, until this voltage is to be brought down. When this voltage is to be brought down, RA0 to RA3 are still to be configured as outputs, RA0 to RA2 are to have logic low and RA3 is to have logic high so that the charge pumping win stop and the charge on all capacitors of the charge pump win be drained off to ground in a time-controlled manner by resistor R6F1 on the collector of the transistor 2N3904 in FIG. 6F, which now is saturating and pulling its collector practically to ground potential. If the state of RA0 to RA3 is maintained like this continuously, the voltage at the point CP win continue to stay at ground potential. Resistor R6F2 is to limit a correct current into transistor 2N3904. Resistor R6F3 of relatively high resistance, is there to drain off to ground any accumulation of charge on the gate of a MOSFET connected to CP, so that when the MOSFET is to be turned on from a long rest, it win be turned on with its gate voltage starting from zero volt to avoid a partial conduction of the MOSFET and any wrong interpretation of the logical state of the source S of that MOSFET in the control algorithm of the invention. If the microcontroller in the embodiment of FIG. 6F is powered with a voltage of 6 volts by reason of convenience, the voltage at CP can be seen as about 24 volts minus the total drop of about 2 volts through the 4 diodes of the charge pump. Thus CP receives about 22 volts after ramping up, about 10 volts above the source S of a MOSFET used in a high-side drive arrangement, which is supposed to pull the voltage of the load up to the potential of the drain D of the MOSFET, now connected to the 12 volts high potential of the battery, when the MOSFET conducts.

Figure 6G:
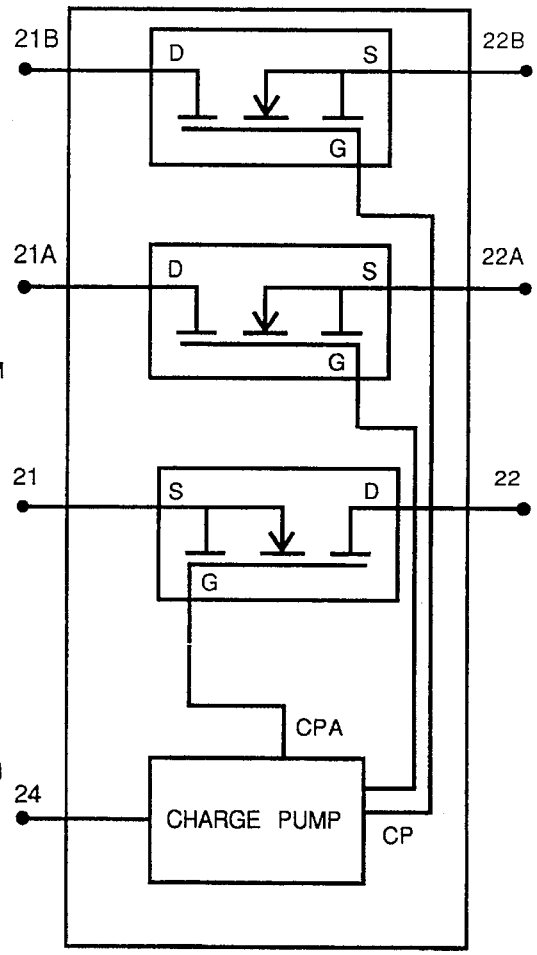
FIG. 6G shows a practical way of making a triple-pole, single-throw electronic relay out of 3 power MOSFETs connected to turn on and off together.
Figure 6G:
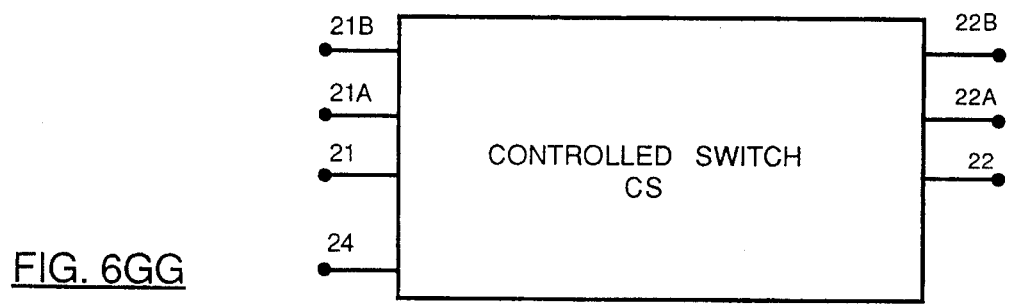

In embodiments of the invention where the source S of a MOSFET is connected directly to ground to drive a load connected between its drain D and a high potential so that in its conducting state the MOSFET connects practically the load between the high potential and ground, the arrangement is called a low-side drive by the industry. In this case, a voltage above ground of about 10 volts maximum would be sufficient. Again, if the microcontroller used in the invention is powered with about 6 volts for reason of convenience, the charge pump in FIG. 6FF could be considered. The operation of this latter one is similar to the one in FIG. 6F, except the voltage at CP in ramped-up time win be now about 11 volts instead of 22 volts as FIG. 6G shows a way of combining three MOSFET together to form a controlled switch means equivalent to a triple-pole, single-throw relay of FIG. 6D. This type of arrangement are actually made available by the industry and called conveniently an electronic or solid-state relay. As with a purely electromechanical relay, this electronic relay can be configured with a suitable charge pump presented in FIGS. 6F and 6FF to be usable as a globally high-side or a globally low-side drive. It can even be configured as partially high-side and partially low-side, on-and-off-together drives when some gates of the MOSFETs are fed with the voltage at point CP for high-side drive, and some other gates of the MOSFETs are fed with the voltage at point CPA picked off between the second and third diodes of FIG. 6F for low-side drive, with only one charge pump of the type depicted by FIG. 6F being used for both types of drives.

From hereinafter, since the novelty of the invention rests on controlled switch means encompassing all the common features of many envisioned electronic and electromechanical switches, especially the electromechanical relays and solid-state relays just presented in details, all the drawings including a controlled switch would represent such a controlled switch by a block diagram labeled CONTROL SWITCH generally depicted as in FIG. 6GG. This block diagram, depending on each preferred embodiment, may include just one or several pairs of electrical terminals, such as 21 and 22, 21A and 22A, 21B and 22B, etc. Each of these pairs of terminals behaves as if the terminals of each pair would be in hard contact with each other when the CONTROLLED SWITCH is conducting, and as if the terminals of each pail would be completely separated from each other when the CONTROLLED SWITCH is non-conducting. The CONTROLLED SWITCH is conducting or not depends upon the logical value put on the input 24 of the block diagram. This input 24 generally represents at least one line accepting at least one output from the microcontroller in the case the CONTROLLED SWITCH is an electromechanical relay or several lines as in the case when the CONTROLLED SWITCH is a solid-state relay. For clarity in cross-referencing to the related application, such block diagram would be called a relay at several places of this description. By the same token, each pair of electrical terminals of the represented controlled switch is called a pair of contact terminals, and likewise, the controlled switch is made conducting when a relay coil is relatedly said to be energized and made non-conducting when a relay coil is relatedly said to be de-energized in some parts of the description.

Description/Operation of Electrical Wire Insert Means, Electrical Wire Interrupting and Signaling Means In this part, the description FIGS. 11, 11A, 12, 12A, 13, and 14 are reproduced more or less exactly from the Related Cross-Referenced application Ser. No. 849,109, Filed Mar. 9, 1992, now U.S. Pat. No. 5,329,204, granted Jul. 12, 1994. After that, the improvements from the present invention are more easily understood.

Figure 11:
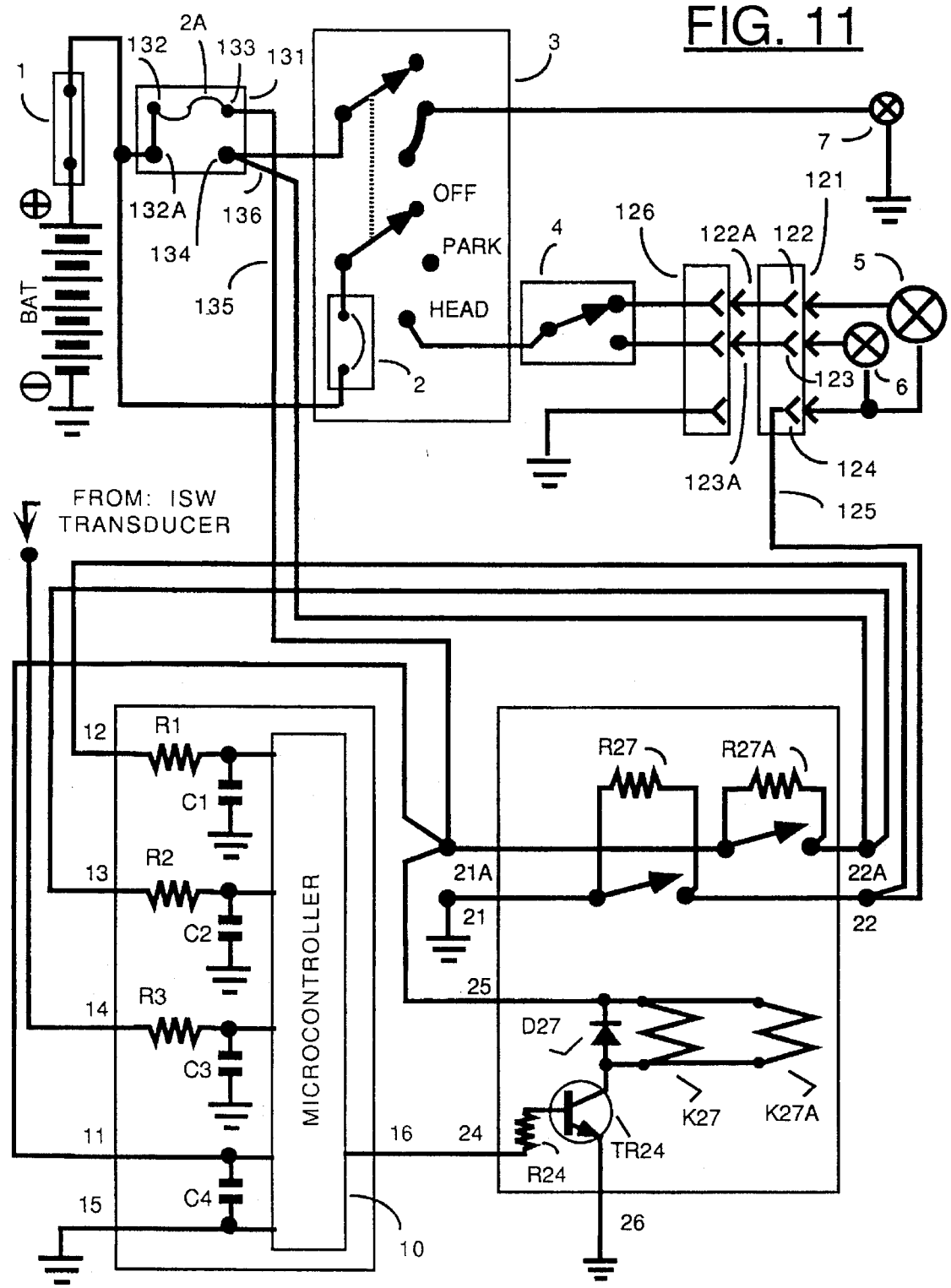
FIG. 11 represents one universally applicable wiring diagram for the embodiment of the invention destined for the retrofitting market.

As mentioned above, one object of the invention is to provide an attachment for retrofitting onto existing vehicles, the installation thereof would not need the cutting and splicing of any pre-installed electrical wires of said vehicles, nor the reaching for the electrical terminals on the housings or bodies of the light switch and of the ignition switch. The most difficult but very popular environment where the invention has to satisfy this object is an environment as depicted in FIG. 1 now included in FIG. 11, where the branch that powers the head lights is protected by a self-resetting circuit breaker 2 housed in the main light switch body. The circuit of FIG. 11 win be used for illustrating the way the invention would interrupt the different circuits to create electrical wire insert means to allow electrical wire interrupting means to insert controlled switch means and provide the sensing of the logical states of the light switch and the ignition switch without compelling the installation to access difficult-to-reach terminals of those switches. Once the basic process is understood, it is easy to extend that process to other environments depicted in FIGS. 2 and 3 as well as their minor variations. As seen in FIG. 11, the general circuit of the lighting system is protected by a fusing link 1 connected to the high potential of the vehicle. From there, the branch that powers the head lights is further protected by a self-resetting circuit breaker 2 hidden in the main light switch body; and the branch that powers the park lights is protected by a fuse 2A. The head lights made in this environment are energized in the most basic, universal case, by a combination of a position of the main light switch 3 designated as the HEAD position in series with a single-pole, double-throw latching switch 4, called commonly a dimmer switch because of the fact that it allows the head light energizing to be latchably switched alternately from a high-power, far-distance beam set 5 called high beam of the head lights to a dimmer, less powerful, nearer-distance beam set 6 called low beam of the head lights. Again, the term light switch is to mean the combination of the just-described main light switch, and the dimmer switch plus the optional flash-to-pass switch where applicable. The detailed description/operation of this popularly available head light circuit with just the main light switch and a dimmer switch win be done first. After that, the effect of the added flash-to-pass switch option win be discussed.

Figure 12:
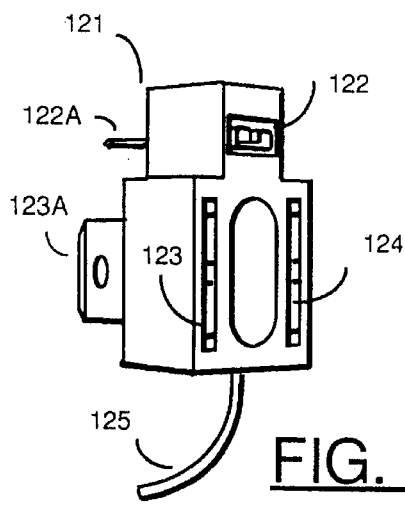
FIG. 12 and FIG. 12A show the detail of the preferred embodiment of the head light socket insert.
Figure 12A:
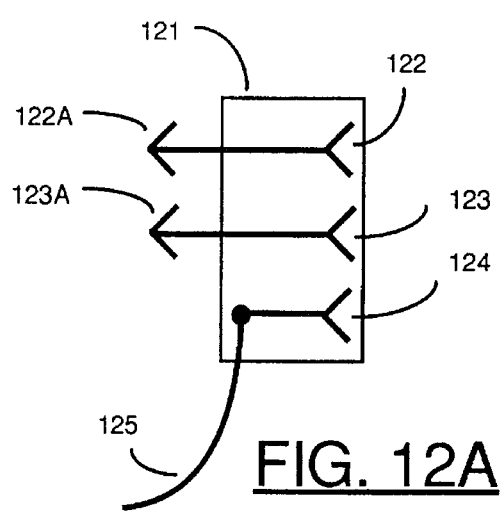

In this case of popular head light circuit, in order to be able to interrupt the head light circuits for insertion of a controlled switch means without cutting any pre-installed wires, nor having to access the electrical terminals of the light switch, the invention proposes a novel electrical wire insert means in the form of head light socket inserts. FIG. 12 shows in perspective one of those head light socket inserts, 122, for a head light that houses both the low-beam and the high-beam filaments in the same enclosure, and FIG. 12A shows its schematic diagram. In each of these inserts, while all the other wires are made continuous via the male tab terminals 122A and 123A connected respectively to female receptacles 122 and 123, the common wire, (well identified as connected ultimately to ground in FIG. 1, but could be to high potential if the two sets of filaments 5 and 6 of FIG.3 share the same protecting fuse 2CA or 2BA), going to the high beam and to the low beam filaments of each head light is disconnected in the insert, and comprises only of a female receptacle 124 destined to receive the common male tab terminal of the head light. This receptacle 124 is connected to a wire 125 to be connected as in FIG. 11, wherein contact terminal 21 of the relay is connected to the chassis ground or ground potential, while contact terminal 22 of said relay is connected to wire 125. Wire 125 and the chassis of the vehicle are parts of an electrical wire interrupting means that allows a pair of contact terminals for the control switch means to be inserted in series with the path that energizes the head lights when closed by all switches in series with that path. Wire 125 represents actually schematically two wires coming from the right and left head light socket inserts in the case where the vehicle originally has two head lights, and four wires coming from two right head light inserts and from two left head light inserts, in the case where the vehicle has four head lights, originally. In this latter case of four head lights, the high-beam on each side of the vehicle has two filaments: one is in the same first housing with the low-beam filament of that side and one is in a second housing located near said first housing. The filament of this second housing is terminated with two male tab terminals, of which one is to be connected to ground originally through its mating connector which has two female receptacles. Two head light inserts for these two extra second housings on the right and on the left of the vehicle would be made very similar to insert 122, except that there win not be the presence of male tab terminal 122A and female receptacle 122. In FIG. 11, there is shown schematically the usual head light socket 126 with its typical three female receptacles. In this embodiment of the invention, head light socket 126 is to be removed from the three male tab terminals of its correspondent combination head light consisting of filaments 5 and 6. Head light socket insert 122 then is to be removably inserted in series between said socket 126 and said three male tab terminals of said combination headlight. It is to be understood that a total of two or four head light socket insert connections is represented schematically in FIG. 11 by a single connection for the sake of clarity in reading the schematic diagram.

Figure 13:
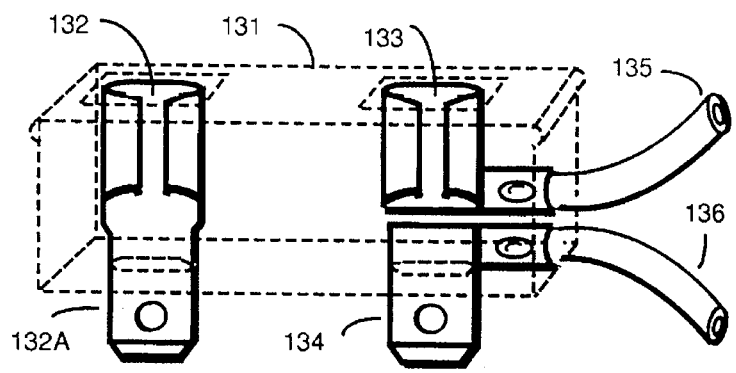
FIG. 13 shows the details of the preferred embodiment of a specific fuse socket insert.

To interrupt the circuit of the park lights without cutting any pre-installed wires, it is easier to make the electrical wire insert means as an insertion via a fuse socket insert 131 as in FIG. 13, to be inserted into the socket that used to receive fuse 2A, which is now removed from its original socket and re-inserted in the female receptacles 132 and 133 molded preferably into the plastic housing of fuse insert 131, which would play the protecting role of fuse 2A and provide the insertion of a pair of contact terminals of a controlled switch.

So, as seen in FIG. 11, the controlled switch means in this case of vehicle environment would need a relay with two pairs of contact terminals and would be the equivalent of a double-pole, single-throw, normally-open relay as described above and the electrical wire insert means and the electrical wire interrupting means of the invention comprises:

a. a number of similarly made head light socket inserts equal to the number of head lights of said vehicle; each particular head light socket insert including a mating block 121 preferably made of insulating plastic designed to be inserted and secured mechanically between a particular head light socket and a set of male tab terminals on a particular head light; said set of male tab terminals on a particular head light being originally the detachable mating connector means of a set of female receptacles molded integrally in said particular head light socket; said mating block including therein electrical continuity, up to and including said particular head light terminals, in the electrical paths designed to be connected by said light switch eventually onto a first polarity of said battery (said vehicle high potential, in FIG. 11), said electrical continuity being done by means of at least one combination of a male tab terminal such as 123A in series with a female receptacle such as 123 and integrally molded in suitable orientations in said mating block; said mating block causing therein an electrical discontinuity in the electrical ground wire leading up to the ground female receptacle of said particular head light socket; said discontinuity being done by connecting said ground female receptacle of said particular head light socket to nothing; a new electrical path 125 between said first contact terminal 22 of said relay and said particular head light ground male tab terminal being further created by integrally molding a special female receptacle 124 into said mating block and attaching it to an electrical wire means departing therefrom, said special female receptacle being so oriented as to be detachably plugged onto said particular head light ground male tab terminal; said second contact terminal 21 of said relay being connected electrically to said vehicle ground; and b. a specific fuse socket insert including a mating form 131 preferably made of insulating plastic of suitable hardness, to be inserted and secured mechanically between a specific fuse 2A detached from its specific fuse socket and said specific fuse socket itself, said mating form 131 including thereon a pair of adapter fuse male terminals 132A and 134 to be plugged into said specific fuse socket, and an adapter mating fuse socket having two female receptacles 132 and 133 therein to receive in turn said specific fuse 2A, said mating form 131 including further three electrical connections: one connection, preferably molded in said mating form, between one of said adapter fuse male terminals, 132A, on the side electrically nearer to said high potential, that is to say, on the side of said specific fuse which is connected directly to the high potential by a simple electrical wire or fusing link but not through a power consuming device such as a light filament, and the first female receptacle 132 of said adapted mating fuse socket; a second connection 135 between the second female receptacle 133 of said adapter mating fuse socket and said third contact terminal 21A of said relay; and a third connection 136 between the remaining terminal 134 of said adapter fuse male terminals and said fourth contact terminal 22A of said relay, said adapter fuse male terminals and said adapter mating fuse socket female receptacles matching the male terminals and female receptacles means adopted originally for said specific fuse and said specific fuse socket, and said specific fuse being identified by means of a wiring diagram of said vehicle as the fuse protecting the energizing path of said set of park lights. Connections 135 and 136 are defined as parts of the electrical wire interrupting means that allows the pair of contact terminals 21A and 22A of the control switch means to be electrically connected to a wire insert means which is the specific fuse socket insert, and to insert ultimately the contact terminals pair 21A and 22A in series with the energizing path of the park lights.

Description/Operation of the Light Switch Transducer Means

The novelty of the present invention rests in the improvements of the inventive features of the U.S. Pat. No. 5,329,204 and directly relates to this invention. In order to facilitate the understanding of the improvements claimed for the present invention, a direct cross-reference description of the inventive features of U.S. Pat. No. 5,329,204 is presented first, then elaborated later on over to the improvements.

In FIG. 11, preferably, the most easily accessible transducer means of the state of said light switch includes:

sensing resistors R27 and R27A, each connecting a pair of contact terminals of an equivalent of a double-pole, single-throw, normally-open relay; the resistance of each of said sensing resistors is chosen to be practically infinite compared to the resistance of any of said lights: said sensing resistors being shown shortly to be parts of the electrical transducer means of the light switch transducer means that win provide the logical state of the plurality of positions of the light switch without requiring the difficult access to the electrical terminals on the light switch;

a primary electrical connection by wiring means, serving as a part of electrical wire signaling means, between said first contact terminal 22 of said relay and a primary input 12 of the sensing input means of said control block, a secondary electrical connection by wiring means, serving as another part of electrical wire signaling means, between said fourth contact terminal 22A of said relay and a secondary input 13 of the sensing input means of said control block, and a tertiary electrical connection by wiring means between said easily accessible transducer means of the state of said ignition switch and a tertiary input 14 of the sensing input means of said control block:

a. whereby, in case 1 when said light switch is in the OFF position, said primary input would sense a logic low and said secondary input would sense a logic high by virtue of no current flowing in said sensing resistors R27 and R27 A, and of the fact that practically no current flows into or out of the inputs 12 and 13 of the microcontroller as it is made of the well known CMOS technology;

b. whereby, in case 2, when said light switch is in the PARK position, said primary input would sense a logic low as before but said secondary input coming from contact terminal 22A of the relay would sense a logic low now because of the voltage dividing effect causing this secondary input to see a voltage equal to the high potential (for example, 12 volts), multiplied by a ratio of the equivalent resistance of all the park lights 7 in parallel (about 1.5 ohms in practice), to the total of this equivalent resistance (about 1.5 ohms as said), plus the resistance of R27A (for example, 2 megohms). This calculated voltage is 0.0000089 volt; that is practically zero volt, or low level as far as the logic goes;

c. whereby, in case 3, when said light switch is in the HEAD position, said primary input, connected to contact terminal 22 of said relay would sense a logic high by the voltage dividing effect now applied to resistor R27 (for example, 2 megohms), and the equivalent resistance of the set of head light filaments 5, (assuming the dimmer switch is latched to high beams as in FIG. 11, this equivalent resistance is about 1.1 ohms in practice; if the dimmer switch was latched to the low-beam filament set 6, this equivalent resistance would have been about 1.6 ohms). The calculated voltage for this case at the terminal 22 is 11.999993 volts, (or would have been 11.999990 volts if the dimmer switch was latched to the low-beam filament set): that is practically 12 volts, or high level, as far as logic goes. In this case, said secondary input would sense a logic low, also by voltage dividing effect as explained just now in case 2;

d. whereby, in all cases, said tertiary input, being connected electrically to the ignition switch transducer means by electrical wiring means seeing as another pair of electrical wire signaling means, and being independent from the states of said light switch, would sense a logic level when said ignition switch is in the STOP mode and would sense another distinctly different logic level when said ignition switch is in the RUN mode; thus, in combination with logic processing means and memory means of said control block being preprogrammed with a suitable algorithm to capture consistently a logic value as a state of the light switch or as a state of the ignition switch, would provide the information on the present and on the past states of the position of said light switch and of the mode of said ignition switch;

e. whereby, when said relay coil is energized, the energizing of said vehicle head and park lights in conjunction with said light switch would take place exactly as if there were no modifications whatsoever made for the invention;

f. whereby, when said relay coil is de-energized, the flow of current in said head and park lights, regardless of the position of said light switch, would be reduced to zero (in the case when the light switch is in the OFF position), or to predetermined small levels (in the cases when the light switch is in PARK or a combination of main light switch and a dimmer switch to energize the high beam or low beam set of said head lights), limited by a combination of said first and second sensing resistors of said relay. These predetermined small levels of current consumption would occur when a set of energized head lights or park lights is to be automatically de-energized by this invention, when the relay coil is already de-energized by the controlled output means while the light switch is still in the PARK or HEAD positions. Even in the worst case, when the main light switch is in the HEAD position and the dimmer switch latched into the high beams, the calculated current would be about 12 microamperes, using the values of above practical examples. It is obvious that, by themselves, these levels of current consumption would be calculated to consume only about a third of the smallest battery energy after a hundred years; thus, drawing only energy from said vehicle battery in a manner which is insignificant, harmless and which would not be understandably detrimental to the normal operation of said vehicle thereafter.

Figure 11A:
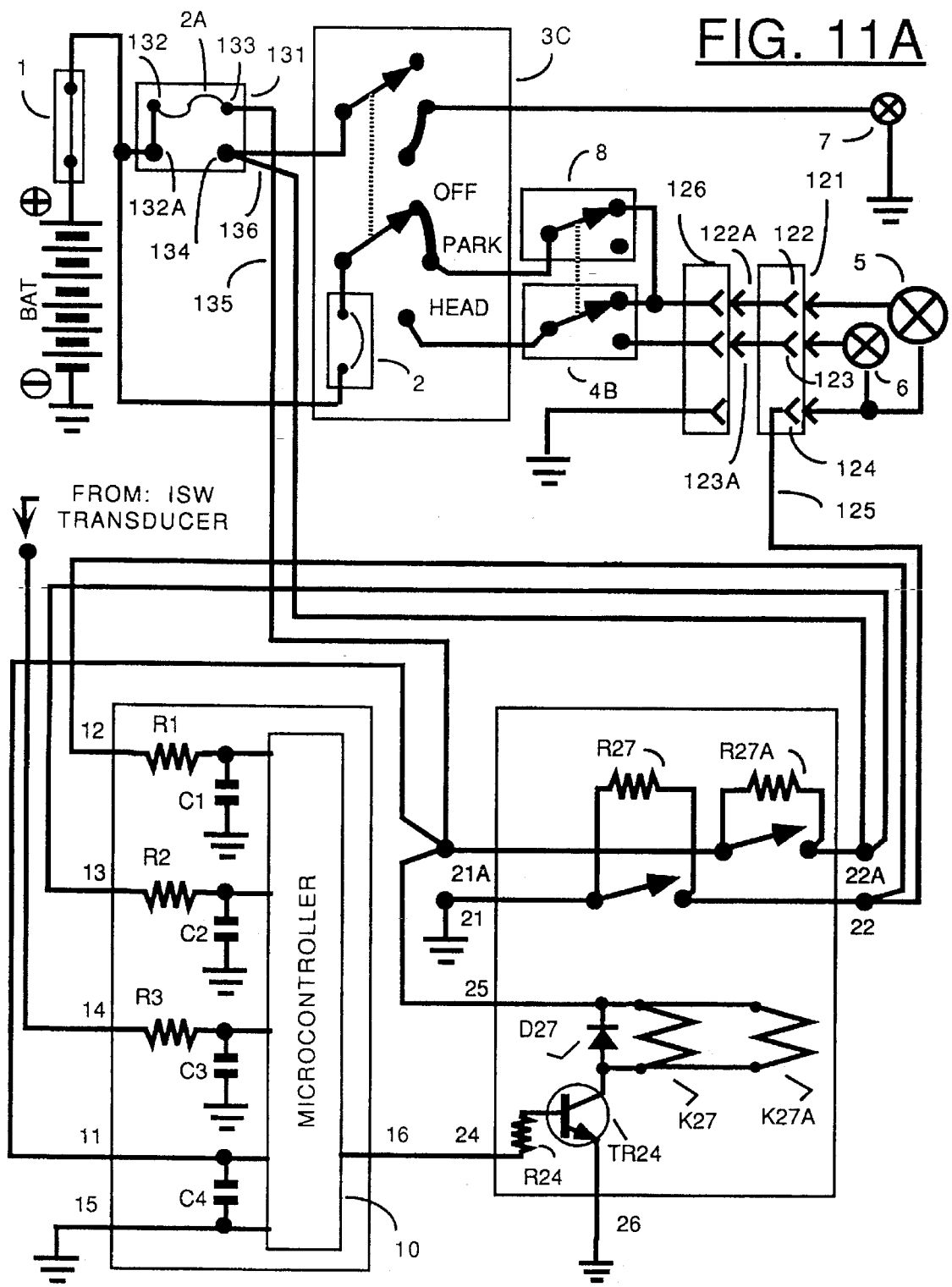
FIG. 11A illustrates the wiring diagram of FIG. 11 fitted with a flash-to-pass switch.

In the group of vehicles where the optional flash-to-pass switch assembly as depicted in FIG. 4, is part of the light switch of the light wiring system of the environment represented in FIG. 11, it would simply modify FIG. 11 into FIG. 11A, where the main light switch 3, the dimmer switch 4 of FIG. 11 are replaced respectively by the modified main light switch 3C, and the combination of switches 8 and 4B. In this environment, the main light switch 3C is very similar to the main light switch 3D of FIG. 4, except 3C now contains circuit breaker 2 therewithin to duplicate circuit breaker 2 of FIG. 11. Notice the presence of the connection between the OFF and PARK position in the modified main light switch 3C, similar to that of FIG. 4. Referring to FIG. 11A, it is easy to appreciate now that the logical significance of the action of the flash-to-pass switch assembly, when flickered to turn on the high-beam during the time when the modified main light switch 3C is in the PARK position, is simply to put this embodiment of the invention exactly in the same logical case 3 above when the schematic diagram of FIG. 11 was discussed. However, the logical significance of the action of the flash-to-pass switch assembly, when flickered to rural on the high-beam during the time when the modified main light switch 3C is in the OFF position, is to put this embodiment of the invention in a new case 4 beyond what is possible with the wiring of FIG. 11, and proper only to the wiring of FIG. 11A. That is the case where only the high-beams of the head lights are supposed to be turned on, without the park lights also being turned on as in case 3. In the preferred logic for the invention, the sensing of any light being turned on by the global action of the light switch consisting of the main light switch, the dimmer switch and the flash-to-pass switch is sufficient to energize the relay which has one or several pairs of contact terminals ganged to be on or off together. Consequently, the algorithm of the microcontroller as used for FIG. 11, as well as all the wire interrupting means and signaling means apply directly to FIG. 11A.

To improve upon the novel features of the prior art just described, the present invention would advance the idea that when a solid state switch is used as a controlled switch, it needs to be protected from damages by excessive overcurrents caused mainly by short-circuits, that can rise up to several hundred amps in this type of application. This need, in addition to a desire to build into the invention a self-protective, resetable circuit breaker of great amperage similar to the amperage of a fusing link, even when an electromechanical relay is used as the controlled switch means, for the purpose of cutting off as soon as possible any unwanted overcurrent to prevent fire hazards, points to the need for a novel way of combining the natural drop in voltage across the controlled switch when it conducts a substantial current as in the embodiment of the invention, with the spared ability of the microcontroller of the embodiment in monitoring very reliably the logical value in voltage at a certain point of the circuit of the embodiment. Using the voltage across the controlled switch itself instead of that across a low-resistance, high-power current-monitoring resistor in series with the controlled switch avoids additional costs and additional waste of energy dissipated in said current-monitoring resistor. Reduction to practice results in the circuit of FIG. 6H. In this high-side drive arrangement, a single PNP transistor TR6H serves as an amplifier with its biasing resistors R6H1, R6H2, R6H3 and R6H4 predetermined to give a voltage gain relatively unchanged with the targeted harsh temperature range of from −40 to +85 degrees centigrade. This amplifier is configured to have as input the voltage across the pair of contact terminals 21A and 22A of the controlled switch CS and as output the voltage across resistor R6H4. In operation, an input value above certain predetermined level would cause the output to rise from zero to a voltage greater than a minimum value of logic high. One end of each resistor R6H1 and R6H2 would be tied normally to terminal 21 of the controlled switch in a configuration of this nature. However, when the circuit is experiencing a short circuit current of several hundred amps, a consequential drop in the potential of terminal 21 with respect to ground happens due to the voltage drop, now substantial, through the internal resistance of the battery. One end of each resistor R6H1 and R6H2 would be tied thus preferably in a beneficial manner to the point P6H, which can be recognized easily, with the diode D6H and capacitor C6H attached to it, as memorizing for a predetermined moment the highest value of the voltage of contact terminal 21A, minus a diode drop, past the time when that voltage diminishes in value by any reason. Comparing the circuit in this drawing with the partial high-side drive part of FIG. 11 involving contact terminals 21A and 22A, R27A and R2 and matching them one on one with 21A and 22A, R6H3 and R6H2, and R2 of FIG. 6H, it can be seen clearly, from the explanation of the role of R27A as a sensing resistor for FIG. 11, that both resistors R6H3 and R6H2 in series, or just R6H3 by itself, as they are configured in FIG. 6H, can serve perfectly the sensing function of R27A of FIG. 11, during the time when the controlled switch CS is made non-conducting in FIG. 6H. To fulfill the function of circuit breaking when there is a long-lasting over-current, especially a short-circuit current, through the controlled switch CS and at the same time discriminating against the in-rushing currents that can be as much as 20 times the normal operating current of a controlled set of filaments of vehicle lights a few milliseconds during the time when the lights are first energized, a novel strategy is implemented successfully by the present invention. During the time when the controlled switch CS is to be conducting, the algorithm of the microcontroller is designed to actuate the group of inputs 24 of CS in ramping up the charge pump voltage only for a predetermined moment, e.g. one millisecond. Then, while the charge pump of CS still retains a suitable voltage, a score of microseconds are spent to examine the logic value at point I6H of FIG. 6H. If this logic value is high, the steps of ramping up the charge pump voltage and examining the logic value at point I6H are repeated again. From experience, if the current through CS is just flowing into the largest set of lights to be controlled at the worst extreme end of the temperature range, this repetition would have to be done a certain controllable number of times before the logic value at point I6H drops below logic one value, due to the natural accumulating heating of the filaments of the lights being energized that would bring their resistance to the nominal level, which in turn would lower the in-rush current through them and through CS to the normal nominal current. This nominal current is predesigned to cause transistor TR6H to stop conducting, and thus to lower the voltage at point I6H eventually to zero. In the contrary, if the current through CS is flowing into a short-circuit connecting terminal 22A of the controlled switch CS to ground, this repetition, if not halted in due time, can go on for a long time without the logic value at point I6H dropping below logic one value. This simply is due to the fact that any heating in the conducting material constituting the short-circuit would be so low and dissipating so fast as to not increasing the resistance of the short-circuit a magnitude of times by physical law as in the case of vacuum-enclosed incandescent light filaments. It is very easy to add a good margin of safety to the worst-case number of repetitions observed for the normal largest set of lights to be controlled and arrive at a number as the maximum allowable repetition number, predesigned with possible choice in the rating of the controlled switch means, to halt the short-circuit current through the controlled switch CS safely before it gets destroyed by overheating. The algorithm of the microcontroller is designed to halt this repetition and discharge the charge pump capacitors immediately when this maximum allowable repetition number is reached at any point during the time the controlled switch is to be made conducting while the logic value at point I6H remains high. The microcontroller then sets a location in it memory to remember that there is a short-circuit and branches to a routine where a check is to be made repeatedly to see whether the short-circuit has been removed by looking at the logic value of point 13 of FIG. 6H. Only when this logic value is high would the normal operation of the invention be allowed to resume again. This logic value being high means that the short-circuit has been removed and the light switch in series with the controlled switch CS is in the OFF position. There is a very comforting assurance, well proven in field tests, about using a MOSFET as controlled switch means in this invention: even by any bad luck of nature that causes the electronic circuit breaker just described to fail in any situation, the MOSFET that conducts an overcurrent for a certain time beyond normal design time would heat and burn itself open as a fuse would, before any wire going in and out of the invention is burned. In the case where the controlled switch CS is a mechanical relay, this short-circuit protection arrangement can be similarly designed easily with some changes in the algorithm of the microcontroller in making controlled switch CS conducting and some changes in resistors R6H1, R6H2 and R6H3. From the discussion of the circuit of FIG. 6H, it is clear that if resistor R6H3 alone is considered as the sensing resistor serving as a transducer means for the light switch, one of its terminals has to be connected to one predetermined contact terminal 22A of the controlled switch means while it is sufficient that its remaining terminal is not connected to the remaining contact terminal of the controlled switch means but to a point of which the potential is logically equivalent to the potential of this remaining contact terminal of the controlled switch means during the time when said controlled switch means is made non-conducting. When R6H3 in series with R6H2 is considered as the sensing resistor the logical equivalence in this last argument still holds true, as the remaining terminal of R6H2, which is not connected to R6H3, is connected to point P6H. This point can be seen, for logical purpose of the microcontroller, as having practically the same potential as the remaining contact terminal 21A of the controlled switch means when this latter is made non-conducting.

Figure 6H:
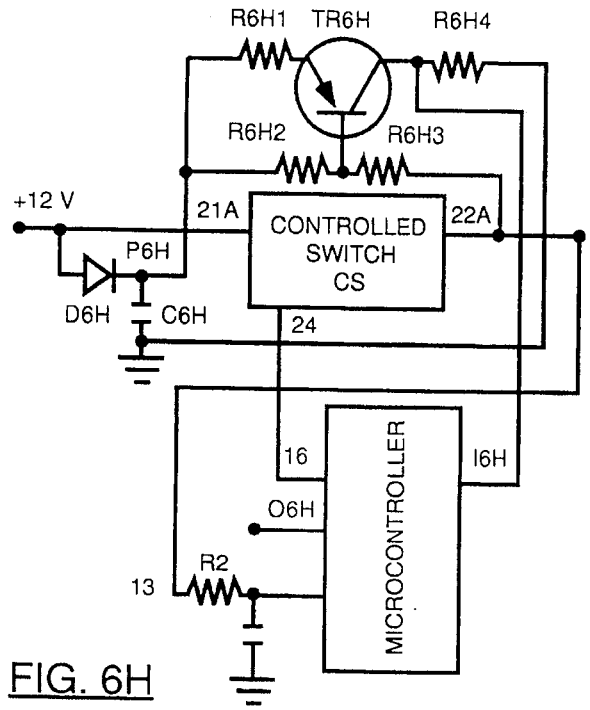
FIG. 6H shows one improved way of connecting the sensing resistor in the case where the controlled switch is electrically nearer to the high potential of the battery compared to the energy consuming load which it controls.
Figure 6J:
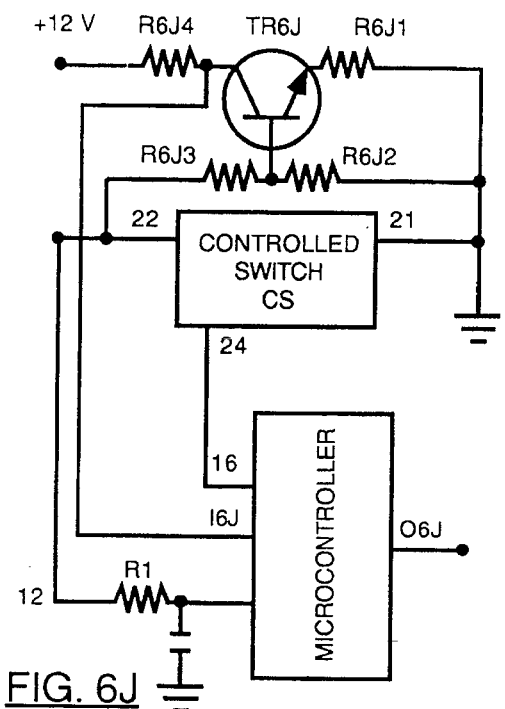
FIG. 6J shows another improved way of connecting the sensing resistor in the case where the controlled switch is electrically nearer to the ground potential of the battery compared to the energy consuming load which it controls.
Figure 6I:
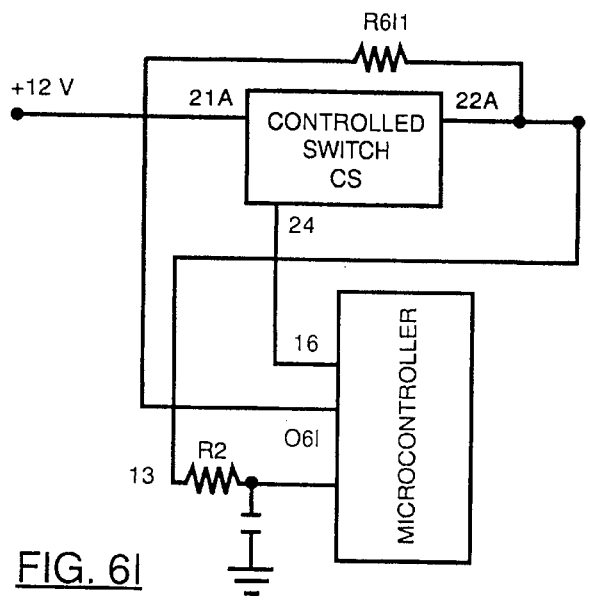
FIG. 6I shows another improved way of connecting the sensing resistor in the case where the controlled switch is electrically nearer to the high potential of the battery compared to the energy consuming load which it controls.

FIG. 6I illustrates another high-side drive configuration of the present invention in which the sensing resistor serving as a transducer means of the light switch is not connected directly across the contact terminals of the controlled switch means as in prior art. Assuming again for simplicity that the CMOS microcontroller of the invention is powered with 12 volts as the lights to be controlled by the controlled switch means CS, it is seen that one terminal of the sensing resistor R6I1 is connected to one predetermined contact terminal 22A of controlled switch means CS, while the remaining terminal of this sensing resistor is connected, not to the remaining contact terminal of the controlled switch means CS but to a pin O6I made into an output by the algorithm of the microcontroller. This output O6I would be commanded by the algorithm to output the logic value of the remaining contact terminal 21 A of the controlled switch means, namely 12 Volts here, during a brief duration when the logic value at point 13 of FIG. 6I is looked at by the microcontroller and while the controlled switch means CS is made nonconducting by the microcontroller action on the input lines 24 of the controlled switch means CS. In all other times, output O6I would be commanded by the algorithm to be tristated, behaving as a point connected to a resistance approaching infinity. Comparing the circuit in this drawing with the partial high-side drive part of FIG. 11 involving contact terminals 21A and 22A, R27A and R2 and matching them one on one with 21A and 22A, R6I1 and R2 of FIG. 6I, it can be seen clearly, from the explanation of the role of R27A as a sensing resistor for FIG. 11, that R6I1 as configured in FIG. 6I, can serve perfectly the sensing function of R27 A of FIG. 11, during the time when the controlled switch CS is made non-conducting in FIG. 6I. This way of connecting the remaining terminal of the sensing resistor only briefly, instead of permanently, to a potential equivalent to the potential of the remaining contact terminal of the controlled switch means aims at reducing to the strict minimum the average current flowing into the set of lights controlled by CS when CS is already made non-conducting and the light switch in series with this set of lights is still in the ON position. This situation is a typical situation found at the end of an automatic time-delay turn-off of the invention.

Referring to FIG. 6J, it can be seen illustrated a low-side drive configuration with short-circuit protection advanced by the present invention. Again, it is assumed for simplicity that the controlled switch means CS is an N-enhanced MOSFET and the CMOS microcontroller of the invention is powered with the same 12 volts used to energize the set of lights to be controlled by CS. It is convenient here to use a NPN transistor for the short-circuit protection amplifier function of TR6J. Resistors R6J1, R6J2. R6J3 and R6J4 are configured to cope with the wide range of temperatures from −40 to +85 degrees centigrade of the invention, without changing much in the designed voltage gain of this short-circuit protection amplifier. Ill this configuration, the voltage across the contact terminals 21 and 22 of CS is intended as the input voltage and the voltage across resistor R6J4 would be the output voltage. By design, when tins input voltage exceeds a predetermined level, the logical value at input I6J of the microcontroller, which is tied to the just-mentioned output voltage, would change from a high to a low logic level. It is easy to see that using a strategy similar to the one used in FIG. 6H, the microcontroller can discriminate successfully against the normal in-rush current m monitoring the short-circuit current to be taken care of immediately, every time when the controlled switch means CS is to be made conducting. Comparing the circuit in this drawing with the partial low-side drive part of FIG. 11 involving contact terminals 21 and 22. R27 and R1 and matching them one on one with 21 and 22, R6J3 and R1 of FIG. 6J, it can be seen clearly, from the explanation of the role of R27 as a sensing resistor for FIG. 11, that R6J3 as configured in FIG. 6J, can serve perfectly the sensing function of R27 of FIG. 11, during the time when the controlled switch CS is made non-conducting in FIG. 6J. Yet, in this configuration, one terminal of this sensing resistor R6J3 is connected to a predetermined contact terminal 22 of the controlled switch means CS, but the remaining terminal of this sensing resistor is not connected to the remaining contact terminal 21 of the controlled switch means CS as in prior art but to the base of transistor TR6J which has a potential very close logically to be equivalent to the potential of contact terminal 21 of the controlled switch means CS during the time when CS is made non-conducting.

Figure 6K:
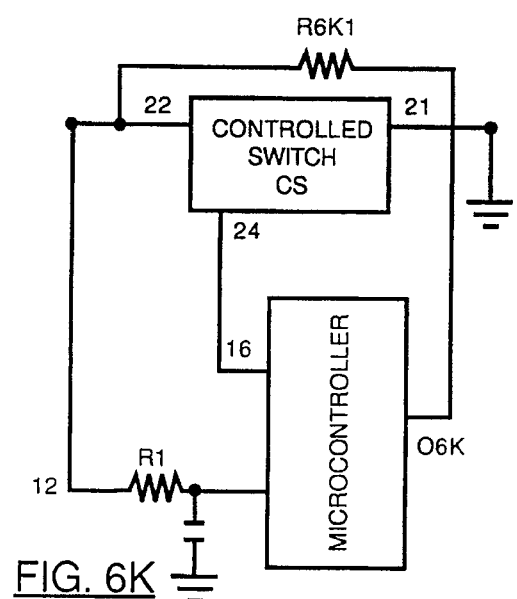
FIG. 6K shows yet another improved way of connecting the sensing resistor in the case where the controlled switch is electrically nearer to the ground potential of the battery compared to the energy consuming load which it controls.

FIG. 6K illustrates another low-side drive configuration of the present invention in which the sensing resistor serving as a transducer means of the light switch is not connected directly across the contact terminals of the controlled switch means as in prior art. Assuming again for simplicity that the CMOS microcontroller of the invention is powered with 12 volts as the lights to be controlled by the controlled switch means CS, it is seen that one terminal of the sensing resistor R6K1 is connected to one predetermined contact terminal 22 of controlled switch means CS, while the remaining terminal of this sensing resistor is connected, not to the remaining contact terminal of the controlled switch means CS but to a pin O6K made into an output by the algorithm of the microcontroller. This output O6K would be commanded by the algorithm to output the logic value of the remaining contact terminal 21 of the controlled switch means, namely ground potential here, during the brief duration when the logic value at point 12 of FIG. 6K is looked at by the microcontroller and while the controlled switch means CS is made non-conducting by the microcontroller action on the input lines 24 of the controlled switch means CS. In all other times, output O6K would be commanded by the algorithm to be tristated, behaving as a point connected to a resistance approaching infinity. Comparing the circuit in this drawing with the partial low-side drive part of FIG. 11 involving contact terminals 21 and 22, R27 and RI and matching them one on one with 21 and 22, R6K1 and R1 of FIG. 6K, it can be seen clearly, from the explanation of the role of R27 as a sensing resistor for FIG. 11, that R6K1 as configured in FIG. 6K, can serve perfectly the sensing function of R27 of FIG. 11, during the time when the controlled switch CS is made non-conducting in FIG. 6K. This way of connecting the remaining terminal of the sensing resistor only briefly, instead of permanently, to a potential equivalent to the potential of the remaining contact terminal of the controlled switch means aims at reducing to the strict minimum the average current flowing into the set of lights controlled by CS when CS is already made non-conducting and the light switch in series with this set of lights is still in the ON position. This situation is another typical situation found at the end of an automatic time-delay turn-off of the invention.

Figure 6L:
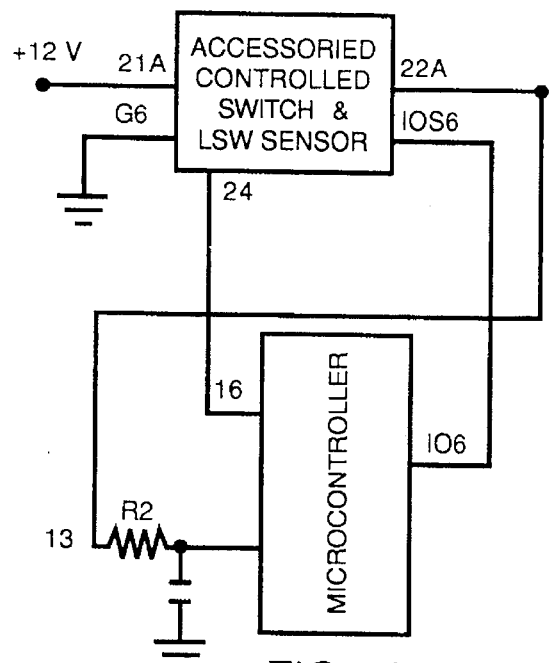
FIG. 6L represents FIG. 6H and FIG. 6I in a compact manner.

For the sake of easier understanding of further description of the invention, a few steps of compacting some already well described components into simpler forms are now proposed. Referring to the high-side drive configurations of FIG. 6H, FIG. 6I and FIG. 6L it can be seen that the CONTROLLED SWITCH CS in FIG. 6H and FIG. 6I, along with either the circuit for short-circuit protection in FIG. 6H or the strict-minimum current circuit in FIG. 6I, can be represented by a symbolic box labeled with ACCESSO- RIED CONTROLLED SWITCH & LSW SENSOR in FIG. 6L. Terminals G6 on this box in FIG. 6L represents the grounded terminal of FIG. 6H. Terminals IOS6 on this box in FIG. 6L represents either the terminal attaching to the resistor R6H4 and transistor TR6H in FIG. 6H, or the terminal attached to the left end of R6I1 in FIG. 6I. Terminals 21 A, 22A and 24 in FIG. 6L represent themselves as configured in either FIG. 6H or FIG. 6I. Terminal IO6 on the microcontroller in FIG. 6L represents either terminal I6H in FIG. 6H as an input or terminal O6I in FIG. 6I as an output on the microcontroller. In the most general engineering sense, it is conceivable that the two desirable functions involving the light switch (LSW) sensing resistor of the invention in both FIG. 6H and FIG. 6I can be combined into a double function if the junction of the left terminals of R6H1 and R6H2 in FIG. 6H, instead of being connected to point P6H as in FIG. 6H, is routed to connect to pin O6H in FIG. 6H, which is made into an output to be commanded similarly as output O6I in FIG. 6I, on the microcontroller. It: this double function is of any extra value to the invention, terminal IO6 on the microcontroller of FIG. 6L would represent symbolically two terminals, one as input and one as output on the microcontroller.

Figure 6M:
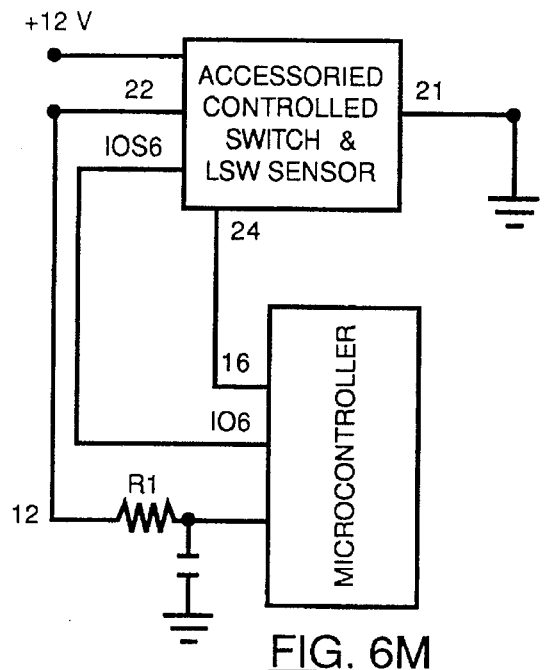
FIG. 6M represents FIG. 6J and FIG. 6K in a compact manner.

In the same idea of compacting, referring to the low-side drive configurations of FIG. 6J, FIG. 6K and FIG. 6M it can be seen that the CONTROLLED SWITCH CS in FIG. 6J and FIG. 6K, along with either the circuit for short-circuit protection in FIG. 6J or the strict-minimum current circuit in FIG. 6K, can be represented by a symbolic box labeled with ACCESSORIED CONTROLLED SWITCH & LSW SENSOR in FIG. 6M. Terminals IOS6 on this box in FIG. 6M represents either the terminal attaching to the resistor R6J4 and transistor TR6J in FIG. 6J or the terminal attached to the right end of R6K1 in FIG. 6J. Terminals 21, 22 and 24 in FIG. 6M represent themselves as configured in either FIG. 6J or FIG. 6K. Terminal IO6 on the microcontroller in FIG. 6M represents either terminal I6J in FIG. 6J as an input or terminal O6K in FIG. 6K as an output on the microcontroller.

Similarly to the discussion on terminal 106 of FIG. 6L, it is conceivable that the two desirable functions involving the light switch (LSW) sensing resistor of the invention in both FIG. 6J and FIG. 6K can be combined into a double function if the junction of the right terminals of R6J1 and R6J2 in FIG. 6J, instead of being connected to ground as in FIG. 6J, is routed to connect to pin O6J in FIG. 6J, which is made into an output to be commanded similarly as output O6K in FIG. 6K, on the microcontroller. If this double function is of any extra value to the invention, terminal IO6 on the microcontroller of FIG. 6M would represent symbolically two terminals, one as input and one as output on the microcontroller.

Figure 6N:
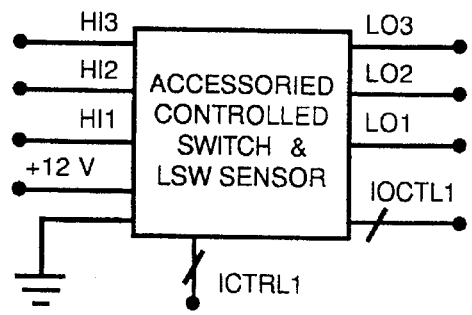
FIG. 6N represents FIG. 6L and FIG. 6M in a more compact manner yet.
Figure 6O:
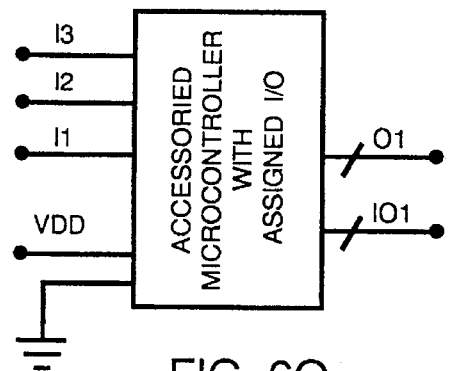
FIG. 6O represents a microcontroller with all accessories and assigned inputs/outputs pins in a symbolic box as a control block.

The final stage of compacting would use a single symbolic box labeled as ACCESSORIED CONTROLLED SWITCH & LSW SENSOR to represent a plurality of high-side drives, of low-side drives, or of both types of drive in a preferred embodiment of the invention in a certain environment of vehicle. Referring to FIG. 6N, such a box is presented with one terminal to accept the high voltage +12 V of the battery of the vehicle; a terminal for ground potential: three separate individual pairs of contact terminals labeled as HI1 and LO1, HI2 and L02, and HI3 and LO3; an input terminal ICTRL1 drawn with a slash to mean there may be multiple lines involved for the control of the controlled switch means in the box: and a combined input/output terminal IOCTRL1 drawn also with a slash to mean there may be multiple input/output lines involved, too, for the control of the accessories of the controlled switch means in the box. In this compact representation, the number of pairs of contact terminals may be increased or decreased as the application in each embodiment denmands; and the controlled switch means may be electromechanical relays, or electronic relays such as N-enhanced MOSFETs. The only thing that makes a difference with the prior art is that a particular resistor, when it is considered as a sensing resistor of the present invention, has one of its terminals connected to one predetermined contact terminal of a related particular controlled switch means and the remaining of its terminals connected, not to the second contact terminal of the related controlled switch means, but to a point of which the potential is equivalent logically to the potential of the remaining contact terminal of that related particular controlled switch means, when that related particular controlled switch means is made non-conducting. In the same idea of compacting, a microcontroller in this invention with all the optional resistors and capacitors at the input pins and at the powering pins as needed in practice can be represented as a control block by a symbolic box labeled as ACCESSORIED MICROCONTROLLER WITH ASSIGNED I/O in FIG. 60. Terminals I1, I2, and I3 represent terminals of the input means similar to terminals 12, 13 and 14 of FIG. 11, leading to individual pins of the microcontroller that are preprogrammed as inputs. Terminal 01 represents a dedicated output means. The slash on this terminal 01 means there may be a plurality of pins involved, which are preprogrammed as dedicated output pins. Terminal IO1 represents a plurality of pins preprogrammed as inputs, outputs or both. Again, the slash on this terminal IO1 means there may be more than one pins involved. Terminal marked VDD represents the powering pin to receive a powering voltage suitable for the microcontroller chosen and the convenience in the charge pump construction. The terminal connected to ground in FIG. 60 represents the external terminal to which is connected all the internal terminals of the symbolic box to be connected to ground.

Description/Operation of the Transducer Means for the Ignition Switch States

To provide the information as to whether the ignition switch is in the RUN mode or not, the most straight forward, albeit most expensive and complicated, method is to tap directly into the electrical terminals of the ignition switch.

Figure 7:
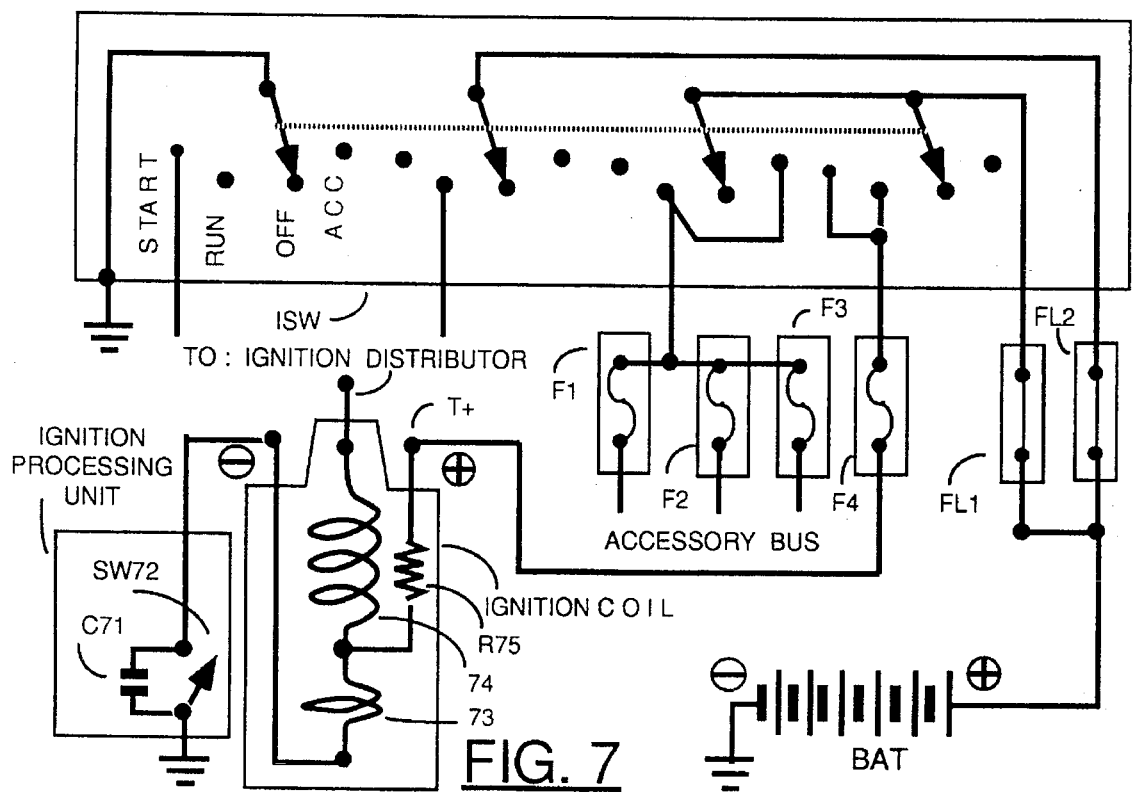
FIG. 7 through FIG. 9 depict different examples of transducer means that would yield information on the ignition switch more conveniently than direct connections at the ignition switch contacts themselves.
Figure 14:
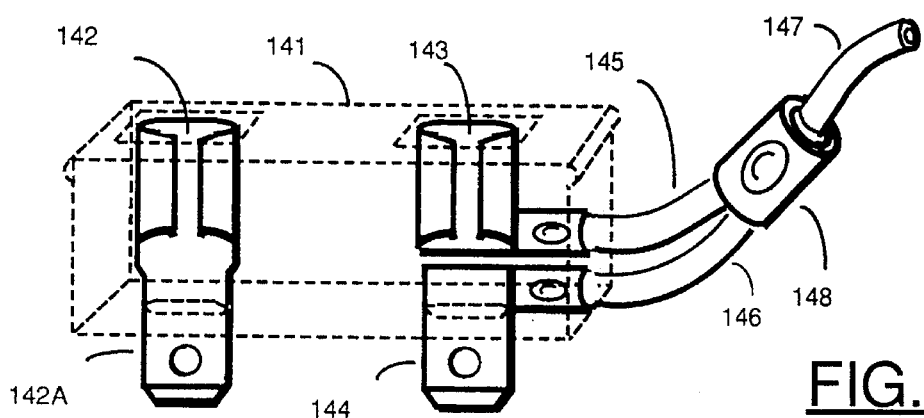
FIG. 14 shows the details of the preferred embodiment of an accessory fuse socket insert.

Without being compelled to have access to the difficult-to-reach terminals on the ignition switch body itself, the invention makes use of one of the general classes of transducers which yield perfectly, or in a just-a-little-less-than-perfectly usable manner, the wanted information in the form of a logical value to be fed to the tertiary input 14 of the sensing input means of the control block of the invention. The logic level coming from one of these general classes of ignition switch transducers is labeled as FROM: ISW TRANSDUCER in FIG. 11 and the following others, where applicable. FIG. 7 shows the schematics diagram in which the ignition switch ISW is included in the part which is relevant to the provision of the perfect transducers of the ignition switch states. In virtually every vehicle built heretofore, it is easy to trace to at least a fuse in the fuse compartment of the vehicle the presence of the high potential of the vehicle when the ignition switch is turned to the RUN or ACC modes whether the vehicle engine is running or not; and this presence of the high potential of the vehicle on such a fuse is non-existent when the ignition switch is in the STOP mode. Such a fuse can be electrically connected into to provide a convenient transducer means for the STOP mode if suitably conditioned as below. This transducer means would provide the logical state of the presence of the STOP mode if the ignition switch is in the STOP mode, and the logical state of the non-presence of the STOP mode if the ignition switch is in the RUN or ACC mode. At this STOP time, if the accessory connected to such a fuse is turned ON by its own ON/OFF switch the logic level seen by a high-internal-resistance sensing input for the microcontroller would be the logic level of ground; if said accessory is turned OFF by its own switch, this logic level would be not ground nor high potential. A suitable resistor to ground at the sensing input of the microcontroller would defined definitely this logic to be ground. Such a fuse is depicted in FIG. 7 as any of the fuses F1, F2 and F4 which feed electrical power onto several lines of accessories of the vehicle. Those lines of accessories are called commonly the accessory bus of the vehicle, and those fuses such as F1, F2 and F3 are called accessory fuses. To make a connection between one of these accessory fuses and the tertiary input 14 of the sensing input means of the control block of the invention without having to do any soldering or wire splicing, a fuse socket insert 141 depicted in FIG. 14 is proposed by this invention. It is clear from FIG. 14 that this fuse socket insert 141 is derived directly from the fuse socket insert 131 of FIG. 13 already described above, with the wires 145 and 146 being spliced during the manufacturing into a single wire 147 with a suitable splice 148. At installation time, if accessory fuse F1 was recommended by the installation instructions to be used as the ignition switch transducer for the invention on a certain model of vehicle, then the installer just would remove accessory fuse F1 from it original fuse socket, plug fuse F1 male tab terminals into the female receptacles 142 and 143 of fuse socket insert 141, and finally plug the male tab terminals 142A and 144A of fuse socket insert 141 into the original socket of accessory fuse F1. It is obvious that, for any desirable reasons, fuse socket insert 141 can be made during manufacturing by an electrical connection between male tab terminal 144 and the female receptacle 143 inside of the molded body of 141 and a single wire, for instance 145, would exit the molded body 10 of 141 and continue into wire 147.

The second perfect transducer for the ignition switch states depicted in FIG. 7 is the circuit related to the ignition coil feeding from the high potential of the vehicle. Again, it is very easy to trace—especially with a schematic diagram made commonly available to the public—the line protected by a fuse and connected only to a terminal marked in general with a+ sign on the body of the ignition coil of a vehicle, when such an ignition coil body is not buried out of sight in one big computer controlled block as in some recently built vehicles of the world. In FIG. 7, there are two electrical points concerning the ignition coil which can be tapped into to be used as transducer means the ignition switch state: the protecting fuse F4 for the ignition coil circuit, found usually in the fuse compartment of the vehicle, and the electrical terminal T+, nearest a location marked usually with a +sign on the body of the ignition coil, which is usually located under the hood of the vehicle. In FIG. 7, capacitance C71 and breaker point SW72 located in the box marked with Ignition Processing Unit represent schematically the unit that causes variations in the current in the low-voltage coil 73 for the ignition coil that receives the battery voltage through resistor R75—called a ballast resistor serving to limit the induced current in each ignition wire to a non-lethal current in case someone touches it when in operation—in order to induce a very high voltage with respect to the chassis of the vehicle(of the order of 40 kilovolts), into the coil 74 which has a tremendously higher number of turns compared to coil 73. This Ignition Processing Unit can be simply an electrical contact that mechanically makes and breaks in synchronization with the rotation of the vehicle's engine in the old technology, or replaced by a transistor thereof the collector and emitter are inserted as breaker point SW72 and the base current is controlled by an electrical contact that is mechanically or magnetically caused to make and break in synchronization with the rotation of the vehicle's engine in more recent technology under the control of a computer unit under the hood called commonly the engine command module. When the like of fuse F4 of FIG. 7 is chosen as the transducer of the ignition switch states, to make a connection between this fuse and the tertiary input 14 of the sensing input means of the control block of the invention without having to do any soldering or wire splicing, a fuse socket insert 141 depicted in FIG. 14 is again proposed by this invention. The way this fuse socket insert is used is similar to the way it is described for that of fuse F1 described above. If terminal T+ on the ignition coil body is chosen to be the transducer means for the ignition switch states, to make a connection between this terminal T+ and the tertiary input 14 of the sensing input means of the control block of the invention without having to do any soldering or wire splicing, it suffices in general to unscrew slightly a machine nut on this terminal T+ that retains the original spade terminal which is crimped on the wire coming from the fuse F4, and to insert a second spade terminal under this nut along with the other spade terminal before tightening this nut down again. This second spade terminal is already crimped during manufacturing onto a wire to be connected ultimately to the tertiary input 14 of the sensing input means of the control block of the invention.

Figures 8, 9:
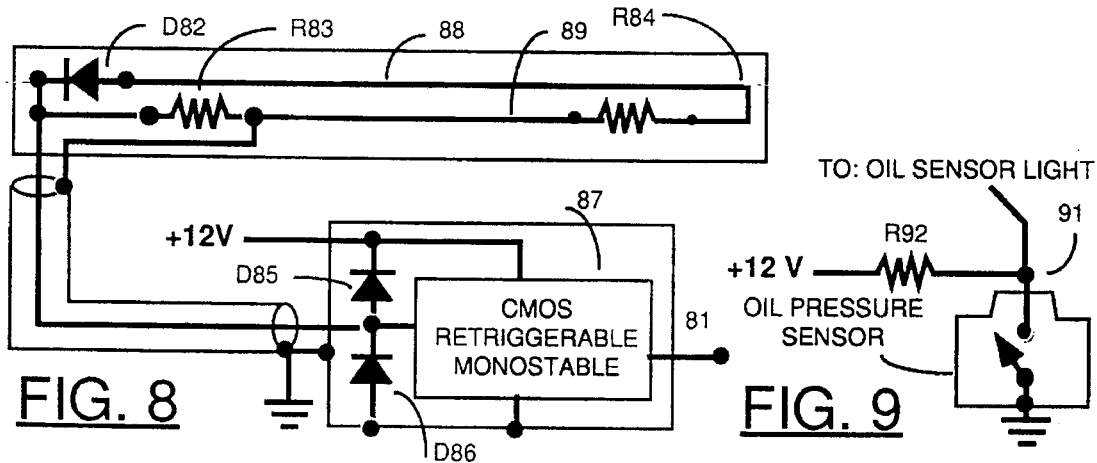

Another option of providing the transducer means of the ignition switch states is depicted in FIG. 8. In this option an idea that works is to capture the electromagnetic induction coming from one of the ignition wires going to the spark plugs of the engine of the vehicle or from the wire between the ignition coil and the distributor of the engine of that vehicle. To capture efficiently this electromagnetic induction and process it into a distinguishable logic level when the engine is not running, and into another differently distinguishable logic level when the engine is running, it is determined by experimentation that the option can use an elongated, flexible cylindrical plastic tubing assembly of about eight to ten inches of length, and about a quarter-inch of diameter, secured along one of the above identified ignition wires and containing inside on most of its length the wires 88 and 89 connected with resistors R83 and R84 and diode D82 as in FIG. 8. With the polarity of diode D82 oriented as shown, R83 chosen to be about a quarter to one megohm, and R84 about 4 to 10 Kohm, positive spikes synchronous with the rotation of the engine can be found at the point between diodes D85 and D86 in FIG. 8. These two diodes D85 and D86 are there to limit the amplitude of these spikes to between about −0.6 volt to +11.4 volts at any speed of rotation of the engine, and channel these spike to the triggering of the CMOS retriggerable monostable flip-flop 87. CMOS technology is recommended for 87 to reduce its permanent current consumption to the order of tens of microamps or less. It is recognizable by anyone well versed in the art that if the retriggerable monostable flip-flop 87 is built with a time constant greater than the lowest rate of repetition of the spikes at its input, it win continue to stay at the triggered state at its output 81, as long as the spikes continue to arrive at its input, which, in this case of FIG. 8, is that as long as the engine is running and inducing these spikes into the input of the monostable flip-flop. As soon as the engine stops running for a small fraction of a second, this monostable flip-flop win revert to the second state, which is the rest state, or non-triggered state at its output 81. If this option of transducer is chosen, a wire win connect this output 81 to the tertiary input of the sensing input means of the control block of the invention. Notice that the input of the CMOS retriggerable monostable with it clamping diodes D85 and D86 can be actuated the same way as just described with the voltage coming out of a voltage divider, composed of two suitably chosen resistors, to get a voltage of about 12 to 30 volts out of the high voltage, picked off directly with a suitably made insert, from an ignition wire going to a spark plug on the vehicle. The clamping diodes D85 and D86 win clamp this voltage to a level between −0,6 and +11.4 volts with respect to ground for the correct triggering of the monostable 87 as explained above.

Yet another option of transducer means for the ignition switch states is depicted in FIG. 9. On virtually every vehicle built up until now, there is an oil pressure sensor mounted somewhere on the crankcase of the engine which, in its most basic form, is an electrical switch which is normally closed when the pressure on one of its surfaces exposed to the inside of the crankcase where the pressure is to be sensed is a low pressure, below a certain designed value proper to the sensor. This low pressure is normally the pressure on said sensor surface when the engine of the vehicle is at rest. This electrical switch is designed to open as soon as said pressure is a high pressure, above said certain designed value proper to the sensor. This high pressure is the one that is created when the engine of the vehicle is running, and it win drop to a low pressure if the level of oil in the crankcase becomes lower than a permissible value. Terminal 91 of the oil sensor in FIG. 9 is usually connected to a light illuminating a small red transparent window marked OIL. This light is wired to turn on when the ignition switch is first turned to the RUN position but not to the position that would start the engine of the vehicle yet. This provision is to help the user of the vehicle to ascertain that the oil sensor light is in working condition, and would probably turn on to warn the user in a correct manner if the pressure to be sensed by the oil pressure sensor is lower than permissible, or in a correlated manner, if the oil level in the crankcase of the engine is lower than permissible, during the time when the engine is to be started and running after this diagnostics time. Except for the time when the oil level in the crankcase is left to be too low as to turn on this warning OIL light when the engine is running, terminal 91 of the oil pressure of the vehicle, when it is easy to access, can serve as the transducer means for the ignition switch states for the purpose of the invention if a wire is connected between terminal 91 and the tertiary input of the sensing input means of the control block of the invention. As seen easily in FIG. 9, terminal 91 would have the ground potential when the engine is not running and would have the high potential when the engine is running. To assure that these two logic levels are always usable regardless of whether the filament of the OIL warning light is in good condition or is broken, a resistor connected to the high potential at said tertiary input as represented in FIG. 9 by R92. Connected that way, R92, which can be of a wide range of values, would make terminal 91 to have the high potential as soon as the switch of the oil pressure sensor opens.

FIG. 9A illustrates one additional example of transducer means that would remotely yield information on the ignition switch more conveniently than direct connections at the ignition switch contacts themselves. Relatively fast excursions in the voltage of a voltage source in the form of pulses at well known to exist by Ohm's law in a powering circuit in which the voltage source has any internal resistance, and their amplitude is proportional to this internal resistance, during the instant when a load is connected onto this voltage source or disconnected therefrom. They even happen when a load across the voltage source varies relatively quickly a substantial amount the current drawn from the voltage source. The vehicle batteries encountered in this invention all have an internal resistance of sizes such that these relatively fast excursions in the voltage of the batteries are detectable easily by simple electronics. A significantly improved way of transducing the state of the enabling or ignition switch of a vehicle, compared to that taught by U.S. Pat. No. 4,831,310, is going to be presented as an addition to the many ways presented in the Related Cross-Reference Application, now U.S. Pat. No 5,329,204. This additional transducer means would use a simple single-supply operational amplifier OP9A to amplify to suitable saturation all the voltage excursions of interest of the battery voltage to obtain, at the output of OP9A, pulses with flat top of amplitudes varying between the two logical values perfectly usable by the microcontroller of the invention. These pulses as the natural result of turning on or off any sizable energy consuming load on a vehicle; and of special interest, of the periodical surges in current demand of the ongoing operation of the ignition system when the vehicle runs, and of the blinking of the emergency lights. The CMOS operational amplifier OP9A, along with the numerical example of resistors and capacitor used, consumes very little current (about 30 microamps) in the standby mode of this invention when the vehicle is not running, and is suitable in gain-bandwidth product to provide conditioning of these relatively fast excursions in the battery voltage into logical pulses when necessary. There is absolutely no need for filtering nor complicated analog comparator circuit in the present invention as in U.S. Pat. No. 4,831,310 commented on before. A simple and no-extra-cost microcontroller routine for detecting and counting the presence of these pulses by monitoring the changes in logical value at the output of this operational amplifier OP9A for two different predetermined periods, would reveal reliably the presence or absence of these two sets of pulses of special interest to be used in the invention while discriminating easily against other unwanted pulses on the vehicle such as power-on of the microcontroller; de-energizing or energizing of a set of lights; turn signals blinkings; door openings or closings; brakings etc. When the present invention uses the circuit in FIG. 9A as an ignition switch transducer and is attached on a vehicle, experience shows that the minimum idle speed of the gasoline-powered engine of the majority of vehicles is about 600 revolutions per minute or 10 revolutions per second. This means that the minimum number of pulses at the output of OP9A produced by the ignition system of a vehicle when it runs is about 10 pulses per second in the worst case where each revolution of the engine produces only a single pulse. Experience shows also that the minimum blinking rate of the emergency lights would produce about one pulse in every 700 milliseconds at the output of OP9A. Armed with the discriminant factors based on the periods of these two sets of pulses of interest, it is very easy to use the microcontroller of the invention to recognize each one of these two sets of pulses for the purposes of the invention. Two most desirable and popular operations pre-assigned to the invention are: the one-minute time-delay turn-off operation which the invention would go into when the light switch is ON while the engine of the vehicle goes from the RUN state to the STOP state owing, in general, to the ignition switch of the vehicle being turned from the RUN to the STOP mode; and the 10-minute time-delay turn-off operation which the invention would go into when the light switch is turned from OFF to ON while the engine of the vehicle is already in the STOP state owing, in general, to the ignition switch being already in the STOP mode. In the one-minute time-delay turn-off operation, the lights are commanded by the microcontroller to blink off invisibly for 1 millisecond for every 250 milliseconds on, and to blink off visibly briefly for about 20 milliseconds after every 1.5 seconds of being on. This visible blinking off is used for diagnostics purposes and for informing, at the right time, innumerable good Samaritans in the field that the vehicle is equipped with the invention and its user does not have to be warned about a set of lights being seemingly left on inadvertently. In the ten-minute time-delay turn-off operation, the lights are commanded by the microcontroller to blink off invisibly for about 1 millisecond after every 250 milliseconds of being on. So, in this latter operation, the lights, for all practical purposes, seem to be energized continuously in an inconspicuous manner and do not distract the user of the vehicle lights from what he or she is doing under the benefit of the vehicle's lights. Beyond the main role of automatic transducer for the ignition switch to inform the control block of the invention about when the vehicle is running or not in these two time-delay turn-off operations, this transducer can be made to inform about some additional data. It is used on the invention successfully to inform the microcontroller when a third time-delay turn-off operation is wanted. One preferable example of such operation is one no-extra-cost from one-hour time-delay turn-off operation that may come in handy to the vehicle user some time. For this, the algorithm of the microcontroller of the invention is designed to go into a routine of energizing a set of lights for a predetermined period, for example 1 second, and then de-energizing it for, for example, 1 second. While repeating this sequence, the microcontroller is to check every 250 milliseconds during about 1 millisecond to see if the state of the light switch or the STOP state of the vehicle engine has changed. Also, when the lights are supposed to be energized, they are to be energized only 50% of the time during every 2 milliseconds. If there is no change in the state of the light switch and the STOP state of the engine, the sequence would be repeated for one hour then stopped automatically, and the microcontroller would branch to the routine of sleeping and waking up from time to time in a predetermined manner to check for change in the state of the light switch and the STOP state of the engine of the vehicle. This third time-delay turn-off operation can be recognized by a check the microcontroller is preprogrammed to do at every wake-up time: after checking that the vehicle engine is not running, and after checking that the light switch is in the OFF position, the microcontroller is to check, repeatedly for a predetermined period of time equal to the maximum period of blinking of the emergency lights of the vehicle, to see if the logical value of the ignition switch transducer changes From low to high. If there is no change in this logical value until the end of this predetermined period of time, the microcontroller can go to sleep to wake up again later, as it can be sure there is no engine running nor emergency lights blinking to take care of right away. If, on the other hand, there is a change in the ignition switch transducer from low to high any time at all during that period of time, the conclusion is that there is the existence of either the vehicle engine running: of at least one door of the vehicle opening or closing; of someone stepping on the brake or flipping a turn signal while it is enabled by the ignition switch being turned to the RUN or A CC some time before this last wake-up time; or of the emergency lights blinking for the very first time after this wake-up time. In order to sort out what type of pulse it is, the algorithm, using two alterable memory locations that start from zero, as pulse counter and as total acquisition time, immediately goes into a routine of several steps:

Step 1: It updates the pulse counter and the total acquisition time, debounces as a precaution the ignition switch transducer by delaying about 10 milliseconds, then checks repeatedly for a predetermined period of time equal to the maximum period of blinking of the emergency lights of the vehicle, to see if there is a change in the logical value of the ignition switch transducer from high to low. It would jump immediately to the evaluation action when there is a change noted at any time. At the evaluation action, if the number of times on the pulse counter is less than 11 and there is such a change and the light switch is still OFF, it goes to Step 2. If not, it goes to Step 3.

Step 2: It debounces as a precaution the ignition switch transducer by delaying about 10 milliseconds, then checks repeatedly for a predetermined period of time equal to the maximum period of blinking of the emergency lights or the vehicle, to see if there is a change in the logical value of the ignition switch transducer from low to high. It would jump immediately to the second evaluation action when there is a change noted at any time. At the second evaluation action, if the number of times on the pulse counter is less than 11 and there is such a change and the light switch is still OFF, it goes back to Step 1. If not, it goes to Step 3.

Step 3: It examines the number tallied in the pulse counter. If this number is less than 5, it is preprogrammed to conclude that the pulses came from unwanted sources, and proceeds to go to sleep to wake up again later. If this number is 11, it is preprogrammed to go into another routine to check to see if the total acquisition time taken to gather these 11 pulses is equal to or less than 11 times the period of idling (around 100 milliseconds each period) of the vehicle engine. If this is the case, then it concludes that the vehicle engine is running, and would branch to an appropriate routine for the next action. If this is not the case, it concludes that these pulses came from unwanted sources or from the emergency lights blinking when this blinking is not wanted exactly for the recognition of the third time-delay turn-off operation: it proceeds to go to sleep to wake up again later. If the pulse counter number is between 5 and 10, the microcontroller of the invention is preprogrammed to recognize that the third time-delay turn-off operation is wanted, and branches to an appropriate routine for the next action.

It is clear now that this third time-delay turn-off operation can be activated very reliably and in a friendly manner if the vehicle user is to make sure that the light switch is in the OFF position, to turn on the emergency blinking and to count mentally the number of blinking up to five. After this, and as long as before the eleventh blinking arrives, the user can leisurely turn on the light switch and then leisurely turn off the emergency light blinking in order to activate this third time-delay turn-off operation. It is easy to see also that one whole hour or this third operation in practice would not render by itself the battery unusable in starting the vehicle again after that operation, as the energy consumption in one whole hour in this operation is equivalent to just about 15 minutes of continuous energizing the same set of lights. Probably, with this third operation, this is the very first time when a non-official vehicle can blink the head lights in emergency situations wherein a vehicle is immobilized and wherein the user wants to attract greater attention to the vehicle, and at the same time can have the mind at ease about the safeguarding of the battery of his vehicle when there is a possibility that he may not be there to turn off the light blinking later. Also, if only the park lights are turned on in this third operation, the user can use it to signal the location of his parked vehicle when it is parked on some narrow road that may not be illuminated enough, again, with the mind at ease about the safeguarding of the battery of his vehicle.

In any of these three time-delay turn-off operations, the microcontroller is preprogrammed further to recognize similarly when the vehicle engine starts running in order to change into energizing immediately in a continuous manner any set of lights that the user turns on; when a set of lights is just turned from ON to OFF in order to take an appropriate action; all the while, ignoring correctly the unwanted pulses that present themselves at the time when this ignition switch transducer logic is checked.

It is conceivable that, using this type of ignition switch transducer, extensions can be made easily to recognize for activating at least a fourth operation such as a 12-hour time-delay turn-off operation of only the dome lights, in which the energizing of the lights, when the blinking is in the ON time, is done only for 25% of the time every 4 milliseconds to reduce further the long-term averaged energy consumption for battery safeguarding.

Among the obvious general subclasses comprising these five options of transducer means for the ignition switch, each one has its own merits. When the invention is applied to different environments of vehicle electrical wiring systems, one win be decided upon to have the best merits for each environment, and, if necessary, the preprogramming of the microcontroller of the control block of the invention concerning said tertiary input win be done accordingly to accommodate the particular logic level representing the RUN mode of the ignition switch in that particular option of transducer means. When the microcontroller of the invention is powered with a voltage of about 6 volts for convenience, it is necessary to translate the 12-volt logic high assumed so far into a 6-volt logic high for that microcontroller. Using the built-in diode networks for protection at most input pins of the microcontroller, sometime a single predetermined resistor for current limiting is enough for that purpose, if the logic zero before translation does not stay above a certain voltage. For the transducer of FIG. 9A, it is necessary to use a two-resistor potentiometric divider, as the logic low, at the output of OP9A before translation hovers around 2 volts due to the offset caused by the lowest-cost biasing adopted at the inputs of this operational amplifier. The numerical example of this potentiometric divider simply makes sure that, after translation this logic low voltage be clearly below the minimum level of about 2.5 volts of the logic high of the microcontroller operating with around 6 volts of powering. It is conceivable that the general classes of specialized transducer means for the ignition switch can be extended to several others, for example, transducers which process the sounds or the vibrations of a running engine under the hood of a vehicle into the logic level meaning that the engine of the vehicle in question is running, and the absence of such sounds or vibrations into the logic level meaning that the engine is not running. These transducer means beyond the five best and obvious options described above belong to the well established technology of transducers and win not be described here.

Description/Operation of the Embodiment in Other Environments

Now that the wire interrupting and signaling means, the light switch transducer means and the ignition switch transducer means of the embodiment of the invention in the most difficult environment have been described in details above, it is easy to extend the understanding of the operation of the embodiment in some of the most common variations of environments before generalizing to all the possible variations encountered in the industry of vehicle manufacturing.

Figure 11B:
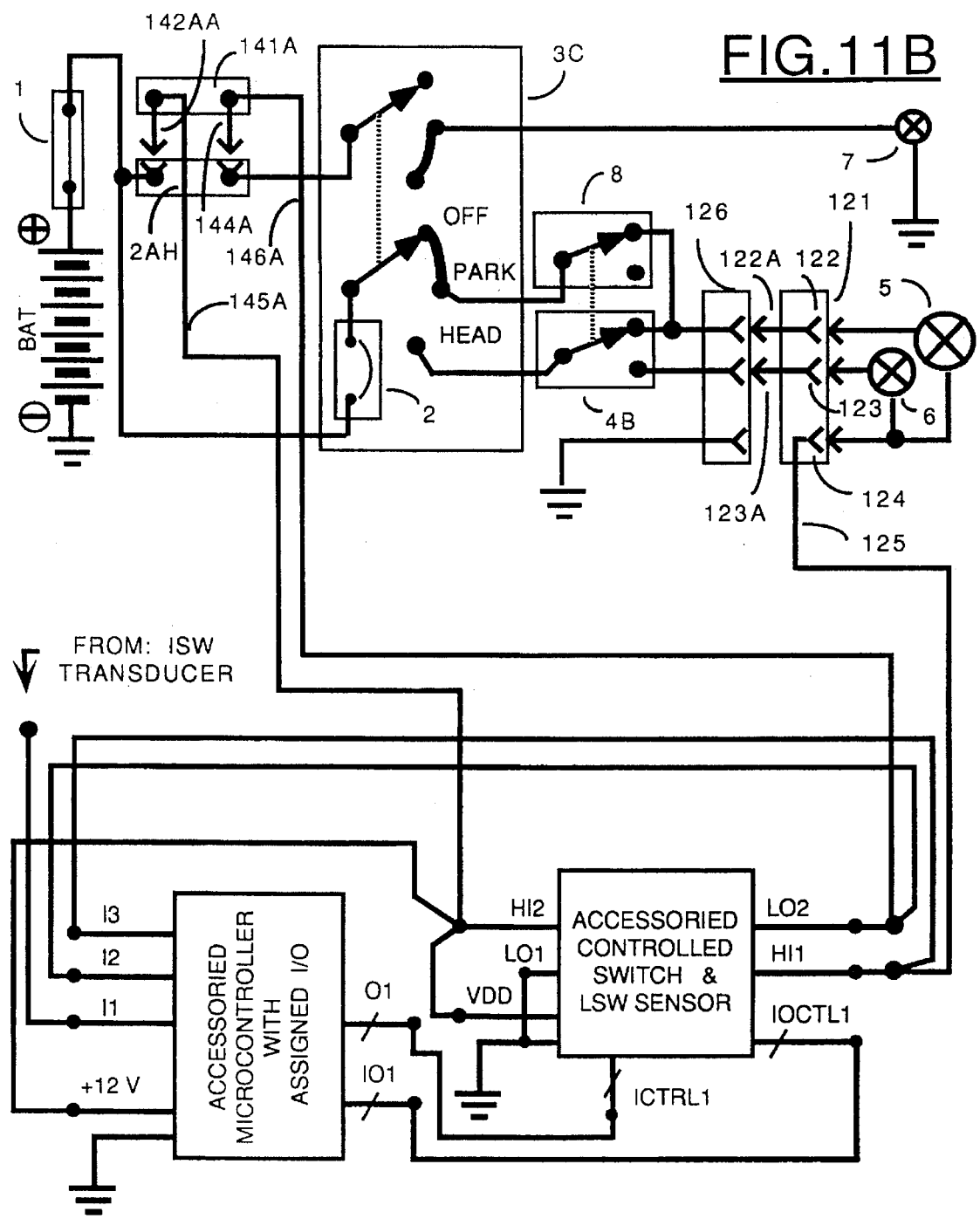
FIG. 11B illustrates the wiring diagram of FIG. 11A as modified by the present invention.
Figure 11C:
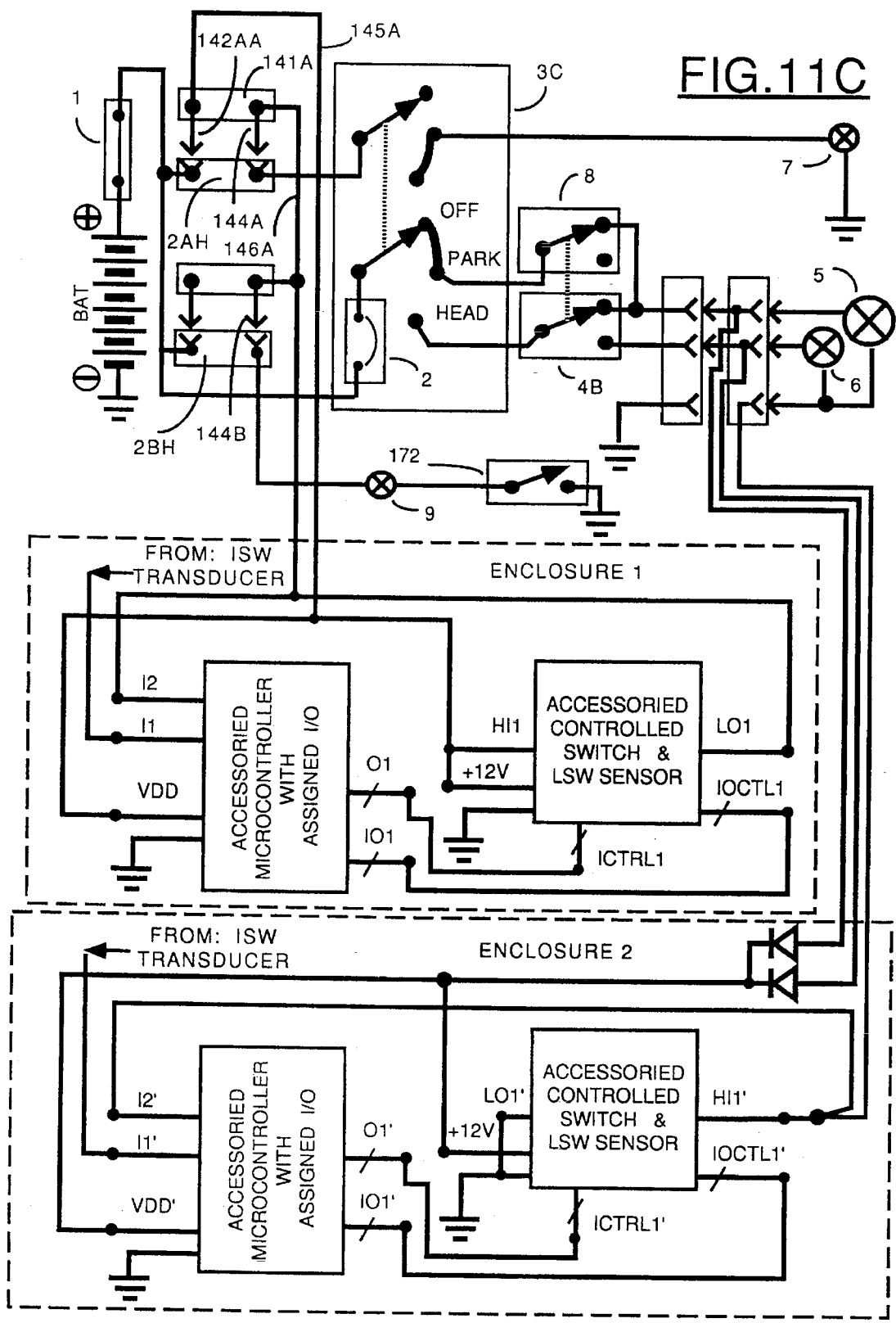
FIG. 11C represents another universally applicable wiring diagram implementing two completely separated embodiments of the invention for ease of retrofitting.
Figure 14A:
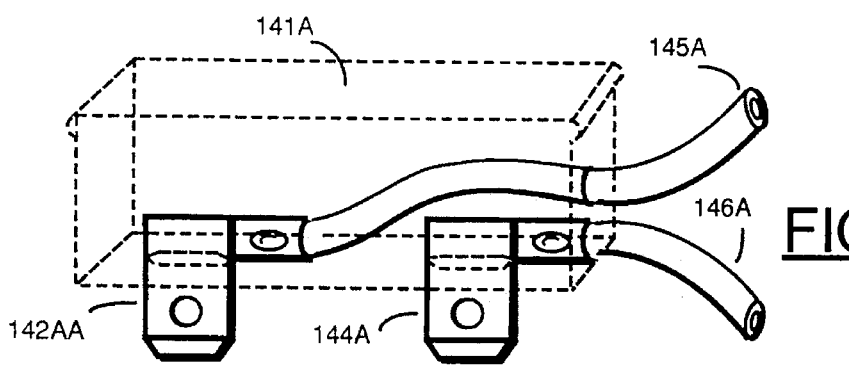
FIG. 14A shows the details of the preferred embodiment of an direct or straight fuse socket insert.

FIG. 11B illustrate what is essentially depicted in FIG. 11A reproduced from the cross-referenced related application, now U.S. Pat. No. 5,329,204. It can be seen that the control block is now compacted with the use of FIG. 60, and the controlled switch means with accessories that modifies the way the light switch transducer means is configured, is compacted with the aid of FIG. 6N. With the idea of having a very reliable circuit breaker built into the accessories of the controlled switch means, the electrical wire insert means and electric wire interrupting means do not have to conserve the service of the original fuse 2A as in FIG. 11 and FIG. 11A. They can be a lot simpler in the form of a direct or straight fuse insert as illustrated in FIG. 14A. This straight fuse insert comprises the general form and dimensions very close to the original fuse which it takes the place of in this invention. The two blades 142AA and 144A are electrically connected to two wires 145A and 146A respectively, and imbedded by molding in the plastic body 141A. In FIG. 11B, this straight fuse insert is plugged into the fuse holder 2AH which received the original fuse 2A, and the two wires 142AA and 144A am connected to the contact terminals HI2 and LO2 respectively to allow the functions of electrical wire interrupting means and light switch transducer means to take place as explained above. The wire insert and wire interrupting means for the head lights in this FIG. 11B is done the same way as in FIG. 11A, via the head light socket insert and the contact terminals HI1 and LO1 of the present accessoried controlled switch and LSW sensor block. As in FIG. 11A, the embodiment of the present invention in this FIG. 11B requires at least one single electrical wire to be connected between two groups for equipment: one located in the vehicle passenger compartment where the fuse compartment usually is located, and another located under the hood of the vehicle. A hole to be drilled, grommeted and sealed subsequently for that requirement cannot be avoided in the retrofitting using this embodiment of the invention. To circumvent this requirement, FIG. 11C presents further an elegant, albeit costlier in sale price, solution in facilitating to the highest degree the retrofitting in this environment, to the point that only a minimal skin and time is involved. The idea is to take care of the need of the invention within the passenger compartment of the vehicle with a whole set in ENCLOSURE 1—represented within a dashed rectangle— of accessoried microcontroller with assigned I/O and of accessoried controlled switch and LSW sensor; and of the need of the invention under the hood of the vehicle with another similar whole set in ENCLOSURE 2—represented within another dashed rectangle—. As seen in FIG. 11C, fuse holder 2BH of the dome lights can be beneficially connected for control with just one single blade 144B of a second straight fuse insert connected to wire 146A. The ENCLOSURE 2 includes further two diodes to supply the power to the electronics within this enclosure in a logical-OR fashion when either the low beam or the high beam set of the head lights is turned on by the light switch. In this enclosure 2, an algorithm of the microcontroller with suitable treatment of the built-in power-on reset facility can take care of the automatic switching of the head lights very easily. The adoption of the ignition switch transducer of FIG. 9A in each enclosure would certainly further reduce the number of wires going in and out of each enclosure.

Figure 15:
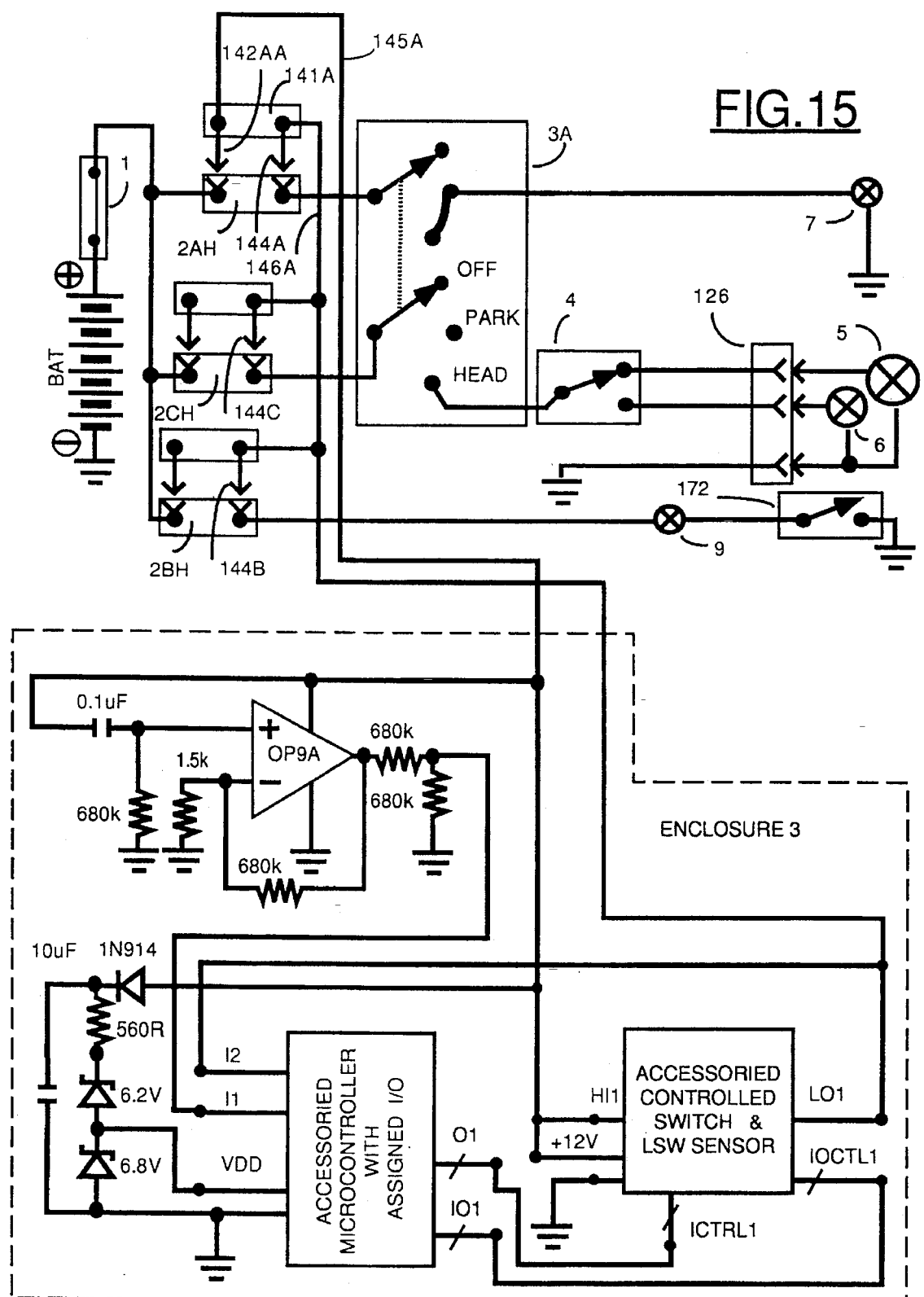
FIG. 15 represents a simpler wiring diagram compared to that of FIG. 11, in the situation where a fuse exits on the vehicle to protect the head light circuit and a dome fuse to protect the dome light circuit.

Referring to FIG. 15, it can be seen that the top part of the drawing is the schematic diagram of the prior art as depicted in FIG. 2 before, and the lower part is the embodiment of the invention as applicable to that vehicle environment. That vehicle includes a specific fuse 2A and a dedicated fuse 2C, and a dome fuse 2B located in the easily accessible fuse compartment of said vehicle, said specific fuse 2A being designed to protect the path energizing said park lights and said dedicated fuse 2C being designed to protect the path energizing said set of head lights, and said dome fuse being designed to protect the path energizing the dome lights. Comparing FIG. 15 with FIG. 11, it is clear that many elements are the same and thus labeled with the same numerals. The elements which are slightly different in the two drawings are labeled with slightly different names, e.g., 3 for the main light switch in FIG. 11 containing the circuit breaker 2, and 3A for the main light switch without such circuit breaker in FIG. 15. Thus, in FIG. 15 the electrical wire insert means and electric wire interrupting means includes three straight fuse inserts connected to wires 145A and 146A. Since the accessoried microcontroller with assigned I/O and the accessoried controlled switch and LSW sensor in ENCLOSURE 3 in this embodiment can be configured to have a reliable electronic circuit breaker, all the three fuses that were plugged into the fuse holders 2AH, 2BH and 2CH do not have to be conserved, and all of these fuses are replaced altogether by the electronic circuit breaker in ENCLOSURE 3. This is depicted by the way there is need to connect the single blade 142AA to wire 145A, and to connect simply the three blades 144A, 144B and 144C of the three straight fuse inserts together to wire 146A. Adopting the ignition switch transducer of FIG. 9A as shown in ENCLOSURE 3 reduces to two the number of wires going in and out of ENCLOSURE 3, along with the ground connection, which can be a casual—owing to the very small current carrying need- fastening of the metal enclosure, which is connected to the ground connection of the electronics inside of the enclosure, onto the metal chassis of the vehicle.

In the group of vehicles where the optional flash-to-pass switch assembly as depicted in FIG. 4, is part of the light switch of the light wiring system of the environment represented in FIG. 15, it would simply modify FIG. 15 into another figure that includes the flash-to-pass circuit exactly the same way as it would modify FIG. 11 into FIG. 11A discussed before.

In FIG. 15 there is illustrated the presence of some extra parts comprising the fuse socket insert for the dome light fuse holder 2BH, the dome light 9, the dome light switch 172, the extra connection between the blade 144B and wire 146A. Again, the addition of these extra parts to the embodiment of the invention applicable in the environment of FIG. 15 is minimal but allows to provide the extra automatic switching of the dome light which tends to be easily forgotten once it is turned on manually by its principal dome light switch: there is absolutely no warning of any kind connected to this dome light, due to the fact that it has to light the interior of the vehicle every time a door is opened, beyond the casual use during driving time for illuminating the interior of the vehicle by the manual action on its principal dome light switch. This latter switch is generally located on the body of the main light switch of the vehicle, and is latched to close the dome light circuit or be in the ON position by turning the main light switch knob of the vehicle counterclockwise to its extreme until it clicks, and is latched to open the dome light circuit or be in the OFF position by turning the main light switch knob of the vehicle clockwise slightly until it clicks again. The installation of the extra parts to achieve the extra benefit concerning the dome light does not require at all the cutting and splicing of any pre-installed wires, nor the reaching of the terminals on the body of any light switch whatsoever. Referring to FIG. 15, this object is achieved with the use of a straight fuse socket insert made exactly as the fuse socket insert 141A described above, and to be inserted into socket or fuse holder 2BH from which the original dome fuse was removed. Switch 172 is to be understood as the schematic representation of the principal dome switch on the main light switch body connected in parallel with at least two vehicle door-activated switches. Being connected in parallel, each of these door-activated switches independently win close the circuit or be in the ON position when the related door is opened, causing the dome light to be energized, and win open the circuit or be in the OFF position when the related door is closed, causing the energized dome light to turn off and stay off. The logic related to these dome light switches 172 connected in parallel is such that, when relay contact terminals HI1 and LO1 are closed, any or all of these switches when closed win energize the dome light, and said dome light win be off only when all of these switches are opened. Taking into account the fact that the resistance of dome light 9 is about 30 ohms and that the sensing resistor in the block ACCESSORIED CONTROLLED SWITCH & LSW SENSOR is again in the order of hundreds of Kohm and turning the attention to the wire signaling means related to the contact terminals HI1 and LO1 when they are opened, it is easy to calculate that the logic level at the input I2 of the control block win see a high logic level when all switches 172 are opened, and win see a low logic level as soon as any or all of switches 172 are closed. The algorithm for the microcontroller of the control block in this embodiment of the invention can be simply the same as that adopted for the environment of FIG. 15 before this dome light circuit was added. Thus, it can be seen that all the manual operations of said dome light are exactly as originally designed, and the automatic switching of said dome light in conjunction with said dome light switch and said ignition switch is the exact duplicate of the automatic switching of said head and park lights in conjunction with said light switch and said ignition switch. The algorithm is, again summarized in another manner, to cause the energizing the controlled switch means as soon as input I2 is at the logic level meaning that one or several light switches are closed, manually or by the doors action. This energizing is to stay on if and while the ignition switch transducer logic level says that the ignition switch is in the RUN mode. If after, any light is switched on by its own switch (or combination of switches) and the action of the controlled switch means when the ignition switch is sensed to be in the RUN mode, and then after that the ignition switch is turned to the STOP mode, the controlled switch means is to be energized (with blinking as explained above), for said short moment of time or until all the light switches are opened, which ever comes first. If after any light is switched on by its own switch (or combination of switches) and the action of the controlled switch means when the ignition switch is sensed to be in the STOP mode, the controlled switch means is to be energized (with another kind of blinking as explained above), for all extended period, (or as the user wants, for an extra-extended period of time), or until all the light switches are opened, which ever comes first. Notice the location of the wire interrupting means of dome light 9 with respect to the global energizing path of this dome light and its switch 172. Comparing this wire interrupting means with those found on the two paths which energize the park and head lights of this FIG. 15, one can see betted the claim that this invention allows the controlled switch means to be suitable insertable at more than a single locations in series with the electrical path that serve to energize a set of lights of the vehicle. It is obvious that the embodiment of the invention illustrated in FIG. 15 can make use of any one of the general classes of ignition switch transducers, and can include the flash-to-pass switch without modifying anything in the discussion above for the most basic environment. The ignition switch transducer means of FIG. 9A is explicitly included in enclosure 3 to show that it helps to reduce the number of wires going in and out of the enclosure, because this transducer means generally can be put on the same circuit board containing other electronic components within the enclosure. Enclosure 3 as well as enclosure 4 encountered later on shows explicitly, with numerical values, the simple network that economically translates the battery voltage of around 12 to 13.7 volts to around 6 volts for the convenient powering of the microcontroller of the invention. The diode 1N914 along with the 10-uF capacitor in this network are there to hold the voltage VDD from dropping too low during the rare times when the vehicle is started and the voltage of the battery momentarily drops way below the nominal 12 volts. The 6.8 V zener is to limit VDD safely to below the maximum allowable 7.5 V for the adopted microcontroller. The 560R resistor and the 6.2 V zener help in the translating of the voltage while making the network consume only a minimal amount of current when the microcontroller is in the sleep mode.

When a vehicle with the basic wiring as in FIG. 1 is being assembled on the factory lines or being brand new at the dealership, another attractive embodiment of the invention for automatic light control by remote sensing on a vehicle can be envisioned as a last-minute option, just before delivery to the customer. The vehicle includes in this case a readily available opportunity to design one insertion into the electrical paths energizing the lights of said vehicle as shown in the schematic diagram of FIG. 16. Comparing this diagram of FIG. 16 around the electrical points 161 and 162 and that of FIG. 1, it can be seen that the insertion for the wire interrupting means of the invention can be made on the vehicle assembly line for electrical wire bundles with one extra splicing physically just immediately after the now still unsoiled and easily identifiable fuse link 1. That extra splicing comes about as point 162 is to be spliced to wire 162A, and point 161 is to be spliced to wire 161A instead of the original splicing of points 161 and 162 together. If the insertion is to be done on a vehicle already at the dealership, the splicing would be done at two points 161 and 162 onto wires 161A and 162A after the original splicing between points 161 and 162 are identified (easily, since the wires are still unsoiled yet), and cut open first. For the rest of FIG. 16 it can be seen as follows:

a. The controlled switching means comprises the equivalent of a normally-open, single-pole, single-throw electromechanical or electronic relay energizable by the actuation from the controlled output means 01 of the control block symbolized by the rectangle labeled ACCESSORIED MICROCONTROLLER WITH ASSIGNED I/O, a first and a second contact terminals. LO1 and HI1 respectively, including a sensing resistor having one of its terminals connected to the predetermined contact terminal LO1 in this case and said contact terminals LO1 and HI1 making contact with each other only when said relay is energized, said sensing resistor being suitably determined to be of resistance practically infinite compared to the resistance of any of said lights, and included with any accessories of the controlled switch means in the symbolic rectangle labeled ACCESSORIED CONTROLLED SWITCH & LSW SENSOR;

b. the electrical wire interrupting means comprises connections 161A and 162A made with said second and first contact terminals HI1 and LO1 of said relay in series with said fuse link at points 161 and 162;

c. the electrical signaling means comprises a primary as well as secondary electrical connections by wiring means between said first contact terminal LO1 of said relay and input I2 of the sensing input means of the control block, and a second electrical connection by wiring means between one of the general classes of transducer means of the states of said ignition switch of said vehicle and a secondary input I1 of the sensing input means of the control block;

d. whereby, when the light switch 3 is in the OFF position, said input I2 would sense a logic high; when said light switch is in the PARK or HEAD positions, said primary input would sense a logic low; said secondary input, being independent from the states of said light switch, would sense a logic level when said ignition switch is in the STOP mode and would sense a distinctly different logic level when said ignition switch is in the RUN mode, thus, in combination with the memory means of said control block, would provide the necessary information on the present and past states of the position of said light switch and of the mode of said ignition switch;

e. whereby, when said relay is energized, the energizing of said vehicle head and park lights in conjunction with said light switch would take place exactly as if there were no modifications made for the invention;

f. whereby, when said relay is de-energized, the flow of current in said head and park lights, regardless of the position of said light switch, would be reduced to zero or to a predetermined small level limited by said single sensing resistor, drawing only energy from said vehicle battery in a manner which would not be detrimental to the normal operation of said vehicle thereafter.

Figure 16:
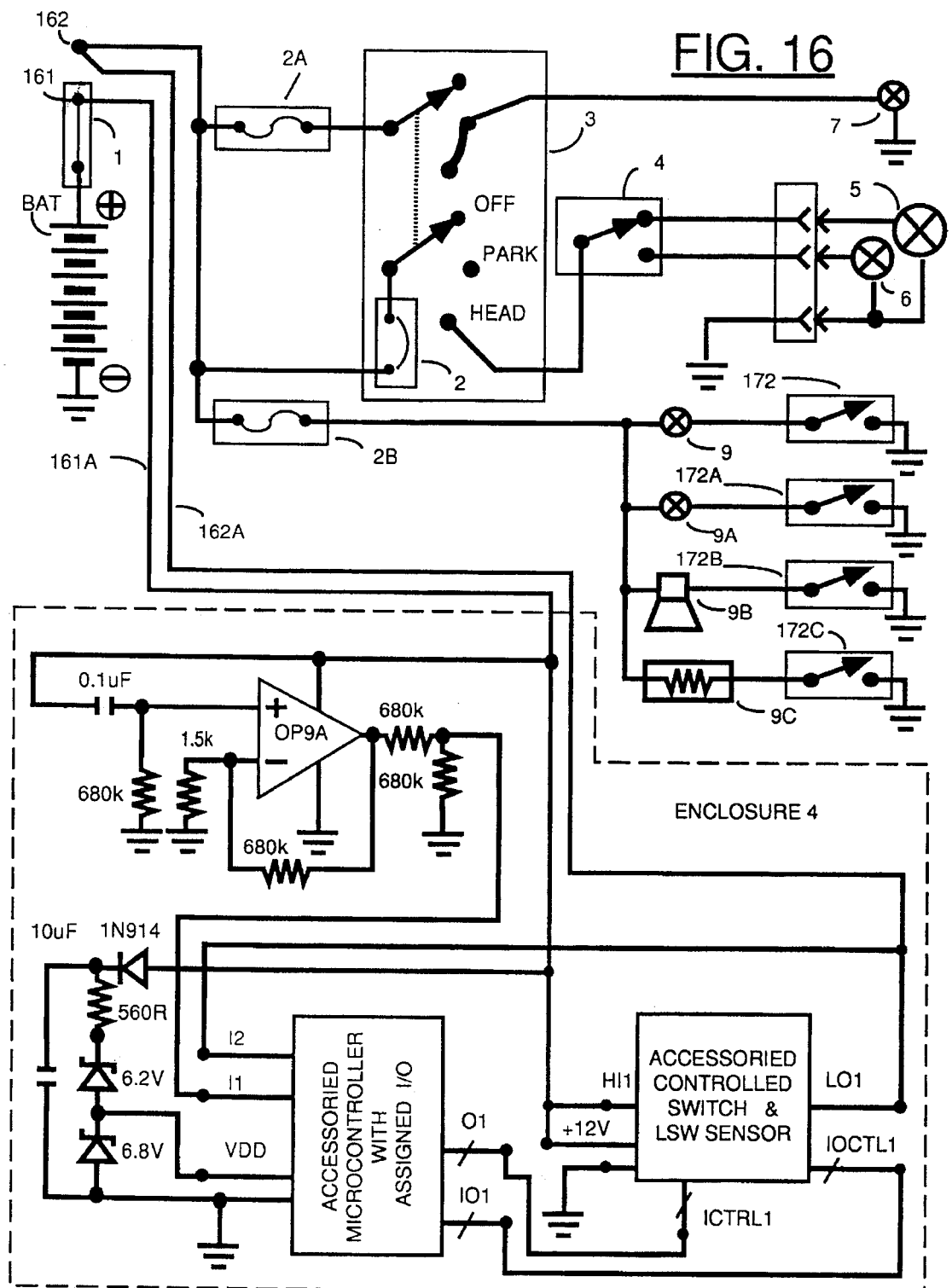
FIG. 16 represents a preferred wiring diagram to be designed into new vehicles or vehicles being manufactured that contains originally the diagram of FIG. 1.

In this FIG. 16, the dome light circuit as protected by the dome fuse 2B is included with the automatic operation exactly as explained in the embodiment of FIG. 15. It can be seen that fuse 2B protects also typically three more circuits. First, the set of lights 9A and its related switch 172A represent the lights that turn on when the main brake pedal is pushed down. Secondly, element 9B and its related switch 172B represent the main horn of the vehicle which would blast aloud when switch 172B is closed. Thirdly, element 9C and its related switch 172C represent the vehicle built-in electric cigarette lighter that would burn red hot when switch 172C is closed by pushing the lighter further into its own socket, from which it would pop out automatically when red hot. Following the discussion up until now, it is very easy to see that when any of these loads on the fuse 2B is activated by its own switch or when any or all of the head and park lights are turned on by the light switch 3 in combination with dimmer switch 4 and optionally a flash-to-pass switch, contact terminals HI1 and LO1 would be controlled to close and open according to an algorithm similar to the one in FIG. 15. The main differences between the circuit enclosed in ENCLOSURE 3 of FIG. 15 and that enclosed in ENCLOSURE 4 of FIG. 16 are that the controlled switch means in ENCLOSURE 4 has to be rated to carry a higher current caused by the additional load 9A, 9B and 9C in this new environment; and at the same time it would be beneficial that the algorithm of the control block be preprogrammed to energize the controlled switch means as soon as the ignition switch transducer senses that the engine of the vehicle runs. This action simply is to make the brake lights to respond without any delay other than the normal delay in the brake light switch 172A, which is usually imperceptible. Without this action, a fraction of a second would be normally taken by the algorithm to sense that light switch 172A is on and to energize the controlled switch means. This same reasoning applies to the horn circuit of this embodiment. A fraction of a second in the turn on for the brake lights or the horn at the needed time when the vehicle is in motion may be too dangerous to be excusable. Here again, if there is the presence of a flash-to-pass switch on the vehicle, it still would not modify at all the above discussion for the diagram of FIG. 16.

Recently, after the invention of a new type of big fuses that could carry up to 60 amps easily at low cost, the industry has moved to replace the traditional fusing link in vehicles with this new type of big fuses to be located in a big-fuse box located as near the battery as possible under the hood of the vehicle generally. This move constitutes a great opportunity for one embodiment of the present invention to supply the industry with an additional argument for greater marketability of its vehicles, a little extra earning for the manufacturers or the dealers of the vehicles, or greater ease in retrofitting many minions vehicles already on the road. This embodiment of the invention is illustrated in FIG. 17. It can be readily appreciated that the embodiment in this FIG. 17 is exactly as that of FIG. 16, except for the presence of elements 2D and 2E, and the absence of fusing link 1 and its related terminals 161 and 162 in FIG. 17 as compared to FIG. 16. In this FIG. 7, the electrical wire insert means is done with the straight big fuse insert 2E similar to that depicted in FIG. 14A, except it would borrow the general shape of the big fuse that was removed from the big-fuse holder or socket 2D. Again, the easily implemented electronic circuit breaker built as an accessory of the controlled switch means, and the inclusion of the ignition switch transducer of FIG. 9A allow this embodiment of the invention to supply the industry with a very reliable, inexpensive and compact unit for automatic light switching, battery protection, delay turn-off and free daytime running lights implementation in the form of an aluminum enclosure smaller than a cigarette pack, therefrom only two wires come out and be terminated with a big-fuse insert to be quickly and easily plugged into a designated big-fuse holder. This aluminum enclosure serves efficiently as the necessary heat sink for the electronics inside throughout the industrial range of temperatures, and would have a predesigned bracket matching suitably each model of vehicle to allow the enclosure to be fastened quickly and casually—owing to the low-current flow through this bracket from the vehicle ground to the electronic ground inside of the enclosure— onto a designated location under the hood of the vehicle. The insertion of the big-fuse insert and the fastening of the enclosure of this embodiment can be done while the vehicle is being assembled at the factory, thus earning for the manufacturer a little extra mark-up on the invention; while the vehicle is at the dealer's show room and not equipped with the invention yet, thus earning for the dealer a little extra mark-up on the invention: or while the vehicle is already in the possession of a user, thus saving the vehicle user a little extra mark-up on the invention.

The algorithm and apparatus presented in this invention are extremely general and applicable to a great majority of vehicles manufactured around the world, and are not limited to the examples illustrated herein. With the flexibility in accepting any polarity of logic (high or low) at the sensing input means of the control block and the versatility of inserting the electrical wire insert means, the electrical wire interrupting means and wire signaling means practically anywhere in the paths that energize the lights, it is evident that the wiring of the invention apparatus can be adapted easily to the prior art environment of FIG. 3, where the switching of the park and head lights is made through the ground lines instead of the high potential lines as described at several places above. It can be seen by anyone well versed in the art that tot retrofitting without having to cut and splice any pre-installed wires nor having to reach to terminals on the bodies of light switches or ignition switch, it would be easiest, in the environment of FIG. 3, to use three fuse socket inserts (as described above), in conjunction with the three fuses 2CA, 2BA, and 2AA for wire insert means and electric wire interrupting means, an accessory fuse insert (as described above), for ignition switch transducer means, and three sensing resistors on the six contact terminals of a normally-open, triple-pole. single-throw relay,which would be the controlled switch means, as the transducer means for the states of the light switch. In the environment of FIG. 3, if tilt: opportunity presents to cut and splice an electrical wire insert means between fusing link 1 and the 3 fuses, a simpler embodiment similar to that of FIG. 16 would be of advantage. Further still, if the fusing link 1 was replaced already by a big fuse, the embodiment of FIG. 17 is most advantageous. Beyond the basic retrofitting for the wiring environment of FIG. 3, if the automatic switching for dome light is desirable, an additional pair of relay contact terminal and its coil, as well as all additional dome-light fuse socket insert would be needed. Even when a flash-to-pass switch is included in the wiring environment of FIG. 3, simple analysis of the wiring circuit similar to the discussion above would determined exactly the correct logic levels to be used for preprogramming the sensing inputs of the microcontroller of the control block of the invention.

The perspective illustrations of the head light socket insert and the fuse socket inserts in FIGS. 12 to 14 are for the sockets which are by far the most popular among the modern items. A survey of all types of sockets from around the world shows that socket inserts matching the male terminals and female receptacles means adopted originally for all head light sockets and all fuse sockets can be easily derived from the discussion for the most popular ones.

It is also evident that the invention apparatus, with suitable inversion of logic and polarity on different components where necessary, can be adapted easily to the group of vehicles wherein the conventional positive terminal of the battery is connected to the metal chassis of the vehicle and serves as the common ground potential. This battery connection is simply the reverse of the connection depicted in all the drawings of this description, the latter connection being by far the most popular among all the vehicles manufactured around the world.

The microcontroller algorithm on a preferred type of microcontroller chip of the foregoing control block logic of the invention, includes the logic for said short-moment routine, said extended-period routine, and said extra-extended routine. The routines discussed so far for the ignition switch transducer of FIG. 9A, the 12-hour time-delay turn-off, as well a the use of the power-on reset and watchdog facilities of a usable typical microcontroller can be implemented very easily and would not be flow-charted here.

Those skilled in the art win recognize that the embodiments of the invention disclosed herein are exemplary in nature and that various modifications can be made therein without departing from the scope and the spirit of the invention. For example, it is clear that the embodiment depicted in FIG. 16 with everything enclosed in a metal can of a size smaller than a cigarette pack with only two electrical wires to be processed can be installed at low cost to be used on a multitude of any models of vehicles originally made with lighting circuits as in FIG. 1, FIG. 2, or FIG. 3, or their variations, as long as the people doing the installation can identify with certitude, (easily if the vehicle is relatively new), the fusing link protecting the lighting circuit. This metal can is to be fastened onto the metal chassis under the hood of the vehicle: and the two electrical wires are to be spliced in series with the fusing link wire. For this embodiment, all conventional operations of the light switch are substantially preserved, and most of the desirable improvements in automatic switching of all the lights protected by this fusing link are provided, namely, one-minute, ten-minute, one-hour, or even 12-hour (for overnight park lights on) time delay operations.

It is clear also that as long as a gas-motored, diesel-motored, steam-motored or electric-motored vehicle has electric lighting and an enabling system controlled by an enabling switch or ignition switch for enabling or disabling the mechanical powering means of said vehicle, this invention can be put easily to use thereon to provide battery protection and time delay lighting operations and other benefits as discussed above.

While the above description contains many specificities, it is to be understood that the present invention is not confined to the particular embodiments set forth herein as illustrative, but embraces such modified forms thereof as come within the scope of the following claims.

What I claim is:

1. An attachment for automatic light control and battery protection on a vehicle that has as existing equipment the following:

(a) a battery with one polarity connected to said vehicle metal chassis defined as ground potential and the other polarity defined as high potential;

(b) basic lights comprising a set of head lights electrically connected preferably in parallel and a set of park lights electrically connected preferably in parallel;

(c) an enabling system, also called the ignition system, for the user of said vehicle to enable or disable the mechanical powering means of said vehicle which, when enabled, would move said whole vehicle a predetermined way when a predetermined electromechanical action is met;

(d) a path energizing said set of head lights when closed, a path energizing said set of park lights when closed, and a path energizing said ignition system when closed, each of said paths being connected in series with said battery;

(e) a light switch having a plurality of electrical terminals thereon and a plurality of positions operating in conventional manners; and (f) an ignition switch having a plurality of electrical terminals thereon, and a plurality of modes including a STOP mode that would interrupt the enabling electrical connections of said ignition system;

said attachment for automatic light control and battery protection on a vehicle comprising, in combination:

(a) a control block including a suitable number of electrical pins, having each practically infinite internal electrical resistance assigned by preprogramming as sensing input means to garner at predetermined intervals of time the logical states of devices electrically connected thereto; a suitable number of electrical pins assigned by preprogramming as controlled output means to actuate, when energized, other devices electrically connected thereto; and logical processing means including memory means preprogrammed to decide when to energize and when to de-energize said controlled output means according to the combinations and sequences of the logical states of devices electrically connected to said sensing input means;

(b) controlled switch means having a predetermined number of pairs of contact terminals and electrically connected to and actuatable by said controlled output means for changing the electrical resistance through each of all said pairs of contact terminals of said controlled switch means from a practically infinite value to a practically zero value, and vice versa;

(c) powering means using preferably said battery to energize said control block and eventually to energize said controlled switch means on actuation from said control block;

(d) a light switch transducer means for providing on demand from said control block, the logical state of at least one of said plurality of positions of said light switch, said light switch transducer means including electrical transducer means providing two logical states out of the energizing and de-energizing of each particular one of a predetermined number of closed paths electrically interruptible by a particular one of said plurality of positions of said light switch, said electrical transducer means being made by electrically connecting a predetermined one of the two electrical terminals of a sensing resistor of predetermined electrical resistance to a predetermined one of the two electrical contact terminals of the particular pair of contact terminals of said controlled switch means which is electrically connected in series with said particular one of a predetermined number of closed paths electrically interruptible by a particular one of said plurality of positions of said light switch;

electrically connecting the remaining one of said two electrical terminals of said sensing resistor, not to the remaining one of said two electrical contact terminals of said particular pair of contact terminals of said controlled switch means, but to a point having a potential which is made, at least temporarily on demand from said control block, logically equivalent to the potential for said remaining one of said two electrical contact terminals of said particular pair of contact terminals of said controlled switch means when the resistance through said controlled switch means is made into a practically infinite value;

and then sensing with all electrical connection to said sensing input means of said control block the change in voltage with respect to said ground potential, at said predetermined one of said two electrical terminals of said sensing resistor; said change in voltage being caused by the closing and interrupting of said particular one of said plurality of positions of said light switch and said change in voltage being sensed only when the resistance through said particular pair of contact terminals of said controlled switch means is made into a practically infinite value;

(e) an ignition switch transducer means for providing the logical state, presence or absence of the STOP mode of said ignition switch;

(f) electrical wire insert means, each interrupting and creating each of pairs of insulated electrical terminals in series in each of a predetermined number of closed paths of said basic lights anywhere on each of said closed paths of said basic lights;

(g) electrical wire interrupting means connected to a predetermined number of said pairs of insulated electrical terminals of said insert means as well as to a predetermined number of said pairs of contact terminals of said controlled switch means to allow each pair of contact terminals of said controlled switch means to be inserted in series with each of said predetermined number of energizing closed paths of said basic lights at convenient locations said convenient locations being predetermined for said vehicle, and not restricted electrically to a single definite location with respect to said battery, said light switch, and said basic lights; and (h) electrical wire signaling means connected to said transducer means of said light and ignition switches, as well as to said sensing input means to provide to said logical processing means the combinations and sequences of the logical states of said light and ignition switches, said transducer means of said light and ignition switches being predetermined to be the most convenient on said vehicle.

2. An attachment for automatic light control and battery protection on a vehicle as in claim 1 wherein said light switch transducer means includes electronic transducer means providing two logical states out of the energizing and de-energizing of a particular one of a predetermined number of closed paths electrically interruptible by a particular one of said plurality of positions of said light switch, said electronic transducer means being made by electrically connected each of the two electrical terminals of a low-resistance resistor of predetermined electrical resistance in series with the particular pair of contact terminals of said controlled switch means which is electrically connected in series with said particular one of a predetermined number of closed paths electrically interruptible by a particular one of said plurality of positions of said light switch and then sensing with said sensing input means of said control block at the output of an electronic differential amplifier the change in voltage between the two inputs of said electronic differential amplifier connected electrically across the two electrical terminals of said low-resistance resistor, said change in voltage being caused by the closing and interrupting of said particular one of said plurality of positions of said light switch, and said change in voltage being sensed only when the resistance through said particular pair of contact terminals of said controlled switch means is made into a practically zero value.

3. An attachment for automatic light control and battery protection on a vehicle as in claim 1 wherein said vehicle further includes as existing equipment a resetable circuit breaker protecting said path energizing said set of head lights when closed and a specific fuse protecting said path energizing said set of park lights when closed, and wherein said electrical wire insert means include a predetermined number of head light socket insert means and a predetermined number of direct fuse socket insert means.

4. An attachment for automatic light control and battery protection on a vehicle as in claim 1 wherein said vehicle further includes as existing equipment a resetable circuit breaker protecting said path energizing said set of head lights when closed and a specific fuse protecting said path energizing said set of park lights when closed, wherein said control block and controlled switch means include two separated sets of control blocks and controlled switch means housed in two separated enclosures and wherein said electrical wire insert means include a predetermined number of head light socket insert means and a predetermined number of direct fuse socket insert means.

5. An attachment for automatic light control and battery protection on a vehicle as in claim 1 wherein said vehicle further includes as existing equipment a dedicated fuse protecting said path energizing said set of head lights when closed and a specific fuse protecting said path energizing said set of park lights when closed, and wherein said electrical wire insert means include a predetermined number of direct fuse socket insert means.

6. An attachment for automatic light control and battery protection on a vehicle as in claim 1 wherein said vehicle further includes as existing equipment a fusing link to protect both said path energizing said set of head lights when closed and said path energizing said set of park lights when closed, and wherein said electrical wire insert means comprise the operation of cutting a single predetermined electrical wire connected electrically in series with said fusing link and splicing the two wire ends produced by such cutting, serving as one of said pairs of insulated electrical terminals with two wire ends of said electrical wire interrupting means which electrically connect this one of said pairs of insulated electrical terminals to one pair of said contact terminals of said controlled switch means.

7. An attachment for automatic light control and battery protection on a vehicle as in claim 1 wherein said vehicle further includes as existing equipment a big fuse plugged into its mating big-fuse socket in lieu of a fusing link to protect both said path energizing said set of head lights when closed and said path energizing said set of park lights when closed, and wherein said electrical wire insert means comprises a direct big-fuse insert to be plugged into said big-fuse socket after said big-fuse socket has been made free of its mating big fuse.

8. An attachment for automatic light control and battery protection on a vehicle as in claim 1 wherein said vehicle further includes as existing equipment a first designated fuse protecting said path energizing said set of high-beam lights when closed, a second designated fuse protecting said path energizing said set of low-beam lights when closed, and a specific fuse protecting said path energizing said set of park lights when closed; and wherein said electrical wire insert means include a predetermined number of direct fuse socket insert means.

9. An attachment for automatic light control and battery protection on a vehicle as in claim 3 wherein said vehicle further includes as existing equipment a set of dome lights, a set of dome switches electrically connected in parallel and located physically at predetermined locations on said vehicle and a dome fuse protecting said path energizing said set of dome lights when closed by any of said set of dome switches, and wherein said predetermined number of direct fuse socket insert means includes a direct fuse socket insert for said dome fuse.

10. An attachment for automatic light control and battery protection on a vehicle as in claim 4 wherein said vehicle further includes as existing equipment a set of dome lights, a set of dome switches electrically connected in parallel and located physically at predetermined locations on said vehicle and a dome fuse protecting said path energizing said set of dome lights when closed by any of said set of dome switches, and wherein said predetermined number of direct fuse socket insert means includes a direct fuse socket insert for said dome fuse.

11. An attachment for automatic light control and battery protection on a vehicle as in claim 3 wherein said ignition switch transducer means includes means to amplify to suitable saturation all the voltage excursions of interest of said battery voltage to obtain pulses with flat top of amplitudes varying between the two logical values usable by the microcontroller of said control block.

12. An attachment for automatic light control and battery protection on a vehicle as in claim 4 wherein said ignition switch transducer means includes means to amplify to suitable saturation all the voltage excursions of interest if said battery voltage to obtain pulses with flat top of amplitudes varying between the two logical values usable by the microcontroller of said control block.

13. An attachment for automatic light control and battery protection on a vehicle as in claim 5 wherein said ignition switch transducer means includes means to amplify to suitable saturation all the voltage excursions of interest of said battery voltage to obtain pulses with flat top of amplitudes varying between the two logical values usable by the microcontroller of said control block.

14. An attachment for automatic light control and battery protection on a vehicle as in claim 6 wherein said ignition switch transducer means includes means to amplify to suitable saturation all the voltage excursions of interest of said battery voltage to obtain pulses with flat top of amplitudes varying between the two logical values usable by the microcontroller of said control block.

15. An attachment for automatic light control and battery protection on a vehicle as in claim 7 wherein said ignition switch transducer means includes means to amplify to suitable saturation all the voltage excursions of interest of said battery voltage to obtain pulses with flat top of amplitudes varying between the two logical values usable by the microcontroller of said control block.

16. An attachment for automatic light control and battery protection on a vehicle as in claim 8 wherein said ignition switch transducer means includes means to amplify to suitable saturation all the voltage excursions of interest of said battery voltage to obtain pulses with flat top of amplitudes varying between the two logical values usable by the microcontroller of said control block.

17. An attachment for automatic light control and battery protection on a vehicle as in claim 9 wherein said ignition switch transducer means includes means to amplify to suitable saturation all the voltage excursions of interest of said battery voltage to obtain pulses with flat top of amplitudes varying between the two logical values usable by the microcontroller of said control block.

18. An attachment for automatic light control and battery protection on a vehicle as in claim 10 wherein said ignition switch transducer means includes means to amplify to suitable saturation all the voltage excursions of interest for said battery voltage to obtain pulses with flat top of amplitudes varying between the two logical values usable by the microcontroller of said control block.

19. An attachment for automatic light control and battery protection on a vehicle as in claim 1 wherein said controlled switch means is a predetermined number of suitably rated power MOSFETs.

20. An attachment for automatic light control and battery protection on a vehicle as in claim 19 wherein said controlled switch means includes an electronic circuit breaker suitably configured for said controlled switch means to work with the help of the microcontroller of said control block to prevent said power MOSFETs from being destroyed by excessive overcurrents.

* * * * *